(12) United States Patent
Brown et al.

(10) Patent No.: US 10,402,425 B2
(45) Date of Patent: *Sep. 3, 2019

(54) TUPLE ENCODING AWARE DIRECT MEMORY ACCESS ENGINE FOR SCRATCHPAD ENABLED MULTI-CORE PROCESSORS

(71) Applicant: Oracle International Corporation, Redwood Shores, CA (US)

(72) Inventors: David A. Brown, Austin, TX (US); Rishabh Jain, Austin, TX (US); Michael Duller, San Francisco, CA (US); Sam Idicula, Santa Clara, CA (US); Erik Schlanger, Austin, TX (US); David Joseph Hawkins, Austin, TX (US); Christopher Joseph Daniels, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,430

(22) Filed: Jul. 24, 2018

(65) Prior Publication Data

US 2018/0329975 A1  Nov. 15, 2018

Related U.S. Application Data

(63) Continuation-in-part of application No. 15/073,905, filed on Mar. 18, 2016, now Pat. No. 10,061,714, and
(Continued)

(51) Int. Cl.
*G06F 16/22* (2019.01)
*G06F 16/27* (2019.01)

(52) U.S. Cl.
CPC .......... *G06F 16/278* (2019.01); *G06F 16/221* (2019.01)

(58) Field of Classification Search
None
See application file for complete search history.

(56) References Cited

U.S. PATENT DOCUMENTS 4,626,829 A  12/1986  Hauck
5,109,226 A   4/1992  MacLean
(Continued)

FOREIGN PATENT DOCUMENTS

EP   2423843 A1   2/2012
GB   2 306 868 A  5/1997
(Continued)

OTHER PUBLICATIONS

Chavan, U.S. Appl. No. 14/338,219, filed 047/22/2014, Interview Summary, dated Sep. 11, 2017.
(Continued)

*Primary Examiner* — Michael Sun
(74) *Attorney, Agent, or Firm* — Hickman Palermo Becker Bingham LLP

(57) ABSTRACT

Techniques provide for hardware accelerated data movement between main memory and an on-chip data movement system that comprises multiple core processors that operate on the tabular data. The tabular data is moved to or from the scratch pad memories of the core processors. While the data is in-flight, the data may be manipulated by data manipulation operations. The data movement system includes multiple data movement engines, each dedicated to moving and transforming tabular data from main memory data to a subset of the core processors. Each data movement engine is coupled to an internal memory that stores data (e.g. a bit vector) that dictates how data manipulation operations are
(Continued)

performed on tabular data moved from a main memory to the memories of a core processor, or to and from other memories. The internal memory of each data movement engine is private to the data movement engine. Tabular data is efficiently copied between internal memories of the data movement system via a copy ring that is coupled to the internal memories of the data movement system and/or is coupled to a data movement engine. Also, a data movement engine internally broadcasts data to other data movement engines, which then transfer the data to respective core processors. Partitioning may also be performed by the hardware of the data movement system. Techniques are used to partition data "in flight". The data movement system also generates a column of row identifiers (RIDs). A row identifier is a number treated as identifying a row or element's position within a column. Row identifiers each identifying a row in column are also generated.

21 Claims, 21 Drawing Sheets

Related U.S. Application Data a continuation-in-part of application No. 15/074,248, filed on Mar. 18, 2016, now Pat. No. 10,055,358, and a continuation of application No. 15/362,688, filed on Nov. 28, 2016, now Pat. No. 10,061,832.

(56) References Cited

U.S. PATENT DOCUMENTS

| | | |
|---|---|---|
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |
| 5,581,705 A | 12/1996 | Passint et al. |
| 5,592,622 A | 1/1997 | Isfeld |
| 5,655,080 A | 8/1997 | Dias et al. |
| 5,675,382 A | 10/1997 | Bauchspies |
| 5,696,956 A | 12/1997 | Razdan et al. |
| 5,696,959 A * | 12/1997 | Guttag ............ G06F 9/30014 712/225 |
| 5,706,495 A | 1/1998 | Chadha et al. |
| 5,884,299 A | 3/1999 | Ramesh |
| 5,887,183 A | 3/1999 | Agarwal |
| 5,933,650 A | 8/1999 | Van Hook |
| 5,987,407 A | 11/1999 | Wu |
| 6,006,179 A | 12/1999 | Wu |
| 6,065,070 A | 5/2000 | Johnson |
| 6,118,724 A * | 9/2000 | Higginbottom ...... G11C 7/1018 365/189.02 |
| 6,161,173 A | 12/2000 | Krishna |
| 6,178,405 B1 | 1/2001 | Ouyang |
| 6,219,457 B1 | 4/2001 | Potu |
| 6,317,824 B1 | 11/2001 | Thakkar et al. |
| 6,331,826 B1 | 12/2001 | Wagner |
| 6,336,180 B1 * | 1/2002 | Long ................ G06F 9/3879 711/206 |
| 6,381,601 B1 | 4/2002 | Fujiwara et al. |
| 6,416,410 B1 | 7/2002 | Abou-Samra |
| 6,671,797 B1 | 12/2003 | Golston |
| 6,745,174 B2 | 6/2004 | Levy et al. |
| 6,779,105 B1 | 8/2004 | Bouyoux |
| 6,829,697 B1 | 12/2004 | Davis et al. |
| 6,842,848 B2 | 1/2005 | Hokenek et al. |
| 6,996,569 B1 | 2/2006 | Bedell et al. |
| 7,020,661 B1 | 3/2006 | Cruanes |
| 7,047,252 B2 | 5/2006 | Buch et al. |
| 7,725,595 B1 | 5/2010 | Geissler et al. |
| 7,861,060 B1 | 12/2010 | Nickolls et al. |
| 7,991,794 B2 | 8/2011 | Bedi et al. |
| 8,244,780 B1 | 8/2012 | Narayanan |
| 8,260,803 B2 | 9/2012 | Hsu et al. |
| 8,285,709 B2 | 10/2012 | Candea et al. |
| 8,521,788 B2 | 8/2013 | Ellison et al. |
| 8,533,216 B2 | 9/2013 | Buger et al. |
| 8,543,534 B2 | 9/2013 | Alves et al. |
| 8,572,131 B2 | 10/2013 | Ellison et al. |
| 8,667,252 B2 | 3/2014 | Colavin et al. |
| 8,725,707 B2 | 5/2014 | Chen et al. |
| 8,938,644 B2 | 1/2015 | Clark et al. |
| 8,996,463 B2 | 3/2015 | Merriman et al. |
| 9,432,298 B1 * | 8/2016 | Smith ................ H04L 49/9057 |
| 9,658,675 B1 | 5/2017 | Witek |
| 9,658,676 B1 | 5/2017 | Witek |
| 2001/0037345 A1 | 11/2001 | Kiernan et al. |
| 2002/0032678 A1 | 3/2002 | Cornwell et al. |
| 2002/0091905 A1 | 7/2002 | Krishna |
| 2002/0184392 A1 | 12/2002 | Parthasarathy et al. |
| 2002/0188830 A1 | 12/2002 | Boles et al. |
| 2003/0135495 A1 | 7/2003 | Vagnozzi |
| 2003/0167460 A1 | 9/2003 | Desai |
| 2003/0182464 A1 | 9/2003 | Hamilton |
| 2003/0187848 A1 | 10/2003 | Ghukasyan et al. |
| 2003/0187858 A1 | 10/2003 | Kirk et al. |
| 2004/0030863 A1 | 2/2004 | Paver |
| 2004/0068642 A1 | 4/2004 | Tanaka |
| 2004/0160446 A1 | 8/2004 | Gosalia |
| 2004/0221192 A1 | 11/2004 | Motta |
| 2005/0091256 A1 | 4/2005 | Rathakrishnan et al. |
| 2005/0177706 A1 | 8/2005 | Lee |
| 2005/0246338 A1 | 11/2005 | Bird |
| 2006/0116989 A1 | 6/2006 | Bellamkonda et al. |
| 2006/0179255 A1 | 8/2006 | Yamazaki |
| 2006/0218194 A1 | 9/2006 | Yalamanchi |
| 2007/0074214 A1 | 3/2007 | Ueno |
| 2008/0046686 A1 | 2/2008 | Cameron |
| 2008/0086480 A1 | 4/2008 | Srivastava |
| 2008/0086495 A1 | 4/2008 | Kizitunc |
| 2008/0134213 A1 | 6/2008 | Alverson |
| 2009/0055350 A1 | 2/2009 | Branish et al. |
| 2009/0094193 A1 | 4/2009 | King et al. |
| 2009/0287628 A1 | 11/2009 | Indeck |
| 2009/0287637 A1 | 11/2009 | Day et al. |
| 2009/0313210 A1 | 12/2009 | Bestgen et al. |
| 2010/0030728 A1 | 2/2010 | Chakkappen et al. |
| 2010/0082705 A1 | 4/2010 | Bhashyam et al. |
| 2010/0088309 A1 | 4/2010 | Petculescu et al. |
| 2010/0106944 A1 * | 4/2010 | Symes ................ G06F 9/30018 712/208 |
| 2010/0115347 A1 | 5/2010 | Noyes |
| 2010/0161646 A1 | 6/2010 | Ceballos et al. |
| 2010/0191918 A1 | 7/2010 | Lee et al. |
| 2011/0106804 A1 | 5/2011 | Keeler et al. |
| 2011/0119249 A1 | 5/2011 | Flatz |
| 2011/0228325 A1 | 9/2011 | Shiraishi |
| 2012/0054225 A1 | 3/2012 | Marwah et al. |
| 2012/0071152 A1 | 3/2012 | Roundtree |
| 2012/0159448 A1 | 6/2012 | Arcese |
| 2012/0166447 A1 | 6/2012 | Nice |
| 2012/0197868 A1 | 8/2012 | Fauser |
| 2012/0209873 A1 | 8/2012 | He |
| 2012/0310916 A1 | 12/2012 | Abadi |
| 2013/0117313 A1 | 5/2013 | Miao et al. |
| 2013/0151458 A1 | 6/2013 | Indeck |
| 2013/0325841 A1 | 12/2013 | Ahmed |
| 2014/0013076 A1 | 1/2014 | Ganesh |
| 2014/0013078 A1 | 1/2014 | Ganesh et al. |
| 2014/0052713 A1 | 2/2014 | Schauer et al. |
| 2014/0052726 A1 | 2/2014 | Amberg et al. |
| 2014/0074818 A1 | 3/2014 | Barber |
| 2014/0095748 A1 | 4/2014 | Aingaran et al. |
| 2014/0096145 A1 | 4/2014 | Aingaran et al. |
| 2014/0208331 A1 | 7/2014 | Li |
| 2014/0279838 A1 | 9/2014 | Tsirogiannis |
| 2015/0046411 A1 | 2/2015 | Kazmaier |
| 2015/0088926 A1 | 3/2015 | Chavan et al. |
| 2015/0261535 A1 | 9/2015 | Snyder, II |
| 2016/0007037 A1 | 1/2016 | Zhao et al. |

(56) References Cited

U.S. PATENT DOCUMENTS

| | | |
|---|---|---|
| 2016/0019064 A1 | 1/2016 | Brooks et al. |
| 2016/0350347 A1 | 12/2016 | Das et al. |
| 2017/0024435 A1 | 1/2017 | Kociubes et al. |
| 2017/0060587 A1 | 3/2017 | Chavan |
| 2017/0270052 A1 | 9/2017 | Brown et al. |
| 2017/0270053 A1 | 9/2017 | Brown |
| 2018/0004581 A1 | 1/2018 | Brown |

FOREIGN PATENT DOCUMENTS

| | | |
|---|---|---|
| JP | 2000261674 A | 9/2000 |
| WO | WO 00/08552 | 2/2000 |
| WO | WO 2013/095653 A1 | 6/2013 |
| WO | WO 2013/095662 A1 | 6/2013 |

OTHER PUBLICATIONS

Brooks, U.S. Appl. No. 14/867,929, filed Sep. 28, 2015, Final Office Action, dated May 31, 2018.
Kociubes U.S. Appl. No. 14/806,576, filed Jul. 22, 2015, Interview Summary, dated Feb. 14, 2018.
Ganesh, U.S. Appl. No. 14/023,249, filed Sep. 10, 2013, Notice of Allowance, dated Feb. 27, 2017.
Das, U.S. Appl. No. 14/806,614, filed Jul. 22, 2015, Office Action, dated Dec. 6, 2017.
Das, U.S. Appl. No. 14/806,614, filed Jul. 22, 2015, Notice of Allowance, dated Mar. 20, 2018.
Das, U.S. Appl. No. 14/806,614, filed Jul. 22, 2015, Interview Summary, dated Jan. 17, 2018.
Chavan, U.S. Appl. No. 15/211,418, filed Jul. 15, 2016, Office Action, dated May 4, 2018.
Chavan, U.S. Appl. No. 14/3385,219, filed Jul. 22, 2014, Office Action, dated Jun. 2, 2017.
U.S. Appl. No. 13/488,739, filed Jun. 5, 2012, Notice of Allowance, dated Aug. 28, 2014.
Chavan, U.S. Appl. No. 14/338,219, filed Jul. 22, 2014, Notice of Allowance, dated Sep. 25, 2017.
U.S. Appl. No. 13/488,739, filed Jun. 5, 2012, Notice of Allowance, dated Dec. 18, 2014.
Brown, U.S. Appl. No. 15/362,688, filed Nov. 28, 2016, Notice of Allowance, dated Apr. 25, 2018.
Brown, U.S. Appl. No. 15/197,436, filed Jun. 29, 2016, Office Action, dated Nov. 29, 2017.
Brown, U.S. Appl. No. 15/197,436, filed Jun. 29, 2016, Final Office Action, dated Jun. 11, 2018.
Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
Brown, U.S. Appl. No. 15/073,905, filed Mar. 18, 2016, Notice of Allowance, dated Apr. 24, 2018.
Brooks, U.S. Appl. No. 14/867,929, filed Sep. 28, 2015, Office Action, dated Jul. 13, 2017.
Brooks, U.S. Appl. No. 14/867,929, filed Sep. 28, 2015, Interview Summary, dated Apr. 25, 2018.
Chavan, U.S. Appl. No. 14/338,219, filed Jul. 22, 2014, Restriction Requirement, dated Jan. 13, 2017.
U.S. Appl. No. 13/590,110, filed Aug. 20, 2012, Office Action, dated Jul. 1, 2014.
U.S. Appl. No. 14/023,249, filed Sep. 10, 2013, Notice of Publication of Application, dated Jan. 9, 2014.
U.S. Appl. No. 13/488,739, filed Jun. 5, 2012, Office Action, dated Apr. 16, 2014.
U.S. Appl. No. 13/590,057, filed Aug. 20, 2012, Office Action, dated Jan. 7, 2014.
U.S. Appl. No. 14/023,249, filed Sep. 10, 2013, Office Action, dated Aug. 25, 2016.
U.S. Appl. No. 14/023,249, filed Sep. 10, 2013, Office Action, dated Jan. 20, 2016.
U.S. Appl. No. 13/590,110, filed Aug. 20, 2012, Office Action, dated Apr. 14, 2016.
U.S. Appl. No. 13/590,110, filed Aug. 20, 2012, Notice of Allowance, dated Aug. 1, 2016.
Kociubes, U.S. Appl. No. 14/806,576, filed Jul. 22, 2015, Notice of Allowance, dated Apr. 11, 2018.
U.S. Appl. No. 13/590,110, filed Aug. 20, 2012, Office Action, dated Oct. 2, 2015.
U.S. Appl. No. 13/590,057, filed Aug. 20, 2012, Advisory Action, dated Feb. 11, 2016.
U.S. Appl. No. 13/590,110, filed Aug. 20, 2012, Final Office Action, dated Mar. 27, 2015.
U.S. Appl. No. 13/590,057, filed Aug. 20, 2012, Office Action, dated Jul. 1, 2014.
U.S. Appl. No. 13/590,057, filed Aug. 20, 2012, Office Action, dated Apr. 22, 2015.
U.S. Appl. No. 13/590,057, filed Aug. 20, 2012, Notice of Allowance, dated Sep. 30, 2016.
U.S. Appl. No. 13/590,057, filed Aug. 20, 2012, Final Office Action, dated Nov. 18, 2014.
U.S. Appl. No. 13/590,057, filed Aug. 20, 2012, Final Office Action, dated Oct. 19, 2015.
U.S. Appl. No. 13/590,057, filed Aug. 20, 2012, Advisory Aciton, dated Feb. 26, 2015.
U.S. Appl. No. 13/590,0547, filed Aug. 20, 2012, Advisory Action, dated Feb. 11, 2016.
U.S. Appl. No. 13/590,110, filed Aug. 20, 2012, Office Action, dated Dec. 18, 2013.
Zhou et al., "Efficient SIMD Optimization for Media Processors", Journal of Zhejiang University Science A, dated Apr. 2008, 7 pages.
Thekkath et al., "Separating Data and Control Transfer in Distributed Operating Systems", ASPLOS, San Jose, ACM, dated 1994, 10 pages.
Schlegel et al., "Fast Integer Compression Using SIMD Instructions", dated 2010, ACM, 7 pages.
O'Brien, Frank, "The Appollo Guidance Computer-Architecture and Operation", dated 2010, Springer, pp. 27-28, 54, 76 and 1414.
IBM, "Technical Disclosure Bulletin, Data Packing and Unpacking Scheme for High Performance Image Processing", vol. 36, No. 7, dated Jul. 1993, 6 pages.
Brewer et al., "Remote Queues: Exposing Message Queues for Optimization and Atomicity", dated Jul. 17, 1995, ACM, 12 pages.
Anonymous:, "Hash Table—Wikipedia, the free encyclopedia", dated Jun. 20, 2012, retrieved from the internet: http://wayback.archive.org/wiki/harshtable, 18 pages.
Brown, U.S. Appl. No. 15/197,436, filed Jun. 29, 2016, Office Action, dated Dec. 13, 2018.
Brown, U.S. Appl. No. 15/197,436, filed Jun. 29, 2016, Advisory Action, dated Sep. 7, 2018.
Brooks, U.S. Appl. No. 14/867,929, filed Sep. 28, 2015, Advisory Action, dated Aug. 28, 2018.
Brownb, U.S. Appl. No. 15/197,436, filed Jun. 29, 2016, Final Office Action dated Mar. 28, 2019.
Brown, U.S. Appl. No. 15/197,436, filed Jun. 29, 2016, Interview Summary dated Feb. 25, 2019.
Brooks, U.S. Appl. No. 14/867,929, filed on Sep. 28, 2015, Office Action dated Mar. 18, 2019.

* cited by examiner

TUPLE ENCODING AWARE DIRECT MEMORY ACCESS ENGINE FOR SCRATCHPAD ENABLED MULTI-CORE PROCESSORS

CROSS-REFERENCE TO RELATED APPLICATIONS

The present application is continuation-in-part of U.S. patent application Ser. No. 15/073,905, entitled Tuple-Encoding-Aware Direct Memory Access Engine For Scratchpad-Enabled Multi-Core Processors, filed on Mar. 18, 2016 by David Brown, et al., the entire contents of which are incorporated herein by reference; the present application is continuation-in-part of U.S. patent application Ser. No. 15/074,248, entitled Run Length Encoding Aware Direct Memory Access Filtering Engine for Scratchpad Enabled Multicore Processors, filed on Mar. 18, 2016 by David Brown, et al., the entire contents of which are incorporated herein by reference; the present application is a continuation of U.S. patent application Ser. No. 15/362,688, Database Tuple-Encoding-Aware Data Partitioning In A Direct Memory Access Engine, filed on Nov. 28, 2016 by David Brown, et al., the entire contents of which are incorporated herein by reference.

TECHNICAL FIELD

The technical field relates to data movement by hardware data movement system.

BACKGROUND

Database servers that execute on multi-core processors perform data manipulation operations on large amounts of tabular data. Tabular data is data that is logically organized as rows and one or more columns, each column having a certain size, each row including each column. Logically, tabular data resides in a table-like structure, such as a spreadsheet or relational table. However, the actual physical storage of the tabular data may take a variety of forms. For example, in row-major format, tabular data may be stored as rows that are stored contiguously within a memory address space, each row including each column and a given column occupying the same number of bytes within a row. In column-major format, each column may be separately stored from other columns as a column stored contiguously within a memory address. Unless otherwise indicated, the term column refers to a column stored in column major format, in one or more column vectors.

To perform data manipulation operations on tabular data efficiently, tabular data is moved from main memory to a memory closer to a core processor, where the operations can be performed more efficiently by the core processor. Thus, the movement of tabular data between the memory closer to a core processor and main memory is the type of operation that is performed frequently by database servers.

However, approaches for moving tabular data to a memory closer to the core processor add overhead that significantly offset or eliminate any advantage gained by the movement of tabular data to the memory closer to the core processor. Even direct memory access (DMA) engines capable of offloading the task of moving data cannot offer sufficient increase in processor efficiency for several reasons. Tabular data processed by database operations is not organized or formatted in a way that is optimal for a DMA engine to move.

Additionally, the memory closer to the core processor is typically small in size. Therefore, a DMA engine will be able to move only a small portion of data into the local memory before that memory is full and needs to be emptied before it can be written to again. This results in the DMA engine repeating the process multiple times and issuing an interrupt each time the DMA moves data to the memory closer to the core processor, resulting in a large number of interrupts. A large number of interrupts deteriorate core processor performance because every time the core processor is interrupted, the core processor must determine the source of the interrupt and how to handle the interrupt.

Tuple-Encoding-Aware Direct Memory Access Engine For Scratchpad-Enabled Multi-Core Processors describes a hardware accelerated data movement system that is on a chip and that efficiently moves tabular data to multiple core processors. To perform data manipulation operations on tabular data efficiently, the data manipulation operations are performed in-flight while moving tabular data to the core processors. The data movement system includes multiple data movement engines, each dedicated to moving and transforming tabular data from main memory to a subset of the core processors. Each data movement engine is coupled to an internal memory that stores data/control structures (e.g. a bit vector) that dictate how data manipulation operations are performed on tabular data moved from a main memory to the memories of a core processor. The internal memory of each data movement engine may be private to the data movement engine.

There are scenarios where a copy of the same data/control structure can be used by multiple data movement engines. Under such scenarios, a copy of the data is needed in the internal memory of each data movement engine. A copy of the data can be moved from main memory via a DMA engine to the internal memory of each data movement engine. To avoid multiple movements of the copies from main memory to the multiple internal memories and thereby improve efficiency of copying data, techniques are described herein for internally copying data between internal memories within a data movement system.

There are also scenarios where a copy of the same data is transferred from main memory to the memories of multiple core processors. If the multiple cores are served by different data movement engines, each copy may have to be transferred in separate data movements, one for each data movement engine, each data movement entailing a transfer from main memory via a DMA engine. To avoid such multiple data movements and improve efficiency of transferring data to memories of multiple core processors, described herein are techniques for a data movement engine to internally broadcast data to other data movement engines, which then transfer the data to the respective core processors.

Partitioning

Certain operations performed by database servers that execute on multi-core processors, such as joins, aggregations and sorts, frequently need to partition tabular data across computing nodes. The cost of performing such partitioning is a significant proportion of the overall execution time of a query. As a result, performing the partitioning of data efficiently is a key for achieving high performance and scalability in distributed query processing. Described herein are hardware accelerated approaches for achieving such high performance and scalability.

Altering Row Alignment

Columns storing rows can be row aligned. When rows stored in a set of columns are row aligned, the same row is stored in the same relative position or index in each column of the set of columns.

Row alignment enables row resolution. Row resolution refers to the operation of identifying, for a row in a column, at which index or relative position in another column the row resides. For example, a set of rows are stored in multiple columns, which are row aligned. For a particular row stored at the third index or position within a column, row resolution involves recognizing the index or position of the element in the other columns for which the same row is also the third.

Various data manipulation operations, such as a partition operation, manipulate a "source column" to generate one or more "resultant columns". A resultant column may not be row aligned with the source column. Thus, row alignment by itself cannot be relied upon to perform row resolution between the source column and any resultant column.

To illustrate, a source column may be partitioned into two resultant columns, such that elements in the odd ordinal position of the source column are stored in a first resultant column and the elements in the even ordinal position are stored in the second resultant column. Neither the first or second resultant column is row aligned with the source column. For example, the fourth element in the source column and the second element in the second column belong to the same row, however, the index or position of the row is different between the source column and second resultant column.

Because there is no row alignment between any of the first and second resultant columns and the source column, row alignment by itself may not be used to perform row resolution. Described herein are approaches that enable row resolution when row alignment is lost between a source column and resultant columns after performance of a data manipulation operation.

DETAILED DESCRIPTION

Figure 1:
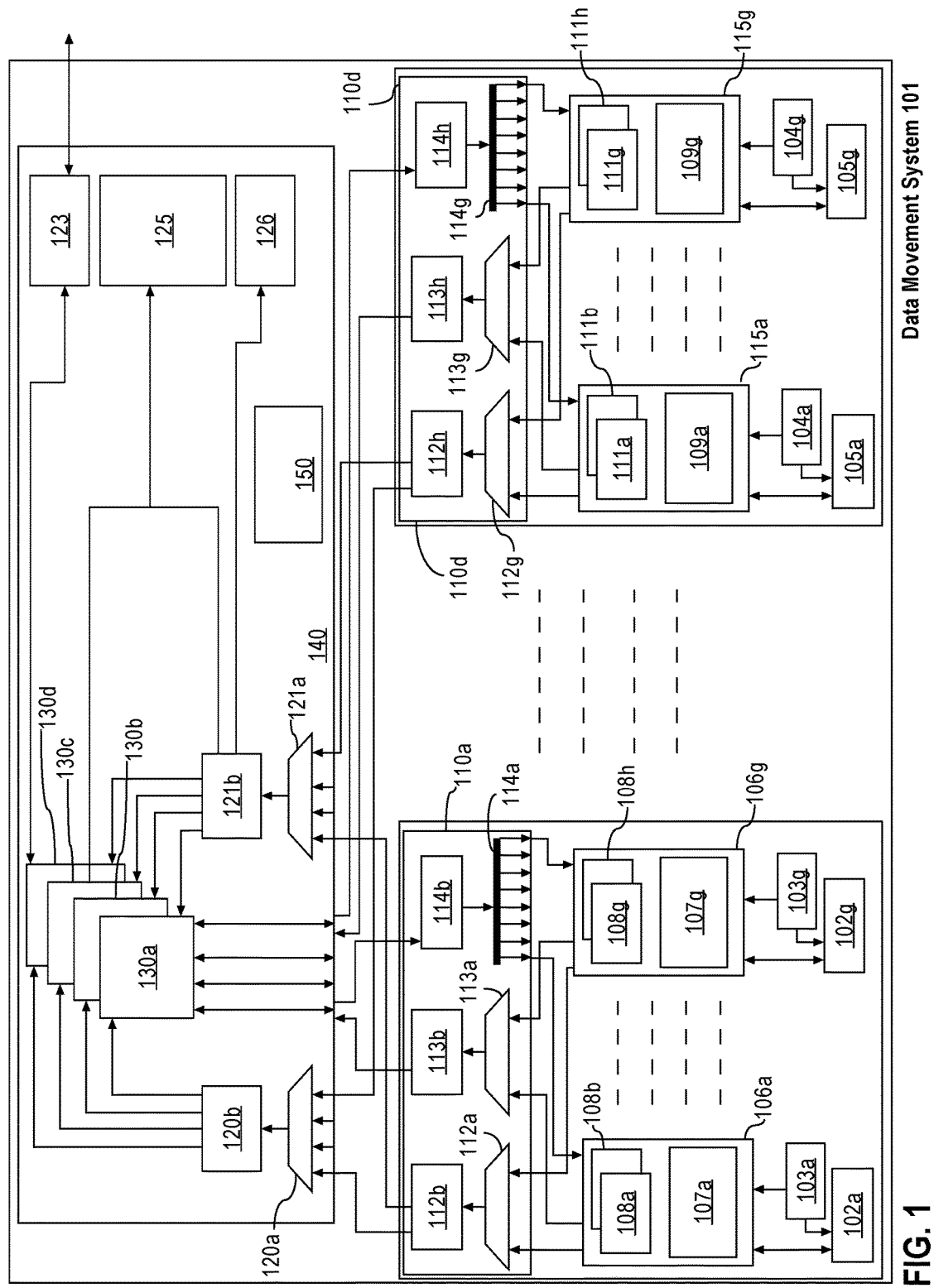
FIG. 1 illustrates an example arrangement of a plurality of electronic circuits of the data movement system according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques described herein provide for hardware accelerated data movement between main memory and an on-chip data movement system that comprises multiple core processors that operate on the tabular data. The tabular data is moved to or from the scratch pad memories of the core processors. While the data is in-flight, the data may be manipulated by data manipulation operations.

The data movement system includes multiple data movement engines, each dedicated to moving and transforming tabular from main memory data to a subset of the core processors. Each data movement engine is coupled to an internal memory that stores data (e.g. a bit vector) that dictates how data manipulation operations are performed on tabular data moved from a main memory to the memories of a core processor. The internal memory of each data movement engine is private to the data movement engine.

Approaches are described herein for more efficiently copying data between internal memories of the data movement system. In addition, approaches are described herein for a data movement engine to internally broadcast data to other data movement engines, which then transfer the data to respective core processors. These approaches use a copy ring that is coupled to the internal memories of the data movement system and/or data movement engines.

Partitioning may also be performed by the hardware of the data movement system. Techniques for partitioning described herein partition data "in flight" without executing software programs while moving tabular data from a source memory to destination scratch pad memory of core processors. In other words, partitioning is performed within the same clock cycles that are used in transmitting the data to the destination memory location and prior to storing the tabular data at the destination memory location. Consequently, the tabular data stored in the destination memory location is the tabular data resulting from the partitioning. A core processor avoids spending additional clock cycles to partition the tabular data.

In an embodiment, in response to a core processor pushing a particular scratch pad memory location of a "descriptor" into a register, the descriptor is accessed by the data movement system. The descriptor may indicate a source memory location of where tabular data is stored, and the descriptor may also indicate a destination memory location to store the result of a data manipulation operation. The destination memory location may be within a scratchpad memory that is local to the core data processor.

The descriptor may also indicate a width of a column of tabular data and a number of rows. By describing the tabular data to be moved in terms of number of rows and a width of a column of tabular data, the descriptor specifies to the data movement system how a database column of a database table is formatted and stored at the source memory location. Different columns of the database table may be specified by different descriptors, thus the data movement system is fully aware of how database tables are formatted and stored at the source memory location. Therefore, the data movement system is always optimized to access tabular data from a source memory location and store it in a destination memory location, depending on how the tabular data is formatted and organized at the source memory location.

The descriptor may also indicate one or more tabular data manipulation operations to perform on the column of data. An example of a data manipulation operation may be a type of filtering operation, described herein as a gather operation. The descriptor may indicate that a gather operation should be performed on the tabular data.

Importantly, other types of tabular data manipulation operations that may be indicated include various kinds of descriptors that are used for partitioning tabular data. According to an embodiment, partitioning is performed in three stages. In general, these include (1) moving tabular data into an area of memory where tabular data is staged before partitioning to core processors; (2) generating an identifier for each row of tabular data identifying a co-processor to which the row is assigned; and (3) distributing each of the rows of tabular data to the core processor identified by the row's respective identifier. A different kind of descriptor is used for each stage.

Also described herein are descriptors that may be used to generate a column of row identifiers (RIDs). Such a column is referred to herein as a RID column. A row identifier is a number treated as identifying a row or element's position within a column. For example, a RID of 0 may refer to the first row in a column, and 1 may refer to the second row. As another example, 0 may refer to the first row, 3 to the second, and 7 to third. As yet another example, 1000 may refer to the first row in a column and 1001 to the second. As described below, RIDs may be used to perform row resolution.

According to an embodiment, partitioning of tabular data and generation of RIDs is performed by a data movement system that provides robust infrastructure for supporting not only partitioning tabular data, but also moving data and performing of various kinds of data manipulation operations. Therefore, a detailed overview of the data movement system is described, followed by detailed description of partitioning tabular data.

Overview of the Data Movement System

Core Processor and DMEM

FIG. 1 illustrates an data movement system 101, an example arrangement of a data movement system. Data movement system 101 comprises a plurality of core processors 103a, 103g, 104a, 104g. Each of the core processors 103a, 103g, 104a, 104g are connected to a local high-speed scratchpad memory, such as a static random-access memory (SRAM), referred to herein as DMEM (Direct Memory). In FIG. 1, core processors 103a, 103g, 104a, 104g are connected to DMEM units 102a, 102g, 105a, 105g, respectively. Of all the core processors, only the processor that is connected to a particular DMEM may directly access that particular DMEM. Thus, DMEM 102a may be accessed by core processor 103a, but cannot be accessed by core processor 103g, 104a, 104g. DMEM 102g may be accessed by core processor 103g, but not by core processors 103a, 104a, 104g. Likewise, DMEM 105a may be accessed by core processor 104a, but not by core processors 103a, 103g, 104g and DMEM 105g may be accessed by core processor 104g, but cannot be accessed by core processors 103a, 103g, 104a.

Direct Memory Access Complex (DMAC)

The data movement system described herein comprises three major functional blocks, Direct Memory Access Complex (DMAC), Direct Memory Access X-Bar (DMAX) and Direct Memory Access DMEM (DMAD). The data movement system described herein comprises only one DMAC block and several DMAX and DMAD blocks. The DMAC comprises several complex data retrieval, load and manipulation engines. The DMAX blocks mainly comprise data routing engines and the DMAD blocks mainly comprise data decoding engines and descriptor channel blocks.

The data movement system described herein comprises one DMAD block per core, therefore the number of the DMAD blocks depend upon the number of cores utilized in the data movement system. For example, a data movement system in a 32 core processor system, the number of DMAD blocks is 32. In an embodiment, several DMAD blocks may be configured to route data and instructions to one DMAX block. Continuing with the example of the 32 core processor, 8 DMAD blocks may be configured to route data and instructions to one DMAX block, thereby resulting in 4 DMAX blocks to serve 32 DMAD blocks of 32 cores.

The data movement system described herein comprises only a single DMAC. The single DMAC processes data and instructions, routed via DMAX, from all DMAD blocks of the data movement system. The DMAC comprises engines that perform complex functions and due to their complexity, require the highest gate count, area and power relative to the engines within DMAX and DMAD blocks. Therefore, the DMAC impacts the total cost of the data movement system more than DMAX and DMAD blocks. However, by sharing the DMAC resources across the DMAX and DMAD blocks, the cost of a DMAC to the data movement system is amortized. Thus, the total cost of the data movement system, in terms of gate count, area and power, is substantially lower than alternative approaches described above.

In an embodiment, the data movement system described herein is implemented on a single chip. Thus, for each core processor, the DMEM connected to each of the core processors, the DMAD block for each of the core processors, DMAX blocks and the DMAC block are all designed, implemented and configured on a single chip. A bus interconnects all the functional blocks of the data movement system in the chip.

Direct Memory Access DMEM (DMAD)

Each of the core processors, 103a, 103g, 104a, 104g, is connected to DMAD 106a, 106g, 115a, 115g, respectively. Each DMAD comprises a group of electronic circuits that have been designed to receive instructions from the core processor connected to the particular DMAD. For example, DMAD 106a is designed to receive instructions from core processor 103a only.

A core processor sends instructions to a DMAD by programming a set of commands, herein referred to as a descriptor. A descriptor describes movement of data from one location to another location through a plurality of fields. Some of the fields in the descriptor may include a descriptor type, a source address location that indicates the source location for the tabular data to be moved from, a destination address location that indicates the destination location for the tabular data from the source location to be copied to, the size of the column of tabular data to be operated on, the number of rows of the column of tabular data that need to be copied, one or more data manipulation operations and wait-for event identifiers and other control flags.

Once the core processor programs the descriptor, the core processor stores the descriptor at a location in the DMEM. For example, core processor 103a upon programming the descriptor, stores it in DMEM unit 102a. Core processor 103a then sends the descriptor to DMAD 106a by transmitting the memory location of the descriptor within the DMEM unit 102a onto one of the two hardware data channels of DMAD 106a. A core processor transmits the memory location of a descriptor onto a data channel by storing the memory location into a register. In an embodiment, the register may be designed to be a first-in-first-out or FIFO register such that the first memory location that is pushed or stored into the register will be the first memory location that is added into a hardware managed list of one of the two hardware data channels.

DMEM Interface Block

Each DMAD comprises a DMEM interface block that is configured to store any data destined for the DMEM unit coupled with its DMAD, and generate a write request for the DMEM unit coupled with its DMAD to store the data transmitted to its DMAD in the DMEM unit coupled with its DMAD. For example, DMAD 106a comprises DMEM interface block 107a. DMEM interface block 107a is a group of electronic circuits that have been designed to store data transmitted to DMAD 106a and destined for DMEM unit 102a in one of the registers accessible by DMEM interface block 107a. Additionally, the group of electronic circuits of DMEM interface block 107a have also been designed to generate a write request, for DMEM unit 102a, to store the data destined for DMEM unit 102a. DMAD 106g, 115a, and 115g similarly comprise DMEM interface blocks 107g, 109a, 109g respectively.

The DMEM interface block is also configured to read or retrieve data from the DMEM unit coupled with its DMAD. The DMEM interface block may generate a read request, using a DMEM unit location, to read or retrieve data from the DMEM unit location. The DMEM interface block may receive a read request to read or retrieve data from a particular DMEM unit location and in response the DMEM interface block may read or retrieve data from the particular DMEM unit location. The DMEM interface block may transmit the read or retrieved data to the hardware component within its DMAD that requested that data. The DMEM interface block may receive a write request to write or store data at a particular DMEM unit location and in response the DMEM interface block may write or store data at the particular DMEM location in the DMEM unit coupled with the DMAD of the DMEM interface block. Each of DMEM interface blocks 107a, 107g, 109a, 109g, depicted in FIG. 1, are designed to perform the above operations with DMEM units 102a, 102g, 105a, and 105g, respectively.

Descriptor Channel Block of DMAD

Each DMAD comprises a Descriptor Channel Block, which is a subset of electronic circuits of the DMAD that are designed to determine the hardware data channel to which the descriptor will be added. In an embodiment, each DMAD may be designed to maintain two hardware data channels, and may have two Descriptor Channel Blocks, one for each of the hardware data channels. For example, DMAD 106a is designed to maintain two hardware data channels. Descriptor Channel Blocks 108a and 108b are the two descriptor channel blocks of DMAD 106a. Similarly, DMAD 106g comprises Descriptor Channel Blocks 108g, 108h, DMAD 115a comprises Descriptor Channel Blocks 111a, 111b and DMAD 115g comprises Descriptor Channel Blocks 111g, 111h.

Each Descriptor Channel Block maintains two hardware managed lists, an active list and a free list, per hardware data channel. In an embodiment, the hardware managed active list and free list are linked lists. Once the core processor stores the DMEM location of the descriptor into the FIFO register, the Descriptor Channel Block of the DMAD connected to the core processor transmits the DMEM location of the descriptor from the FIFO register to one of the hardware data channels. In an embodiment, once the DMEM location of a descriptor is stored into a FIFO register, the Descriptor Channel Block determines the number of descriptors that are assigned to be processed on that particular hardware data channel and if the number of descriptors that are assigned to be processed on that particular hardware data channel is greater than zero, then the Descriptor Channel Block adds the new descriptor identified by the newly pushed or stored DMEM location in the FIFO register to the active list of that particular hardware data channel. The Descriptor Channel Block adds the new descriptor to the active list by transmitting instructions to the DMAD to write the DMEM location of the new descriptor to the Link Address field of the last descriptor that was added to that particular hardware data channel.

The Descriptor Channel Block begins processing a descriptor by storing the DMEM location of the descriptor into a register that has been designated as the register from which the Descriptor Channel Block is designed to read from and start processing the next available descriptor, referred herein as the Next Descriptor to Read register. If the active list is empty, then the Descriptor Channel Block stores the DMEM location from the FIFO register into the Next Descriptor to Read register. If the active list is not empty, then the Descriptor Channel Block adds the descriptor, stored at the DMEM location from the FIFO register, to the end of the active list by updating the Link Address field value of the descriptor previously at the end of the active list to contain the DMEM location value from the FIFO register.

In an embodiment, a register, described herein as the Last Descriptor List register, accessible by the Descriptor Channel Block comprises the DMEM location of the descriptor that is currently at the end of the active list. The Descriptor Channel Block adds a new descriptor to the active list by storing or writing the DMEM location from the FIFO register as the value of the Link Address field of the descriptor currently at the end of the list and storing the DMEM location value from the FIFO register in the Last Descriptor List register. The Descriptor Channel Block then traverses through the active list using the Link Address attribute of the descriptor that is currently being processed.

Once the DMEM location of a Descriptor is stored in the Next Descriptor to Read register, the Descriptor Channel Block, using the DMEM location stored in the register, retrieves the data of the descriptor available at that DMEM location from the DMEM. The Descriptor Channel Block transmits a request to read data from DMEM to the DMEM Interface Block of the DMAD. The request to read data includes the DMEM location of the descriptor. In an embodiment, the request to read data also specifies a number of bytes to read. In an embodiment the number of bytes to read equals the number of bytes that make up the entire descriptor or the total size of the descriptor. In an embodiment, the total size of a descriptor is 16 bytes. The DMEM Interface Block retrieves data from DMEM using the specified DMEM location and forwards the data to the Descriptor Channel Block. The Descriptor Channel Block decodes the descriptor data including, but not limited to, determining the type of the descriptor. The Descriptor Channel Block determines the type of the descriptor and processes the descriptor based at least on the type of the descriptor.

Descriptor Types

According to an embodiment, there are at least three types of descriptors, which are data descriptors, control descriptors, auxiliary descriptors. The type of the descriptor is indicated by a descriptor type field within the descriptor data. There are multiple variations within each type of descriptor. Data descriptors specify how Data Movement System moves data from one memory location to another memory location, and the data is transformed during movement.

Control descriptors provide information for looping through one or more descriptors more than once. Additional control descriptors include (1) descriptors that may be used to program certain configurations within the data movement system, referred to herein as program descriptors, (2) descriptors that may be used to control event registers in the data movement, referred to herein as event descriptors, and (3) descriptors that may assist with partitioning of tabular data, referred to herein as hash and range engine (HARE) descriptors.

Auxiliary descriptors provide information that assist in the processing of another descriptor. For example, the auxiliary descriptor may be used to provide additional control information if the size of the required control information exceeds more than the maximum size allowed for the control information.

Data descriptors, auxiliary descriptors and control descriptors that affect registers or control state in the Direct Memory Access Complex (DMAC) 140 are forwarded to DMAC. Control descriptors that affect the registers in a DMAD, that indicate loop mechanisms of one or more descriptors, or other control descriptors that do not need to be sent to DMAC, or that affect registers designed to store data corresponding to wait for events are further processed by the Descriptor Channel Block.

Direct Memory Access X-Bar (Cross-Bar)

Descriptors are forwarded to DMAC by forwarding the data of the descriptors to Direct Memory Access Cross(X)-Bar (DMAX) 110*a*, 110*d*. DMAX comprises electronic circuits that are configured to control and route data flow from a DMAD to a DMAC and from the DMAC to the DMAD. In an embodiment, the electronic circuits of a DMAX may be grouped into 3 groups. One group of electronic circuits may be designed to transmit all control information of descriptors from the DMAD to the DMAC, while another group of electronic circuits may be designed to transmit, from the DMAD to the DMAC all data corresponding to a response of a read request from the DMAC to the DMAD to read data from the DMEM. The third group of electronic circuits may be designed to transmit a read request from DMAC to DMAD to read data from the DMEM. Additionally, the third group of electronic circuits may be designed to transmit all descriptors return paths from the DMAC to the DMAD, wherein each descriptor return path comprises identifiers associated with a descriptor that indicate the DMAD to which the descriptor belongs to, the descriptor channel block within that DMAD that processed the descriptor and an identifier of that descriptor.

For example, DMAX 110*a* comprises an arbitration unit, such as the arbitration unit 112*a* and a FIFO register 112*b* for transmitting data from DMAD 106*a* to DMAC 140. In an embodiment, data includes control information of a descriptor which may be used by the arbitration unit 112*a* in selecting one of the input data paths and transmitting data including the control information into the FIFO register 112*b*. Similarly, DMAX 110*a* comprises FIFO register 114*b* and routing unit 114*a* to transmit data from the DMAC to the DMAD. In an embodiment, data transmitted from the DMAC may comprise control information such that routing unit 114*a* selects the data path for the target DMAD to transmit the data. DMAX 110*a* also comprises another arbitration unit 113*a* and a FIFO register 113*b* for transmitting data to be copied from DMEM to an external storage memory.

DMAX 110*d* comprises arbitration units 112*g* and 113*g* and routing unit 114*g* that provide the same functionality and perform the same functions as arbitration units 112*a* and 113*a* and routing unit 114*a*, respectively. DMAX 110*d* also comprises FIFO registers 112*h*, 113*h* and 114*h* that provide the same functionality and perform the same functions as 112*b*, 113*b*, 114*b* respectively.

Direct Memory Access Complex (DMAC)—Write Descriptor Parser

DMAC 140 comprises a write descriptor arbitration unit 120*a*, and the output of the write descriptor arbitration unit 120*a* is stored in the write descriptor parser logic block 120*b*. Write descriptor parser logic block 120*b* comprises one or more registers. Electronic circuits of write descriptor parser logic block 120*b* are designed to accumulate descriptor data and control information transmitted from a DMAX. In an embodiment, descriptor data from the DMAX may be transmitted in fragments, and electronic circuits of write descriptor parser logic block 120b may accumulate the various descriptor fields and reassemble the descriptor fields to form the complete descriptor data. Write descriptor parser logic block 120b determines the descriptor type of the descriptor and performs operations based on the descriptor type and the control information provided by the originating DMAD.

In response to determining that the descriptor is a data descriptor and in particular a write descriptor, write descriptor parser logic block 120b may modify the source address specified in the descriptor data using a source counter value provided by the originating DMAD. Additionally, write descriptor parser logic block 120b may also modify the destination address using a destination counter value provided by the originating DMAD. Write descriptor parser logic block 120b also transmits a data movement operation and the descriptor data to an appropriate data movement engine such as a DMEM load engine.

If the descriptor type is an auxiliary type descriptor, then write descriptor parser logic block 120b may update a local auxiliary data holding register and return the descriptor back to the originating DMAD. If the descriptor type is a program or control type descriptor, then write descriptor parser logic block 120b may store DMAC configuration data specified within the descriptor in the DMAC configuration register specified in the descriptor, and return the descriptor back to the originating DMAD.

Direct Memory Access Complex (DMAC)—Read Descriptor Parser

DMAC 140 also comprises a read descriptor arbitration unit 121a, and the output of the read descriptor arbitration unit 121a is read descriptor parser logic block 121b. Read descriptor parser logic block 121b comprises one or more registers. Electronic circuits of read descriptor parser logic block 121b are designed to accumulate descriptor data and control information transmitted from a DMAX. In an embodiment, descriptor data from a DMAX may be transmitted in fragments, and electronic circuits of read descriptor parser logic block 121b may accumulate the various descriptor fields and reassemble the descriptor fields to form the complete descriptor data. Read descriptor parser logic block 121b determines the descriptor type of the descriptor and performs operations based on the descriptor type and the control information provided by the origination DMAD.

In response to determining that the descriptor is a data descriptor and in particular a read descriptor, read descriptor parser logic block 121b may modify the source address specified in the descriptor data using a source counter value provided by the originating DMAD. Additionally, read descriptor parser logic block 121b may also modify the destination address using a destination counter value provided by the originating DMAD. Read descriptor parser logic block 121b also transmits a data movement operation and the descriptor data to an appropriate data movement engine such as a DDR load engine.

Similar to write descriptor parser logic block 120b, if the descriptor type is an auxiliary type descriptor, then read descriptor parser logic block 121b may update a local auxiliary data holding register and return the descriptor back to the originating DMAD. If the descriptor type is a program or control type descriptor, then read descriptor parser logic block 121b may store DMAC configuration data specified within the descriptor in the DMAC configuration register specified in the descriptor, and return the descriptor back to the originating DMAD.

Direct Memory Access Complex (DMAC)—Data Movement Engines

DMAC 140 comprises data movement engines 130a, 130b, 130c, 130d. Each of the data movement engines 130a, 130b, 130c, 130d, comprise one or more DMEM load engines and one or more DDR load engines. Each of the data movement engines 130a, 130b, 130c, 130d also comprise one or more DMEM store engine and one or more DDR store engines. Each data movement engine receives operations from write descriptor parser logic block 120b, and read descriptor parser logic block 121b. Data movement engines 130a, 130b, 130c, 130d execute these operations by copying data from the specified source memory and storing data in the specified destination memory. Each data movement engine also uses control information provided by the descriptor parser logic block to their execute operations.

Data movement engines 130a, 130b, 130c, 130d generate read requests to the specified source memory. Data movement engines 130a, 130b, 130c, 130d accumulate data transmitted to the data movement engine in response to the read request, and then generate write requests to the specified destination memory. In an embodiment, a buffering process is implemented such that data transmitted to data movement engines may be stored in a register block accessible by the data movement engines. Data movement engines begin processing data transmitted in response to the read request without waiting for the requested data to be available.

Electronic circuits of system bus interface master block 123 are designed to the receive read and write requests from the data movement engines 130a, 130b, 130c, 130d and translate them into system bus interface read requests and system bus interface write requests for memory units external to the data movement system, such as main memory or another memory unit. Electronic circuits of system bus interface master block 123 transmits data it receives in response to system bus interface read requests to the data movement engine that transmitted the read request. In an embodiment the system bus interface is AXI (Advanced Extensible Interface) and system bus interface master block 123 is an AXI master block.

Descriptor return block 125 is designed to return descriptors processed by write descriptor parser logic block 120b, read descriptor parser logic block 121b, and data movement engines 130a, 130b, 130c, 130d, to their originating DMAD.

DMS memory 150 comprises memory that various components of DMAC 140 may read from or write to. In general, DMS memory 150 is used to store data used by or generated by operations performed by the DMAC 140.

Supplemental Operation Engines 126 is representative of blocks of logic, each block performing a specific kind of operation on columns stored in DMS memory 150. For example, Supplemental Operation Engines 126 may include a partition engine that partitions tuples stored in one or more columns stored in DMS memory 150 among core processors in the data movement system. Such partitioning may include generating for each tuple an identifier identifying a co-processor to which the tuple is assigned by partitioning.

In addition, Supplemental Operation Engines 126 may include a hash engine. The hash engine generates hash values for one or more columns stored in DMS memory 150. Another example of an engine that may be included is a copy engine. The copy engine copies data between memory locations within DMS memory 150.

Moving Data and Performing Data Manipulation Operations Using Descriptors

Figure 2:
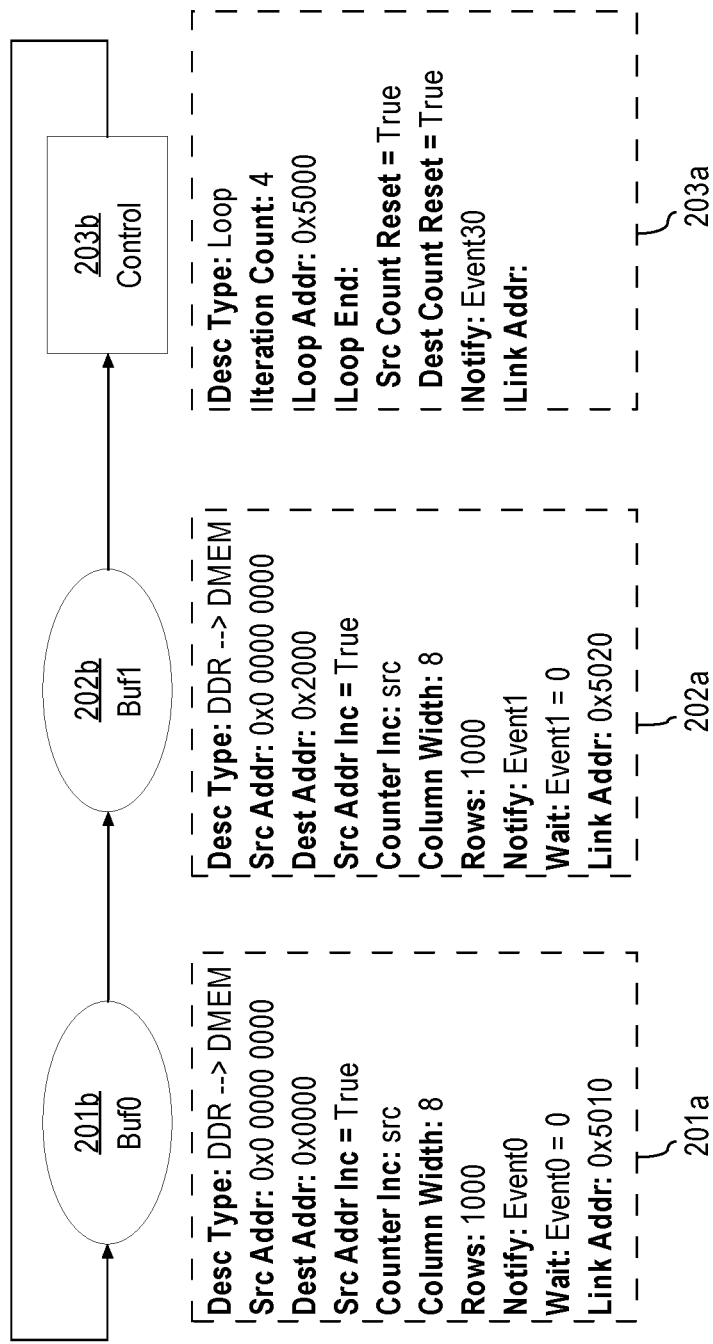
FIG. 2 illustrates an example of descriptors to move data from a source memory location to a destination memory location according to an embodiment of the present invention.

FIG. 2 illustrates an example method of moving data from a source memory location to a destination memory location using descriptors. FIG. 2 comprises three descriptors, 201*a*, 202*a*, 203*a*. Elements 201*b*, 202*b* and 203*b* each correspond to operations performed for descriptors 201*a*, 202*a*, 203*a*, respectively. The purposes of these elements is depict the order of operations performed for descriptors 201*a*, 202*a*, 203*a*.

FIG. 2 depicts a movement of ten thousand rows of data from a source memory location to a target memory location. In this example the source memory location is a double data rate synchronous dynamic random-access memory (DDR) and the target memory location is the DMEM connected to the core processor that programmed the descriptor, 102*a* and 103*a* respectively. In the example depicted in FIG. 2, descriptors 201*a*, 202*a*, 203*a* are programmed by core processor 103*a*.

Decoding Descriptor Data

Descriptors 201*a* and 202*a* are data descriptors. The descriptor type field of the descriptors indicates that descriptors 201*a* and 202*a* are data descriptors. In an embodiment, binary numbers may be used to depict each descriptor type and direction in which the data is to be moved. For example, binary number 0000 may be encoded in the electronic circuits of the descriptor channel block of the DMAD that is processing the descriptors to represent data movement from DDR memory to DMEM memory or DMEM. Similarly, data movement from DMEM to DDR memory may be represented by binary number 0001. For descriptors 201*a* and 202*a*, data is to be moved from DDR memory to DMS memory or DMEM memory. Therefore, descriptor type field of descriptor 201*a*, 202*a* indicate the appropriate field value. The value of the "Desc Type" field shown in FIGS. 201*a* and 202*a* is only for providing a clear illustrative example.

The core processor determines the source location of the source data along with the destination location of where the data is to be transmitted. The core processor also determines the number of rows that are to be processed at the source data location by a descriptor. In an embodiment, the core processor may be configured with a maximum number of rows that a descriptor is allowed to process. Such threshold limitation may be dynamically determined based on the size of DMEM or the available storage space in DMEM.

In FIG. 2, since the total number of rows of data that are to be processed is at least ten thousand rows, the core processor also programs a control descriptor that allows a DMAD to utilize the same descriptor numerous times. In other words the control descriptor allows electronic circuits of the DMAD to implement a loop mechanism until some condition within the control descriptor is not satisfied. Control descriptors that allow the DMAD to implement such a loop mechanism will be referred to herein as loop descriptors.

In an embodiment, a core processor may also be configured to utilize multiple buffers in the DMEM to store data from the source data location. Utilization of multiple buffers allows for the core processor to access the data stored in the DMEM faster and consequently process that data faster than using a single buffer because it allows the core processor to access data stored in one buffer while the data movement system is moving or storing data in the other buffers. The flexibility of specifying different destination memory locations in different descriptors allows for the utilization of multiple buffers.

As described herein, a buffer is said to be associated with a descriptor if the destination memory location specified in the descriptor is the starting memory location of the buffer. Each descriptor may represent only a fraction of the total number of rows of a column of tabular data that is being moved into a DMEM unit. Thus the buffer associated with a particular descriptor stores the fraction of the total number of rows of the column of tabular data and the core processor may begin processing the rows stored in the buffer without waiting for remaining number of rows of the column of tabular data being moved or stored into their respective buffers.

Additionally, the overhead costs from interrupt routines and interrupt handlers in switching control between the hardware components of the data movement system and the software executing on the core processor may be reduced by utilizing wait-for-events. The core processor may be configured to assign a particular event to a particular buffer in the DMEM and the values of the particular event will determine whether the hardware components of the data movement system will have access to the particular buffer or whether the software executing on the core processor will have access to the particular buffer.

In FIG. 2, descriptor 201*a* is assigned Event0. Based on the configuration, core processor 103*a* may either set Event0 to a value of 1 or 0 in order to allow the hardware components of the DMAD to process the descriptor. For example, if the electronic circuits of the DMAD 106*a* have been designed to begin the processing of the descriptor only if Event0 is set to be zero, then core processor 103*a* will set the Event0 value to 0 after core processor 103*a* programs the descriptor. Core processor 103*a* does not access that particular buffer until the value of Event0 is set to one. DMAD 106*a* will set the value of Event0 to 1 when the Buffer0 201*b* is full.

In FIG. 2, within the DMEM unit 102*a*, the data is being stored in two buffers, one at address 0x0000 and another at address 0x2000. As described above, using at least two buffers enables faster processing of data. Once the DMAD 106*a* and other hardware components of data movement system begin processing descriptor 201*a*, data associated with that descriptor will be stored in Buffer0 at address 0x0000 of DMEM unit 102*a*. Once Buffer0 has been filled with data, DMAD 106*a* will set the Event0 value to 1, which will indicate to core processor 103*a* that Buffer0 is ready to be accessed and data in Buffer0 is ready to be processed. After the processing of descriptor 201*a* is completed the first time, DMAD 106*a* and other hardware components of the data movement system will begin processing descriptor 202*a*. While the hardware components of the data movement system begin processing descriptor 202*a*, core processor 103*a* will be processing data from Buffer0. Therefore, using two data buffers allows for processing data records on a subset of data records without waiting for the entire set of data records to be retrieved first. Thus, reducing processing time and increasing processing speed.

In FIG. 2, descriptor 201*a* will be the first descriptor to be pushed on to one of the two hardware data channels of DMAD 106*a* and it will be the first descriptor among descriptors 201*a*, 202*a*, 203*a* to be processed. Descriptor 202*a* will be processed after descriptor 201*a* has begun processing and then descriptor 203*a* will be the last descriptor among the three descriptors to be processed, and descriptor 203a will be processed after descriptor 202a has begun processing. The core processor stores a descriptor in DMEM after programming the descriptor and in FIG. 2 core processor 103a stores descriptor 201a at address 0x5000, descriptor 202a at address 0x5010 and descriptor 203a at address 0x5020 of DMEM or DMEM unit 102a.

In FIG. 2, the "Src Addr" of descriptors 201a and 202a indicates the starting location of the column of data within the source memory where the tabular data is stored. "Dest Addr" of descriptors 201a and 202a indicates the location in DMEM where the data from the source memory will be stored. "Column Width" indicates the size of the data in the column of data in bytes and "Rows" indicates the number of rows that will be processed each time the data movement system is processing the descriptor 201a or 202a. A descriptor may comprise a "Src Auto Inc Allow" field, wherein the "Src Auto Inc Allow" field indicates to a descriptor parser logic block within the DMAC to modify the source address based on values of one or more other fields within the descriptor. In an embodiment, the one or more other fields within the descriptor include, the "Counter Inc" field, the "Column Width" field and the "Rows" field of the descriptor. The descriptor parser logic block may modify the source address specified in the descriptor using the source address specified in the descriptor as a starting point or a base source address and adding an offset value to the base source address, wherein the offset value is determined by the descriptor parser logic block based on the values of the source counter, the width of the column of tabular data that is being moved or copied from the source address specified in the descriptor and the number of rows of the column of tabular data that is being moved or copied from the source address specified in the descriptor.

As described above, the "Column Width" field of the descriptor specifies the width of the column of the tabular data and the "Rows" field of the descriptor specifies the number of rows of the column of tabular data. The value of the source counter may be read or retrieved from a register comprising the source counter. In some embodiments, the "Counter Inc" field of a descriptor specifies the register that comprises the source counter value. In some embodiments, the "Counter Inc" field indicates that the counter value that should be considered or used is the source counter value and the descriptor channel block is configured to retrieve the value stored in a particular register that comprises the source counter value. In some embodiments, the descriptor channel block is designed to retrieve a source counter value from a particular register that has been designated to store source counter value.

The value of the"Src Addr Inc" field determines whether or not a counter specified by the "Counter Inc" field should be incremented. In an embodiment, if the "Src Addr Inc" field is set then the counter specified by the "Counter Inc" field is incremented by a descriptor channel block processing the descriptor, and if the "Src Addr Inc" field is not set then the counter specified by the "Counter Inc" field is not incremented. In an embodiment, the descriptor channel block that is processing the descriptor increments the value of the counter specified by the "Counter Inc" field of a source counter associated with a descriptor channel block by the descriptor channel block.

In FIG. 2, the "Counter Inc" field of descriptor 201a specifies that the counter is the source counter of the descriptor channel block processing descriptor 201a, which in FIG. 2, as described above, is descriptor channel block 108a. The "Src Addr Inc" field of descriptor 201a triggers the incrementing of the counter value specified by the "Counter Inc" field by the descriptor channel block 108a. The descriptor channel block 108a increments the value of the counter specified by the "Counter Inc" field after the descriptor channel block has transmitted the control information of descriptor 201a to the DMAX associated with the DMAD of the descriptor channel block 108a.

"Link Addr" field helps the electronic circuits within a descriptor channel block of a DMAD maintain a variety of data structure in hardware. "Link Addr" field identifies the DMEM location where the next descriptor that the descriptor channel block must process is stored. Additionally the "Link Addr" field is not programmed by the software, instead the electronic circuits of the descriptor channel block, as described below, will determine the memory location of the next descriptor that should be processed and store the value of that memory location in the "Link Addr" field.

Loop address field of a control descriptor, specifically a loop descriptor, allows the electronic circuits within a descriptor channel block of a DMAD to implement the loop mechanism. In FIG. 2 the "Loop Addr" field of descriptor 203a contains the memory address value of descriptor 201a, thereby causing the descriptor channel block of the DMAD to reprocess descriptor 201a. After reprocessing descriptor 201a, the descriptor channel block of the DMAD will process the descriptor of the memory address stored in the "Link Addr" field of descriptor 201a, which means the descriptor channel block will reprocess descriptor 202a. Thus, the descriptor channel block will continue to reprocess all the descriptors until the loop condition is satisfied. The loop condition in descriptor 203a is specified by "Iteration Count". In FIG. 2 the loop condition is satisfied when the iteration count equals zero.

A descriptor channel block stores the iteration count specified in a loop descriptor in a particular register designated for storing iteration count values. Each time the descriptor channel block processes the loop descriptor, the descriptor channel block reads or retrieves the iteration count value from the particular register and determines whether it is zero or not. If the iteration count value is not zero, then the descriptor channel block processes the loop descriptor, decrements the iteration count value in the particular register by one, and, as described above, reprocesses all the descriptors linked with the loop descriptor. In FIG. 2, descriptor channel block 108a stores the iteration count value of descriptor 203a in a register and every time descriptor channel block 108a processes descriptor 203a, descriptor channel block 108a retrieves the iteration count value stored in the register and determines whether the iteration count value is zero or not. If the iteration count value is not zero, then descriptor channel block 108a processes descriptor 203a, decrements the iteration count value in the register, and begins reprocessing descriptor 201a. Therefore, each descriptor in FIG. 2 will be processed 5 times.

Processing of Descriptors by DMAD

Once the descriptors 201a, 202a, 203a are programmed and stored in DMEM at addresses 0x5000, 0x5010 and 0x5020, respectively, core processor 103a pushes the DMEM addresses of descriptors 201a, 202a, 203a into a FIFO register accessible by DMAD 106a. In an embodiment a core processor also indicates a particular hardware data channel of a descriptor channel block of the DMAD that a descriptor should be pushed onto. The descriptor channel block of the DMAD will either add the descriptors to an existing list maintained by the descriptor channel block or build a new list. In building or adding to the list, the descriptor channel block of the DMAD will write the second memory address pushed on to the FIFO register to the descriptor's link address field of the first descriptor put on the list.

For example, in FIG. 2, memory addresses of descriptors 201a, 202a, 203a are pushed on to a FIFO register accessible by core processor 103a and DMAD 106a. The memory address of descriptor 201a is pushed in first, then the memory address of 202a is pushed in, and then the memory address of 203a is pushed in. As described above, each descriptor channel block of a DMAD maintains two lists per hardware data channel, an active list and a free list. Descriptor channel block 108a determines whether the active list of the hardware data channel onto which the memory addresses of descriptors 201a, 202a, 203a were pushed is empty. In an embodiment, a descriptor channel block may determine whether a list is empty based on a counter associated with the list. Descriptor channel block 108a determines whether the active list is empty based on whether a counter associated with that active list is zero.

The descriptor channel block 108a adds to the active list by writing or copying the memory address of descriptor 202a into the link address field of descriptor 201a and the memory address of descriptor 203a into the link address field of descriptor 202a. If the active list of the hardware data channel controlled by descriptor channel block 108a is not empty, then descriptor channel block 108a writes or copies the memory address of descriptor 201a into the link address field of the last descriptor that was pushed onto that particular hardware data channel, before descriptor 201a. If the active list of the hardware data channel is empty, then descriptor channel block 108a copies the memory address of descriptor 201a from the FIFO register to a register designated to store the next descriptor that will be processed.

Descriptor channel block 108a retrieves the descriptor data of descriptor 201a from the DMEM using the memory address of descriptor 201a. Descriptor channel block 108a determines whether a wait condition needs to be satisfied by checking the WAIT field of the descriptor. In FIG. 2, a WAIT condition is required to be satisfied and is controlled by the value of Event0. Descriptor channel block 108a determines whether the wait condition is satisfied by determining the value of Event0. In an embodiment, a descriptor channel block may determine the value of an event by checking a register comprising values of all events that the descriptor channel block may use or is programmed to use. A WAIT condition is satisfied if the event specified by the WAIT field is at the specified WAIT value. Once, the WAIT condition is satisfied, a descriptor channel block does not have to wait any longer to process the descriptor.

In response to determining that the WAIT condition is satisfied, descriptor channel block 108a continues with the processing of the descriptor and determines the type of the descriptor. In an embodiment, the descriptor channel block determines the type of the descriptor based on an encoded value in the "Desc Type" field. In FIG. 2, descriptor 201a is a read descriptor where the source memory is the DDR memory and the destination memory is the DMEM local to core processor 103a or DMEM unit 102a. Descriptor channel block 108a transmits the control information of descriptor 201a, including the value for the "Src Auto Inc Allow" field, the source counter value, since the "Src Auto Inc Allow" field value is set, and any other information that may be needed to perform any of the operations specified in the descriptor to the read descriptor interface of DMAD 106a. In an embodiment, descriptor channel block 108a may transmit fragments of the control information of a descriptor and any other data needed to perform any of the other operations specified in the descriptor to the read descriptor interface of DMAD 106a. The size of each of the fragments depends on the width of the bus interface connecting descriptor channel block 108a with the read descriptor interface of DMAD 106a. Descriptor channel block 108a also determines whether the source address specified in the descriptor needs to be adjusted or modified based on the "Src Auto Inc Allow" field.

A descriptor channel block may use one or more values of the fields of the descriptor to determine whether or not the source address needs to be automatically adjusted or modified. In FIG. 2 descriptor channel block 108a determines that the source address needs to be automatically adjusted or modified based on the value of the "Src Auto Inc Allow" field. Descriptor channel block 108a also determines whether the value of the counter specified in the "Counter Inc" field should be incremented based on the value of the "Src Addr Inc" field. The counter specified by the "Counter Inc" field of descriptor 201a is the "src" counter. Thus, descriptor channel block 108a also transmits to the read interface of DMAD 106a, the counter value of the "src" counter. Each hardware data channel is associated with a particular counter used in adjusting or modifying a source address, which is stored in a register and a managed by the descriptor channel block controlling the hardware data channel. The "src" counter in example of FIG. 2 is the counter associated with the hardware data channel controlled by descriptor channel block 108a. In FIG. 2, the "src" counter value is zero the first time it is transmitted. Descriptor channel block 108a, after transmitting the value of the "src" counter to the read descriptor interface of DMAD 106a, increments the value of "src" counter by 1.

A descriptor channel block is also associated with a destination counter value. The destination counter value is incremented in a similar manner as the source counter value, except that the value of the "Dest Addr Inc" field determines whether the destination counter will be incremented and the value of the "Dest Auto Inc Allow" field determines whether the destination address specified in the descriptor should be modified by an offset value. The "Counter Inc" field will specify or indicate the destination counter associated with the descriptor channel block.

Processing of Descriptor by DMAX

Descriptor 201a data is transmitted to the arbitration unit 112a and then stored in the FIFO register 112b. FIFO register 112b then transmits the data to read descriptor parser logic block 121b and then into a register within the read descriptor parser logic block 121b. In an embodiment, if descriptor data is transmitted in fragments, then a descriptor parser logic block reassembles the descriptor data.

Processing of Descriptor by DMAC

Descriptor read descriptor parser logic block 121b determines whether the source address specified in the descriptor data should be adjusted based on a value corresponding to an auto increment of source address field. In FIG. 2, "Src Auto Inc Allow" is such a field and based on the value of that field, read descriptor parser logic block 121b determines that the source address should be automatically adjusted or modified. In an embodiment, source address may be automatically adjusted or modified according to the following formula:

New Source Address=source address+source address counter value*rows*column width(size in bytes)

The source address above is the source address transmitted in the descriptor data. The counter value is the value of the counter that was transmitted along with the descriptor data, which in example of FIG. 2 is zero. The rows are the number of rows specified in the descriptor data and column width is the size of the column in bits. Therefore, plugging corresponding values into the above formula results in:

=0x0 0000 0000+0*1000*8

=0x0 0000 0000

The New Source Address above is the same as the source address specified in the descriptor data since the value of the counter that helps determine the offset from the source address is zero. This is an accurate result because descriptor 201a represents the first 1000 rows of the 10,000 rows of data that are required to be processed in FIG. 2, therefore, an offset from the initially specified address is not required. Read descriptor parser logic block 121b transmits the control information of descriptor 201a and any other data required to perform any operations specified in descriptor 201a to an appropriate load engine block of data movement engine 130a based on the direction of the data movement indicated in the descriptor type field of a descriptor. In FIG. 2, the descriptor type field, "Desc Type", indicates that the data movement is from DDR to DMEM, therefore, the appropriate load engine block to which the control information of descriptor 201a and any other data required to perform any operations specified in descriptor 201a is transmitted is a DDR load engine block of data movement engine 130a.

The appropriate load engine block of a data movement engine determines the type of the source memory specified in the descriptor data and generates a read request based on the type of source memory. In FIG. 2, in response to determining that the source memory is DDR memory, the DDR load engine block of data movement engine 130a generates a read request to the system bus interface master block 123. In an embodiment, the amount of data requested in a read request may have a maximum threshold, and the number of read requests generated by an appropriate load engine block of a data movement engine may be based partly on the maximum threshold on the amount data that can be requested within one read request and the amount of data that a descriptor is requesting for in iteration of its processing. For example, if the maximum threshold is 256 bytes, then the appropriate load engine block of data movement engine 130a will generate 32 read requests to satisfy the 8000 bytes of data requested by descriptor 201a.

System bus interface master block 123 accepts the read requests and transmits the read requests to the appropriate memory unit interface that can accept the requests. In response to the requests, data corresponding to the read requests are returned to the system bus interface master block 123. Data corresponding to the read requests is transmitted from the system bus interface master block 123 to the appropriate load engine of the data movement engine that initiated the read requests. The appropriate load engine of the data movement engine transmits the data to an appropriate storage block unit within the data movement engine based on the destination memory unit indicated in the descriptor type field of the descriptor. In the example of FIG. 2, system bus interface master block 123 transmits the data to the DDR load engine of data movement engine 130a, and the DDR load engine transmits the data to the DMEM storage block unit within data movement engine 130a. DMEM storage block unit within data movement engine 130a transmits the data and control information of the descriptor to FIFO register 114b within DMAX 110a along with the destination address specified in descriptor 201a and an identifier associated with core processor 103a. FIFO register 114b identifies, using the core processor identifier included in the control information transmitted to FIFO register 114b from the DMEM storage block unit, DMEM unit 102a as the DMEM unit associated with the core processor identifier, and transmits data from write interface 114a to DMEM unit 102a via DMEM interface block 107a within DMAD 106a to store the data at the destination address specified in the descriptor.

Transmission of Tabular Data to Destination Memory

After transmitting data to FIFO register 114b, the DMEM store unit in data movement engine 130a transmits the descriptor return path of descriptor 201a to descriptor return block in DMAC 140, wherein descriptor return path of a descriptor includes a DMAD identifier, a descriptor channel block identifier and a descriptor identifier associated with the descriptor. Descriptor return block in DMAC 140 transmits the descriptor return path of descriptor 201a to a returned descriptor FIFO register within FIFO register 114b. FIFO register 114b transmits the descriptor return path of descriptor 201a to descriptor channel block 108a in DMAD 106a. Descriptor channel block 108a sets the notify event to signal to the core processor 103a that data requested by descriptor 201a is ready to be processed. In FIG. 2, the notify event is identified by the "Notify" field of descriptor 201a, and is Event0.

Descriptor Return Path

Prior to processing a descriptor, a descriptor channel block determines whether there are any free or available descriptor identifiers that can be associated with the descriptor. If the descriptor channel block determines that no descriptor identifiers are available, then the descriptor channel block waits until a descriptor identifier is available. In an embodiment, one or more registers comprise all free descriptor identifiers. Once a descriptor identifier is available, the descriptor channel block begins processing a descriptor and associates the available descriptor identifier with the descriptor. In some embodiments the descriptor identifier may be a 2 bit identifier, therefore, each descriptor channel block within a DMAD may process and support up to four different descriptors at a time. The descriptor identifier associated with the descriptor is included within the control information of that descriptor and transmitted to the DMAC.

Additionally, the descriptor channel block includes its own identifier within the control information transmitted to the DMAC. In some embodiments, the descriptor channel block identifier is a one bit identifier. For example a value of zero in that bit identifies one descriptor channel block of a DMAD and a value of one in that bit identifies the other descriptor channel block of the DMAD. Descriptor channel block also includes a DMAD identifier associated with the DMAD within which the descriptor channel block resides. In some embodiments, the DMAD identifier may be 5 bits.

The descriptor identifier, the descriptor channel block identifier and the DMAD identifier is collectively referred to herein as the descriptor return path. In some embodiments, the identifier associated with the descriptor may be a sequence of bits, and different subsets of the sequence of bits correspond to the descriptor identifier, the descriptor channel block identifier, and the DMAD identifier. For example, the identifier associated with the descriptor may be a sequence of 8 bits, where the five most significant bits correspond to the DMAD identifier, the next bit corresponds to the descriptor channel block identifier and the least significant two bits correspond to the descriptor identifier.

Once the DMAC completes processing all the operations necessary to satisfy the data requests specified in a descriptor, then the DMAC configures a descriptor return path for that descriptor. The descriptor return path of that descriptor includes the DMAD identifier, the descriptor channel block identifier and the descriptor identifier associated with the descriptor and included in the control information of that descriptor. The DMAC transmits the descriptor return to its originating DMAD via the DMAX associated with the originating DMAD. A routing unit within the DMAX associated with the originating DMAD determines the originating DMAD based on the DMAD identifier included in the descriptor return path and transmits the descriptor return path to the descriptor return interface block of the originating DMAD.

The descriptor return interface block of the originating DMAD determines the descriptor channel block that processed that descriptor based on the descriptor channel block identifier and transmits the descriptor return path to the descriptor channel block that processed that descriptor. The descriptor channel block that processed that descriptor determines, based on the descriptor identifier, the DMEM location of that descriptor. In an embodiment, the association between a DMEM location of a descriptor and the descriptor identifier associated with the descriptor is stored in a lookup table by the descriptor channel block that processed the descriptor.

Descriptor channel block 108a determines whether the loop count is zero, and if the loop count is zero, the descriptor channel block 108a determines whether descriptor 201a will be added to the free list of the hardware data channel controlled by descriptor channel block 108a. In an embodiment, the descriptor channel block 108a may determine whether or not a descriptor will be added to the free list based on whether data of the descriptor indicates that the particular descriptor should be added to the free list. For example, there may be a free push field within the data of the descriptor that may have a value of 1 or 0 to indicate that the particular descriptor should be added to the free list. Additionally, if the loop count is zero, then the descriptor channel block 108a also decrements the active count value of that channel by 1. If the loop count is not zero, then descriptor channel block 108a terminates the processing of descriptor 201a for this particular iteration.

Traversing the Hardware Managed List

After descriptor channel block 108a transmits descriptor 201a data to arbitration unit 112a, descriptor channel block 108a determines DMEM unit 102a address of the next descriptor within the active list of the descriptor channel block based on the link address field within the data of descriptor 201a. Descriptor channel block 108a retrieves data of descriptor 202a from DMEM 102a address 0x5010. Descriptor channel block 108a processes descriptor 202a similarly to how descriptor 201a is processed and transmits descriptor 202a data to arbitration unit 112a along with the "src" counter value, as indicated by descriptor 202a. The "src" counter value, when transmitted with the data of 202a, is 1. After descriptor 202a data is transmitted to arbitration unit 112a, descriptor channel block 108a increments "src" counter value by 1. Thus, the "src" counter value is now 2.

Descriptor 202a control information and the "src" counter value transmitted along with descriptor 202a data is stored in FIFO register 112b and then transmitted to read descriptor arbitration unit 121a and stored in read descriptor parser logic block 121b. Read descriptor parser logic block 121b again determines, similar to the way described above, that the source address specified in the descriptor data should be adjusted or auto incremented. Read descriptor parser logic block may adjust or modify the source address according to the same formula described above, which is:

New Source Address=source address+source counter value*rows*column width(size in bytes)

The source address above is the source address transmitted in descriptor 202a data. The counter value is the value of the counter that was transmitted along with descriptor 202a data, which is 1. The rows are the number of rows specified in descriptor 202a data and column width is the size of the column in bytes. Therefore, plugging the corresponding values into the above formula results in:

=0x0 0000 0000+1*1000*8

=0x0 0000 1F40

The New Source Address is now 0x0 0000 1F40, wherein 1F40 is the hexadecimal value equivalent to 8000. This is an accurate result because descriptor 202a represents the second 1000 rows of the 10,000 rows of data that are required to be processed in FIG. 2, therefore, an offset from the initially specified address is required. Read descriptor parser logic block 121b transmits the descriptor data to the appropriate load engine block of data movement engine 130a. The appropriate load engine block of data movement engine 130a processes descriptor 202a data similar to the processing of descriptor 201a data. Data retrieved for descriptor 202a is stored in DMEM 102a at the destination memory address specified in descriptor 202a.

DMEM 102a address of descriptor 202a is transmitted from descriptor return block of DMAC 140 to descriptor channel block 108a of DMAD 106a similar to the way DMEM 102a address of descriptor 201a was transmitted above. Descriptor channel block 108a sets notify event to signal to the core processor 103a that data requested by descriptor 202a is ready to be processed. In FIG. 2, the notify event identified by the "Notify" field of descriptor 202a is Event1. Descriptor channel block 108a again determines whether the loop count is zero and if it is zero, then descriptor channel block 108a completes processing of descriptor similar to the way described above for descriptor 201a. If the loop count is not zero, then descriptor channel block 108a terminates the processing of descriptor 202a for this particular iteration.

Hardware Implemented Looping Mechanism

After descriptor channel block 108a transmits descriptor 202a data to arbitration unit 112a, descriptor channel block 108a determines DMEM 102a address of the next descriptor within the active list of the descriptor channel block based on the link address field of descriptor 202a. Descriptor channel block 108a retrieves data of descriptor 203a from DMEM 102a address 0x5020. Descriptor channel block 108a determines that descriptor 203a is a program or control type descriptor and in particular a loop type descriptor. Descriptor channel block 108a determines whether the loop count or iteration count is zero and if it is not zero, then descriptor channel block 108a decrements the loop count value by 1. As described above, the loop or iteration count is stored in a particular register designated for storing loop count values and the descriptor channel block retrieves the loop count value from the particular register and determines whether the loop count value is zero or not. If the loop count is not zero, then the descriptor channel block updates the loop count by decrementing the loop count value by 1 and stores the updated loop count value in the particular register. In FIG. 2, the iteration count value starts at 4, therefore, the first time descriptor 203a is processed, the loop or iteration count is 4 and after it is decremented by descriptor channel block 108a, the loop or iteration count will be 3.

In response to determining that the loop or iteration count is not zero, descriptor channel block 108a determines which descriptor it should loop back to and reprocess. Descriptor channel block 108a determines which descriptor it should loop back to based on descriptor 203a specifying a loop back address that identifies the DMEM address of the descriptor that should be processed again. In FIG. 2, the loop back address is specified in the "Loop Addr" field of descriptor 203a and DMEM 102a address of 0x5000 is the address of descriptor 201a within the DMEM 102a.

Descriptor channel block 108a retrieves descriptor 201a data from DMEM 102a. Descriptor channel block 108a determines whether the wait condition of descriptor 201a is satisfied based on value of event Event0. In FIG. 2, the wait condition of descriptor 201a is satisfied if Event0 value is 0. As described above, descriptor channel block 108a previously set the value of Event0 to 1 in order to indicate to core processor 103a that data is available for processing at the destination address specified by descriptor 201a. Therefore, if core processor 103a did not complete its processing of the data at the destination address specified by descriptor 201a, then the core processor will not clear Event0 to 0, hence descriptor channel block 108a must wait until the Event0 value is cleared to 0, i.e. set to 0.

If Event0 value is cleared to 0, then descriptor channel block 108a processes descriptor 201a similar to the way descriptor 201a was processed in the previous iteration, described above. Descriptor channel block 108a continues to traverse the active list of the hardware data channel and based on the link address data of descriptor 201a retrieves descriptor 202a data. Descriptor channel block 108a processes descriptor 202a similar to the way it was processed in the previous iteration. Descriptor channel block 108a continues to traverse the active list of the hardware data channel and based on the link address data of descriptor 202a retrieves data of descriptor 203a.

Descriptor channel block 108a again determines whether the loop count is 0. Loop count value is 3, therefore, descriptor channel block 108a decrements the loop count value by 1 and again loops back to descriptor 201a and processes descriptor 201a again. Descriptor channel block 108a continues to loop through the descriptors until the loop count value is 0. When the loop count value is 0, descriptor channel block 108a determines whether source or destination counters of the descriptor channel block 108a should be reset. In FIG. 2, descriptor 203a specifies, with "Src Count Reset" and "Dest Count Reset", fields that source and destination counters of hardware data channel must be reset.

Descriptor channel block 108a notifies core processor 103a that the loop has terminated or finished by setting the value of Event30 to 1 since Event30 is specified in descriptor 203a as the event that the core processor is configured to receive a notification from for descriptor 203a. Descriptor channel block 108a also decrements the active list count of the hardware data channel by 1. Processing of descriptor 203a is now complete and consequently processing of descriptors 201a and 202a. Thus, 10,000 rows of data from a source memory location have been processed by the data movement system.

Moving a Data Table Using Descriptors

Figure 3:
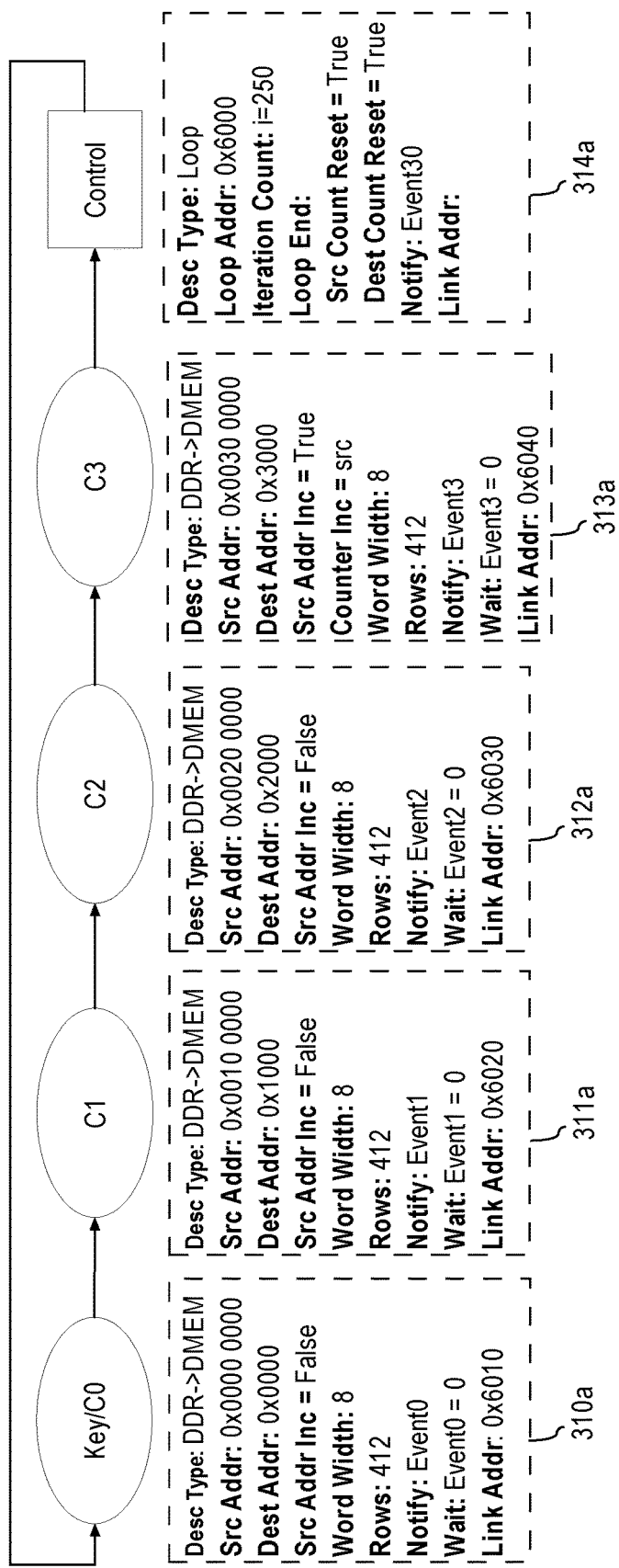
FIG. 3 illustrates an example of descriptors for moving data stored in tabular format.

FIG. 3 illustrates an example of moving an entire data table, comprising four columns, from a source memory to a local DMEM using descriptors. FIG. 3 comprises four data descriptors, 310a, 311a, 312a, 313a and one control descriptor 314a. Each descriptor represents a column of data of the data table stored in the source memory. Source memory in FIG. 3 is a DDR memory external to the data movement system. Destination memory in FIG. 3 is a DMEM, local to the core processor that programmed descriptors 310a, 311a, 312a, 313a. For the purpose of illustrating a clear example, FIG. 3 will be described using the hardware components and processes described in FIG. 1 and FIG. 2. For the purpose of illustrating a clear example, descriptors in FIG. 3 are also programmed by core processor 103a.

Descriptor 310a specifies the starting address of the first column of the data table in the source memory at the "Src Addr" field of descriptor 310a. Similarly, descriptors 311a, 312a, 313a, specify starting addresses of the second, third and fourth columns of the data table in the source memory as their respective source addresses. Within the "Dest Addr" field, Each of the descriptors 310a, 311a, 312a, 313a specify a different destination address within DMEM 102a, the DMEM local to core processor 103a. Descriptor 314a is a loop descriptor which indicates that the descriptor channel block that processes these descriptors should loop back to descriptor 310a, the descriptor that is stored at the DMEM 102a address specified in descriptor 314a.

One of the descriptor channel blocks of DMAD 106a will add descriptors 310a, 311a, 312a, 313a, 314a to the active list of the hardware data channel controlled by the descriptor channel block similar to the way descriptor channel block in FIG. 2 added descriptors to the active list. The descriptor channel block will begin processing descriptors of FIG. 3 with descriptor 310a. Processing of descriptor 310a is similar to the way descriptor processing has been described in FIG. 2 and FIG. 1.

However, unlike FIG. 2, the source address counter of the descriptor channel block will not be incremented after descriptor 310a data is transmitted to the arbitration unit 112a because descriptor 310a does not specify that the source address counter should be incremented. This is accurate for FIG. 3 because source addresses of descriptors 311a, 312a, and 313a are different for each since each descriptor is processing a different column of data of the data table, each of the descriptors 311a, 312a, and 313a, in the first iteration of the loop, should process their respective column of data from the source address specified in the descriptor, without any offset from the source address. Similarly, descriptor 311a, 312a also do not specify that source address should be incremented in order to ensure that the descriptor following them begins processing their respective columns of data from the correct memory address.

Descriptor 313a data specifies that the source address counter should be incremented. Thus, the source counter of descriptor channel block 108a is incremented after control information of descriptor 313a is transmitted to arbitration unit 112a. Incrementing source address counter after the last bytes of the control information of descriptor 313a is transmitted ensures that the next time descriptors 310a, 311a, 312a, 313a are processed the source address specified in 310a, 311a, 312a, 313a are adjusted, modified or offset accurately. The remaining aspects of processing and returning descriptors 310a, 311a, 312a, 313a, 314a are similar to the way it is described in FIG. 1 and FIG. 2.

Thus, data movement system may copy an entire data table from a source memory and store the data table in a destination memory using descriptors.

Partitioning

Figure 4A:
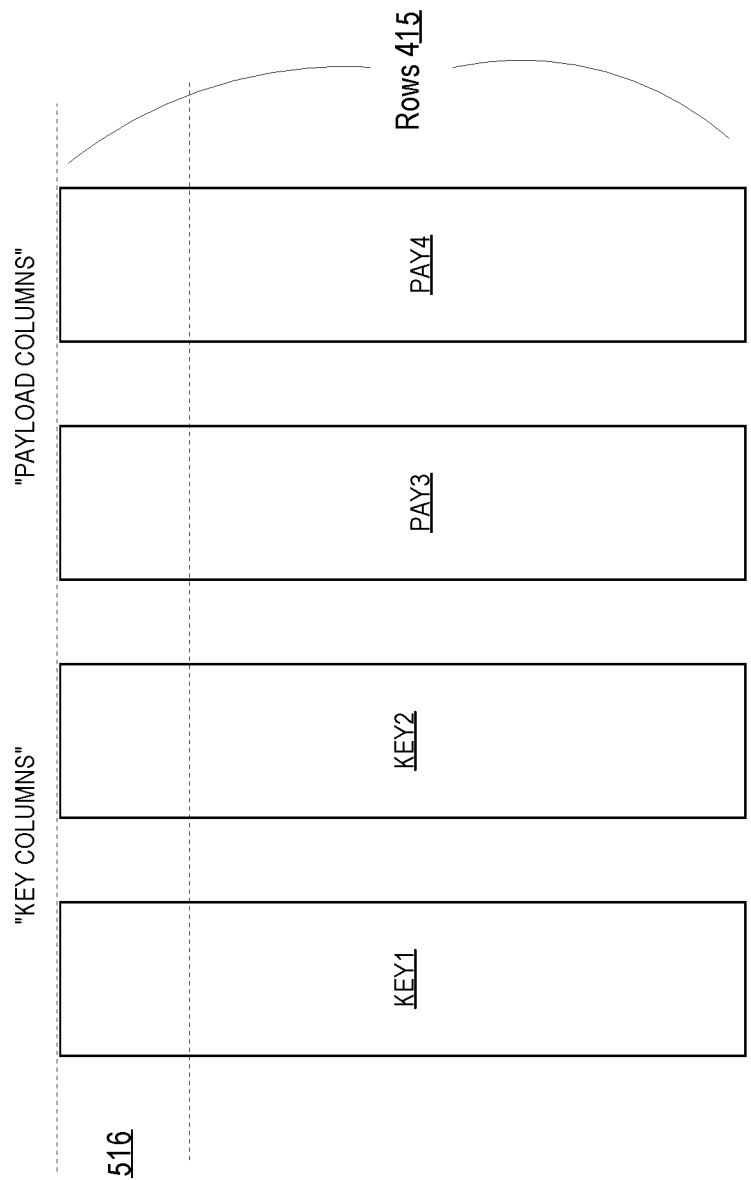
FIG. 4A illustrates an example of columns that may be partitioned between core processors, according to an embodiment of the present invention.
Figure 4B:
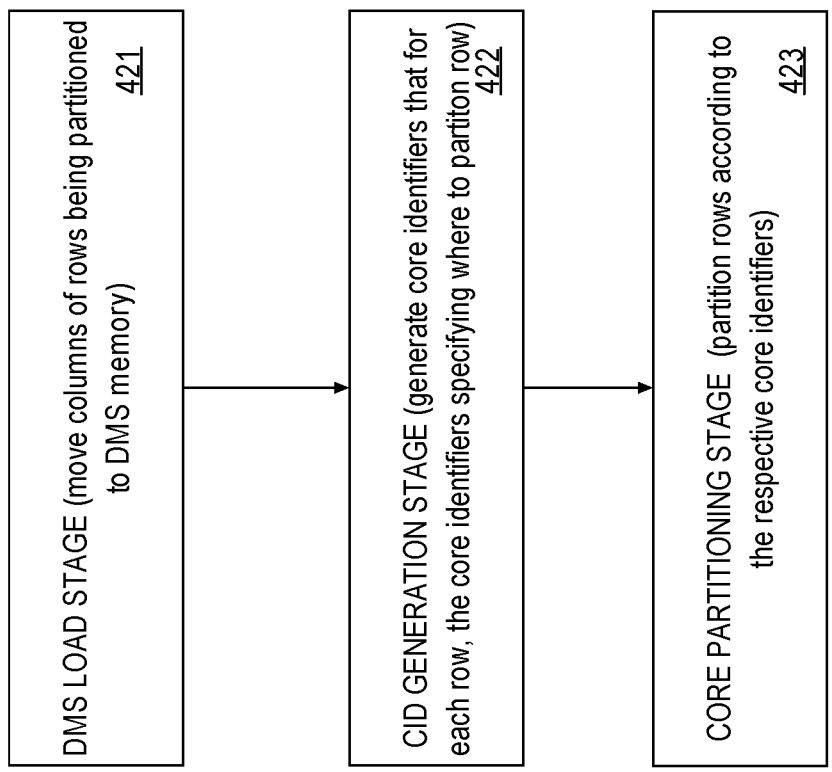
FIG. 4B illustrates partitioning stages for partitioning data between core processors, according to an embodiment of the present invention.
Figure 4C:
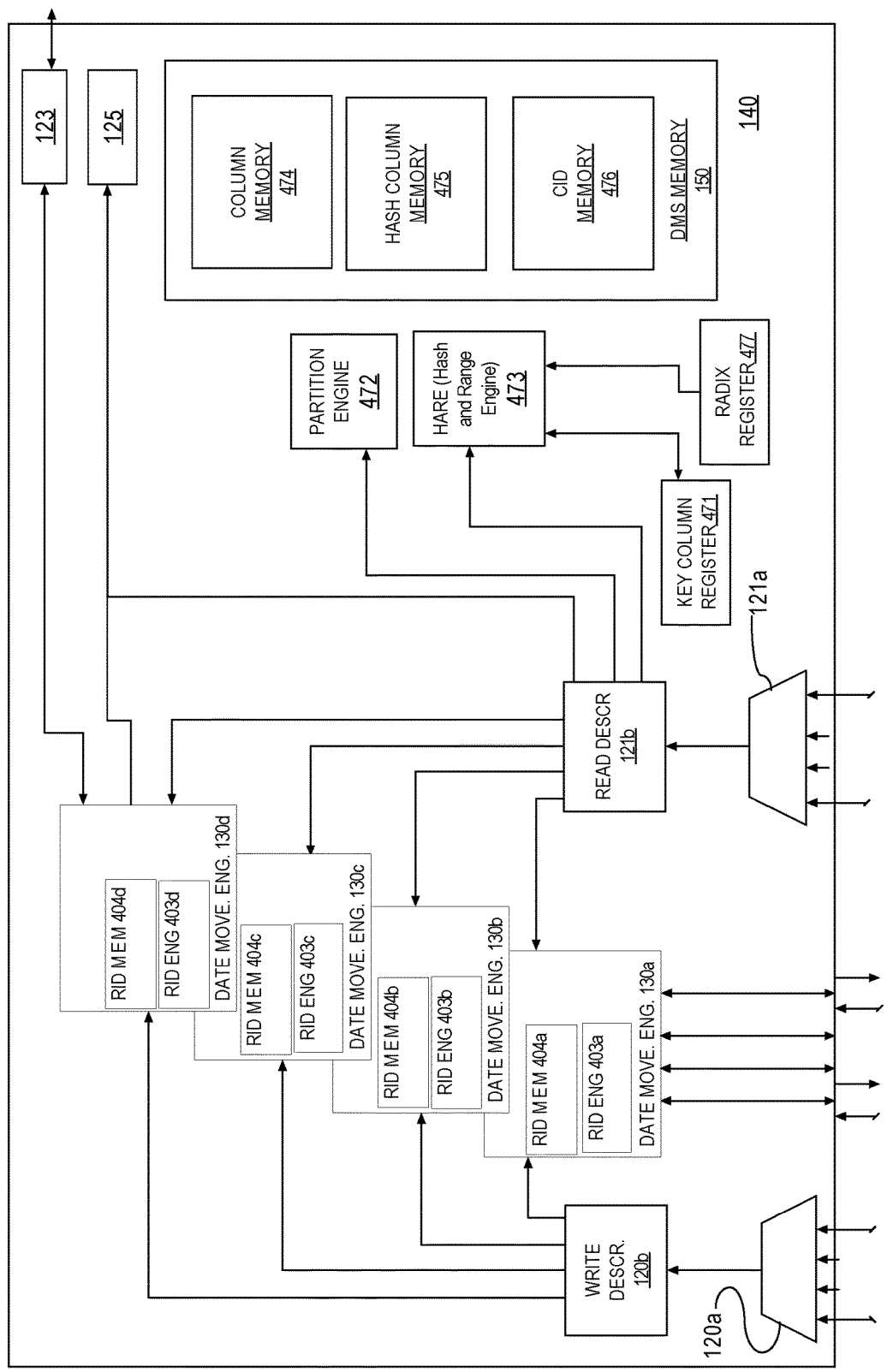
FIG. 4C illustrates an example arrangement of a plurality of electronic circuits of parts of a data movement system that participate in partitioning, according to an embodiment of the present invention.

Partitioning of rows is performed in three stages, which are referred to herein as partitioning stages. The partitioning stages are illustrated herein using an example set of columns, which are depicted in FIG. 4A. FIG. 4B depicts the partitioning stages. The partitioning stages are performed, at least in part, by components of DMAC 140. FIG. 4C is a diagram depicting a view of DMAC 140, the view highlighting components that participate in partitioning.

In general, partitioning involves moving columns from main memory to DMS memory 150 (specifically column memory 474), which in effect is an intermediary memory where the columns are staged to be partitioned among scratch pads of core processors. For each row to be partitioned, an identifier is generated that identifies a core processor to which the row is assigned by partitioning. The identifier generated is referred to herein as a core processor identifier (CID). A row is moved to the DMEM of the core processor identified by the row's respective CID.

Referring to FIG. 4A, it depicts four columns, key column key1, key column key2, pay load column pay3, and pay load column pay4, as stored in main memory, and which together comprise rows 415. Each of these columns may be stored contiguously in main memory, or may be stored in multiple "chunks" of contiguous memory. A key column is a column having values that are used to generate CIDs. A pay load column is not used to generate CIDs.

In general, to partition rows, Data Movement System 101 partitions the rows by subsets of the rows. For example, if rows 415 comprise 1 k rows (1024 rows), then 4 subsets comprising 256 rows each are partitioned together by Data Movement System 101.

Partitioning Stages

FIG. 4B depicts partitioning stages according to an embodiment of the present invention. Referring to 4B, in the first partitioning stage 421, which is referred to herein as the "DMS load stage", a subset of rows are loaded in the DMS memory 150 from main memory. The rows to load should include at least one key column.

In the second partitioning stage 422, referred to herein as the "CID generation stage", a list of CDs are generated based on the one or more key columns loaded in the DMS load stage. A CID is generated for and associated with each row of the subset that resides in the DMS load stage.

In the third partitioning stage 423, referred to herein as the "Core partitioning stage", the subset of rows is distributed among the core processors. Each row is moved to the core processor identified by the row's respective CID.

Partitioning Descriptors

The Data Movement System 101 is configured to partition rows through the use of linked descriptors, referred to herein as a partitioning chain. Within a partitioning chain, a different set of linked descriptors are used for each partitioning stage, each set being referred to herein as a partitioning sub-chain. Descriptors are referred to herein as being linked, in a chain, or sub-chain, when the descriptors are linked by Data Movement System 101 (e.g. by a DMAD) by setting Link Addr field to refer to another descriptor that is the same or another chain or sub-chain. The rows are partitioned using components of Data Movement System 101 depicted in FIG. 4C. Partitioning of rows by Data Movement System 101 is illustrated in the context of rows 415. An illustrative partitioning chain 430 that may be used for partitioning is depicted in FIG. 4D.

Figure 4D:
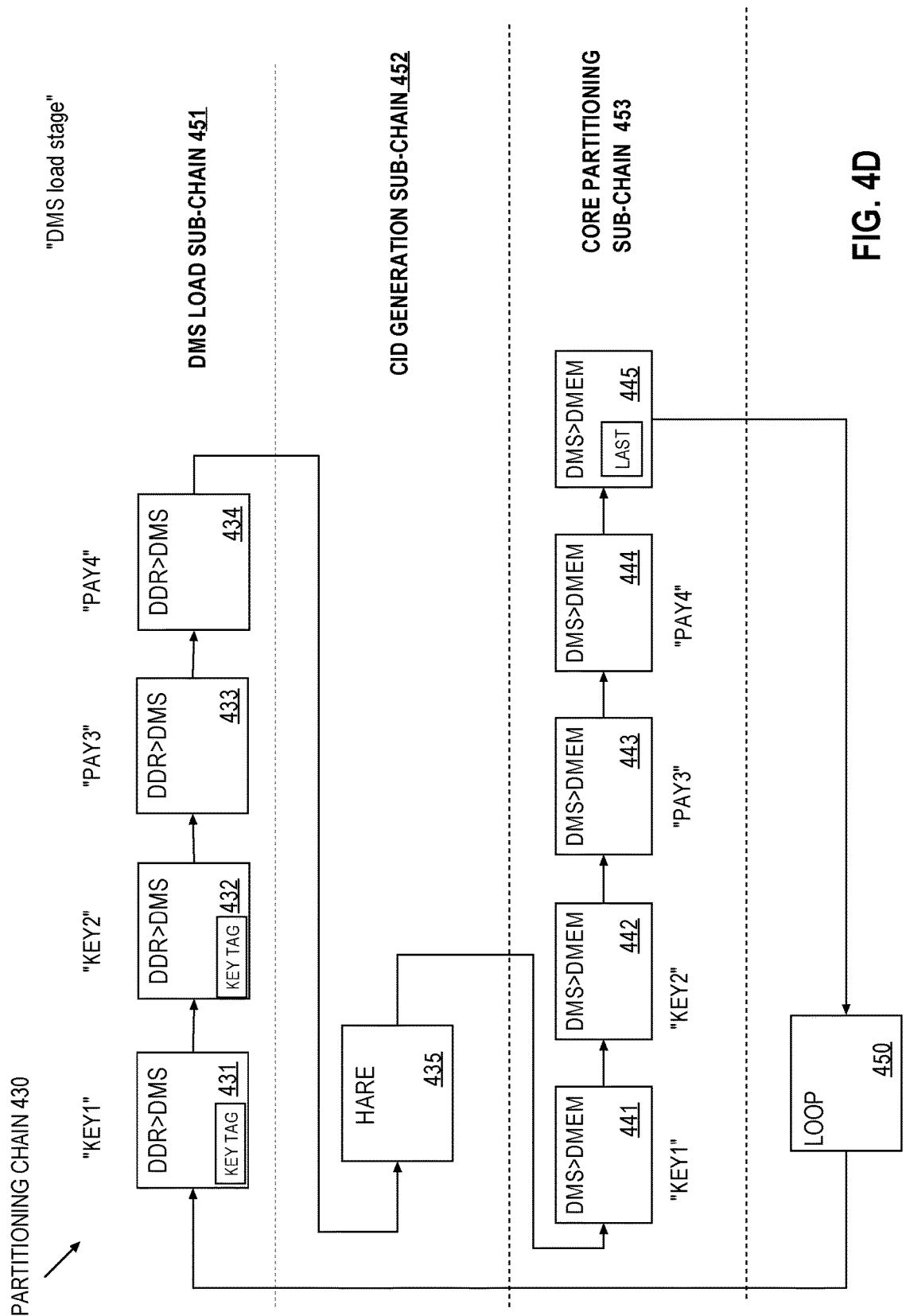
FIG. 4D illustrates an arrangement of descriptors for partitioning data, according to an embodiment of the present invention.

In FIG. 4D, partitioning chain 430 may be generated by any of the one or more core processors within Data Movement System 101. The partitioning chain, once generated by a core processor, is forwarded to DMAC 140 via a DMAD for processing in the way previously described for descriptors. For purposes of illustration, core processor 104g is generating partitioning chain 430, and core processor 104g uses DMAD 115g to forward descriptors of partitioning chain 430 to DMAC 140 in the order depicted in FIG. 4D for execution.

Referring to FIG. 4D, DMS load sub-chain 451 comprises data descriptor 431, data descriptor 432, data descriptor 433, and data descriptor 434. The data descriptors in DMS load sub-chain 451 cause execution of the DMS load stage. Each of these data descriptors specify a source address in main memory for a different column for a subset of rows 415 and a different destination address within column memory 474, an area of memory within DMS memory 150. Each data descriptor also specifies 256 as the number of rows to move to DMS memory 150. Data descriptor 431 is for column key1, data descriptor 432 is for column key2, data descriptor 433 is for column pay3, and data descriptor 434 is for column pay4.

Data descriptor 431 includes an attribute, referred to herein a key column tag, that identifies column key1 as a key column. Data descriptor 432 includes a key tag to identify column key2 as a key column.

When a data descriptor with a key flag is forwarded to DMAC 140, it is initially processed by read descriptor parser logic block 121b. Read descriptor parser logic block 121b notifies HARE engine 473 of receipt of a data descriptor with a key flag. HARE engine 473 is a group of electronic circuits that generates hash values and/or CIDS based on the one or more columns indicated by key column register 471. Key column register 471 is a FIFO register. When HARE engine 473 is notified of data descriptor 431, HARE engine 473 adds, as specified by data descriptor 431, the address that holds column key1 in column memory 474 and the width of column key1 to key column register 471. An entry in key column register 471 is added for data descriptor 432 in the same way.

Hare Descriptor

CID generation sub-chain 452 comprises one descriptor, HARE descriptor 435. HARE descriptor 435 specifies to generate CID's based on key columns identified by key column register 471. HARE descriptor 435 includes various fields, each specifying an aspect of generating a CID. A HARE descriptor is forwarded by the read descriptor parser logic block 121b to HARE engine 473, which generates the CID's accordingly.

Figure 4E:
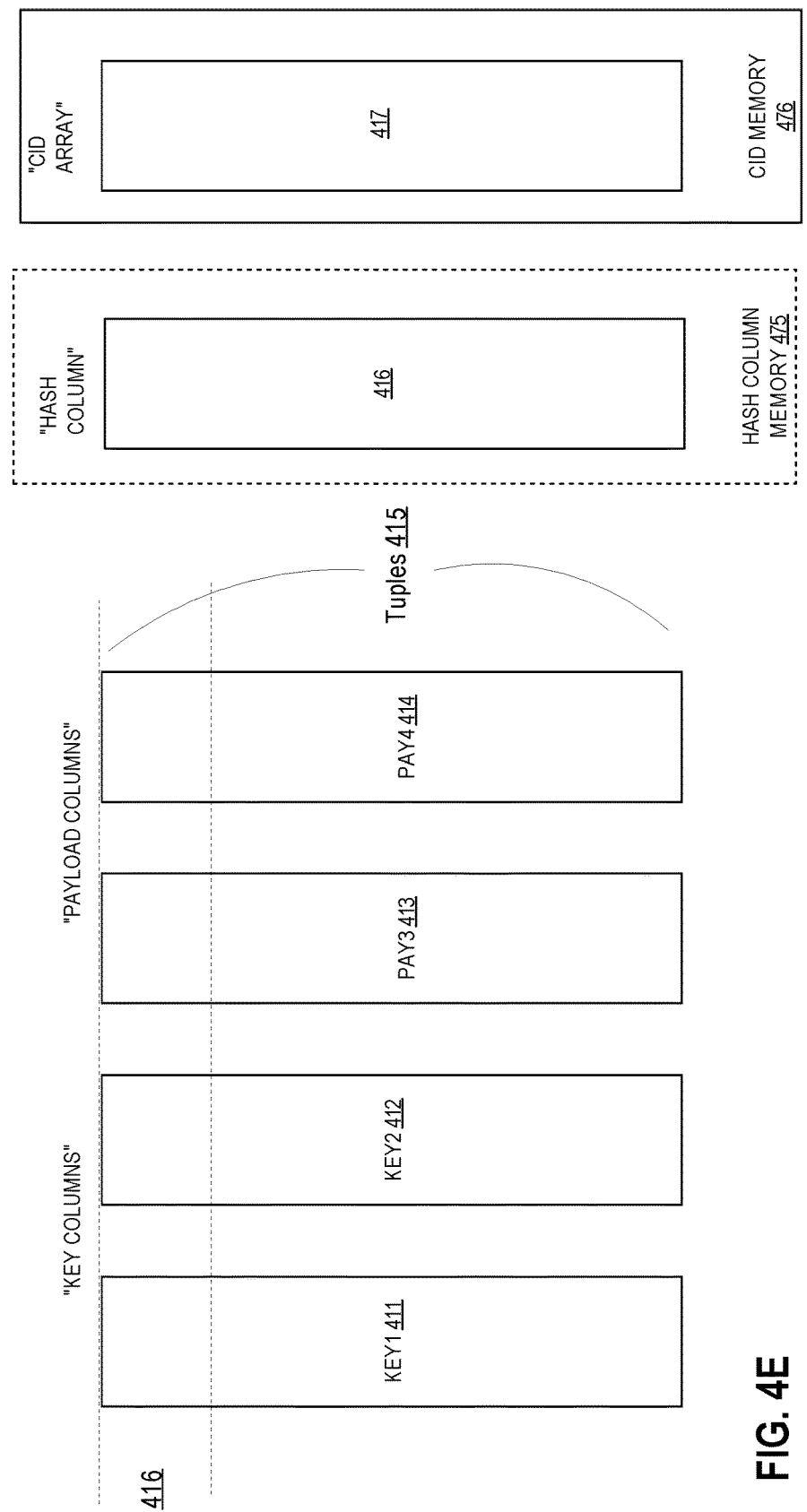
FIG. 4E illustrates an example of columns that may be partitioned between core processors, and an example of columns generated in conjunction with partitioning, according to an embodiment of the present invention.

FIG. 4E shows CID array 417. HARE engine 473 generates CID array 417 when executing HARE descriptor 435. Each element in CID array 417 corresponds to a row in rows 415, and, upon completion of executing HARE descriptor 435, holds a CID for every row in 415. CID 417 is stored in CID memory 476.

HARE descriptor 435 includes a field that specifies an algorithm for generating CID's. According to an embodiment, one of three algorithms may be specified, which are Radix, Radix/Hash, and Range.

Under the RADIX algorithm, the value represented by a contiguous range of bit positions in a key column is used as, in effect, a CID. RADIX register 477 specifies the range of bit positions, and key column register 471 specifies the key column. For example, to identify 32 core processors, RADIX register 477 stores a value specifying bit position range 0 through 4. For a column value of a row in a key column in column memory 474, HARE engine 473 sets the corresponding element in CID array 417 to the value of bits 0 through 4 of the column value.

Under RADIX/HASH algorithm, CID's are generated by, in effect, applying the RADIX algorithm to hash values generated from one or more key columns. Specifically, a hash value column containing the hash values is generated using one or more key columns identified by key column register 471. Hash value column 416 is used to generate a CID array. Hash value column 416 is stored in hash column memory 475, at an address specified by a field of a HARE descriptor. The hash column contains a hash value for each row in the one or more key columns. A bit range of the hash column is used to generate the CID's for a CID array, the bit range being specified by RADIX register 477.

For example, a field in HARE descriptor 435 specifies the RADIX/HASH algorithm for generating CID's and RADIX register 477 specifies bit position 0-4. From the first row of columns key1 and key2, HARE engine 473 generates a hash value and stores the hash value as the first row in hash column 416. Hash column 416 is stored in hash column memory 475. The first five bits of this hash value are stored as the value in the first row in CID array 417. From the second row of key1 and key2, HARE engine 473 generates a hash value and stores the hash value as the second row in hash column 416. The first five bits of this hash value are stored as the value in the first element in CID array 417.

Range Algorithm

Under range partitioning, a CID for a row is generated by comparing a column value in a row of a key column to a configurable number of incrementing range values. If the configurable number of range values is "R," the comparsion results in each row being placed into one of R ranges. The CID for a row is then determined by using the CID assigned to the range by a "range-to-CID mapping" stored in one or more range configuration registers. According to an embodiment, range configuration registers are in DMAC 140 and comprise a range configuration register for each CID, where the CID represents a core processor. Each range configuration register is associated with a range and stores a CID mapped to that range. A configuration register is programmed using a program descriptor. In effect, each range configuration registration holds an entry in the range-to-CID mapping, mapping that range to a CID.

The range-to-CID mapping that can be programmed into range configuration registers is flexible. Multiple ranges may be mapped to the same CID or multiple CDs can mapped to the same range. Not every CID need be mapped.

When a range is mapped to multiple CIDs, whenever HARE engine 473 determines a range based on a column value in a key column, a CID is assigned in a linear incrementing fashion, starting at the entry that maps that range to a CID and incrementing the CID until it is one less than the CID assigned to the next range. This technique can be used to help reduce CID skew when it is known that one range will have more matches than other ranges. Instead of a single CID being used over and over when there is a match to that range, multiple CDs are used, and they are used such that the distribution to those CIDs is even.

Descriptors Used for Partitioning

Once a CID array is generated for a HARE engine descriptor, after the CID generating stage ends for a set of rows, the core partitioning stage may commence. Core partitioning descriptors are used to configure Data Movement System 101 for the core partitioning stage. FIG. 4D depicts core partitioning sub-chain 453, which comprises core partitioning descriptors. Core partitioning sub-chain 453 includes core partitioning descriptor 441, core partitioning descriptor 442, core partitioning descriptor 443, core partitioning descriptor 444, and core partitioning descriptor 445. Each of descriptor 441, core partitioning descriptor 442, core partitioning descriptor 443, core partitioning descriptor 444, and core partitioning descriptor 445 is a data descriptor for partitioning a respective column from DMS memory 150 to DMEM memory, the respective column being partitioned among the core processors according to CID's in CID array 417. Each includes a partition flag attribute specifying that a respective column is to be partitioned according to CID array 417. Hence, core partitioning descriptors 441, 442, 443, 444, and 445 are referred to herein as core partitioning descriptors.

Each of these partitioning descriptors identifies a column to be partitioned among core processors. The Source Addr identifies the column by referencing the column's address in column memory 474. Core partitioning descriptor 441 identifies column key1, core partitioning descriptor 442 identifies column key2, core partitioning descriptor 443 identifies column pay3, and core partitioning descriptor 444 identifies column pay4. Each of the descriptors also specifies the respective column's width. The core partitioning descriptor 445 has an attribute set to indicate that core partitioning descriptor 445 is the last partitioning descriptor in partitioning sub-chain 453.

Core partitioning descriptor 445 identifies hash column 416. The descriptor, when executed, causes the partitioning of hash column 416 among the core processors of Data Movement System 101. In effect, a column comprising hash values generated from other columns of rows 415 is added to rows 415.

Each partitioning descriptor specifies a destination address (i.e. in the Destination Addr.) in DMEM. The destination address is an area in DMEM memory referred to herein as a column FIFO buffer. For each core partitioning descriptor, the core processors in Data Movement System 101 have a respective column FIFO buffer in scratchpad memory at the destination address.

Partitioning engine 472 transmits rows partitioned to a core processor along a "partition data path" connected to partitioning engine 472 and the respective DMEM interface block of the core processor. The partition data path comprises digital circuitry in a data movement engine and the FIFO register of the respective DMAD of the core processor. The respective DMAD block of the core processor receives the rows of rows 415 that are partitioned to that core processor and, via the respective DMEM interface block of the core processor, puts the rows in that core processor's respective column FIFO buffer. For example, partitioning engine 472 transmits rows partitioned to core processor 103*a* along the partition data path in data movement engine 130*a* and FIFO register 114*b*. DMAD 106*a* receives the rows and puts, via DMEM interface block 107*a*, the rows in the respective column FIFO buffer of core processor 103a. In this way, core processor 103a receives the rows partitioned to core processor 103a by partition engine 472.

When a DMAD block of a core processor forwards a core partitioning descriptor to DMAC 140, read descriptor parser logic block 121b forwards the core partitioning descriptor to partition engine 472. Partition engine 472 then partitions the column identified by the partitioning descriptor according to the CID array 417.

For example, assume the first four elements in CID array 417 contain the following CID's: 0, 6, 16, 0, which identify core processors 103a, 103g, 104a, and 103a, respectively. To process core partitioning descriptor 441, partition engine 472 reads the first row of column key1 and the first CID value from the first element in CID array 417 and forwards the first row of column key1 to core processor 103a, which is identified by first CID value 0. The core receives the partitioned data, placing the row in the column FIFO buffer of 102a at the address specified by the field Dest Addr of core partitioning descriptor 441. Partition engine 472 forwards the second row of column key1 to core processor 103g, as identified by CID value 6. The core receives the partitioned data, placing the row in the column FIFO buffer of 102g identified by the field Dest Addr of core partitioning descriptor 441. The third row is processed in similar fashion, except it is added to the column FIFO buffer of core processor 104a.

Partition engine 472 forwards the fourth row of column key1 to core processor 103a, as identified by CID value 0 in the fourth element of CID array 417. The core receives the partitioned data, adding that row to the column FIFO buffer of 102a, which already holds the first row from column key1.

Partition engine 472 processes core partitioning descriptors 442, 443, 444, and 445 in similar fashion. Note, however, rows for these descriptors are placed in a column FIFO buffer that is different between each partitioning descriptor of core partitioning sub-chain 453. For core partitioning descriptor 445, the rows of hash values are obtained from hash column memory 475, and specifically, from hash column 416.

Sub-Buffering

In order for a core processor to process rows partitioned to that core processor for a core partitioning sub-chain, that core processor must be able to determine when partitioned rows are stored in the respective column FIFO buffers of the core partitioning sub-chain.

According to an embodiment, a core processor is notified when a batch of one or more rows have been completely added to the column FIFO buffers. The batch size (i.e. number of rows) is configurable, and may be set to one. The batch size may be configured by setting a batch size register using a program descriptor. A batch size register resides in each DMAD block. A batch size register of a DMAD block may also be configured by the respective core processor of the DMAD block by writing directly to the batch size register via a configuration interface.

Each of the column FIFO buffers is treated as a circular buffer. For a particular core processor, the respective column FIFO buffers are, in effect, associated with the same tail index and head index. The tail index specifies the index of a first unread row (in FIFO order) in any of the respective column FIFO buffers of a core processor. A head index specifies the index of where a row should be added to any of the column FIFO buffers.

As shall be described in greater detail, the electronic circuitry of DMS 101 manages aspects of flow control with respect to a column FIFO buffer, which includes maintaining a tail index and head index on a per core processor basis, and preventing "buffer overflow", that is, preventing the overwriting of unread rows in the column FIFO buffers of any core processor. Such flow control may include ceasing the distribution of partitioned rows to the column FIFO buffers to prevent buffer overflow.

For the particular set of rows being partitioned for a core partitioning sub-chain for a core processor, the tail index and head index is updated in response to adding rows to the "last" column FIFO buffer for the partitioning descriptor that is marked as a last descriptor in a core partitioning sub-chain. The tail index and head index is used for all column FIFO buffers for the core partitioning sub-chain, and are not changed until the entire row is added to all these column FIFO buffers. A row is entirely added when the row is added to the last column FIFO buffer.

Notifying a core processor of the addition of a row to the respective column FIFO buffer (or the update of a tail index) entails a certain amount of overhead. The overhead may be reduced by notifying a core processor when a batch of multiple rows is added. As mentioned before, batch size is configurable. A core processor is notified when a number of multiple rows is added to the respective column FIFO buffers, where that number is equal to the configured batch size.

Sub-Buffers

When the batch size is greater than one, a column FIFO buffer is effectively divided into sub-buffers. When a number of rows equal to the batch size is added to a last column FIFO buffer and the core processor is notified, a sub-buffer comprising that number of rows is made available to a core processor for processing. The batch size is hence forth referred to herein as the sub-buffer size.

Figure 5A:
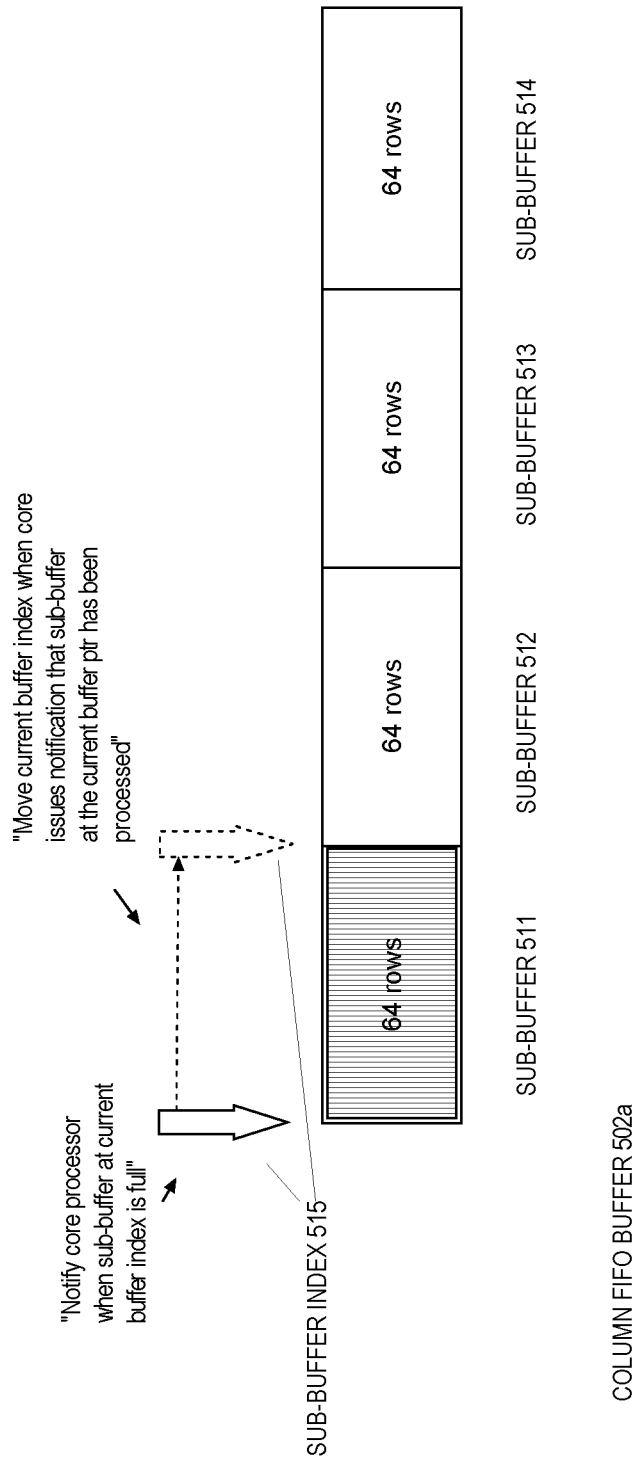
FIG. 5A illustrates a buffer in scratchpad memory used for receiving rows of a column during partitioning, according to an embodiment of the present invention.

FIG. 5A depicts an illustrative column FIFO buffer 502a that holds rows partitioned to core processor 103a for core partitioning descriptor 445 and that reside in DMEM unit 102a. Column FIFO buffer 502a comprises 256 rows. The sub-buffer size of column FIFO buffer 502a is 64. Hence, column FIFO buffer 502a comprises four sub-buffers: sub-buffer 511, sub-buffer 512, sub-buffer 513, and sub-buffer 514.

The column FIFO buffers in DMEM unit 102a for the core partitioning descriptors 441, 442, 443, and 444 also have sub-buffers of the same size.

When sub-buffer 511 of column FIFO buffer 502a is filled, and it and the respective other sub-buffers of the other column FIFO buffers are made available for processing to a core processor, the core processor is notified and provided a tail index. The tail index points to the first row in the sub-buffer, and is hence forth referred to herein as the sub-buffer index. The sub-buffer index points to a set of rows in a column FIFO buffer that has not been processed by the core processor. Given a sub-buffer size, the core processor processes, for each column FIFO sub-buffer, that number of rows beginning with the row pointed to by the sub-buffer index.

An index, such as a sub-buffer index, tail index, and head index, refers to an ordinal position of row within a column FIFO buffer. In order to use the index to access a row in any particular column FIFO buffer, the index is resolved to a memory address. A core processor, pursuant execution of software, calculates a memory address for the row using the base memory address of the column FIFO buffer (as specified in the Destination Addr field of the respective core partitioning descriptor), the width of the column, according to the following formula, which assumes that the index value for the first row is zero.

Row Memory Address=base memory address+ (index*column width)

Thus, in this way, an index may be used to identify a row (or the beginning of a set of rows) to access in each of the column FIFO buffers.

Row Processing and Flow Control

According to an embodiment of the present invention, the electronic circuitry of a DMEM interface block is configured for handling aspects of flow control for each column FIFO buffer. Such aspects of flow control include: (1) maintaining a tail index and head index for each column FIFO buffer of a partitioning descriptor that is flagged as the last partitioning descriptor, (2) notifying a core processor when a sub-buffer has been filled with rows, and (3) signaling to partition engine 472 to stop partitioning and distributing rows to prevent column FIFO buffer overflow.

A core processor executing software also participates in handling aspects of the flow control of a column FIFO buffer. These include signaling to the respective DMEM interface block that a sub-buffer has fully been read, processed, and/or is otherwise available to receive new partitioned rows.

Figure 5B:
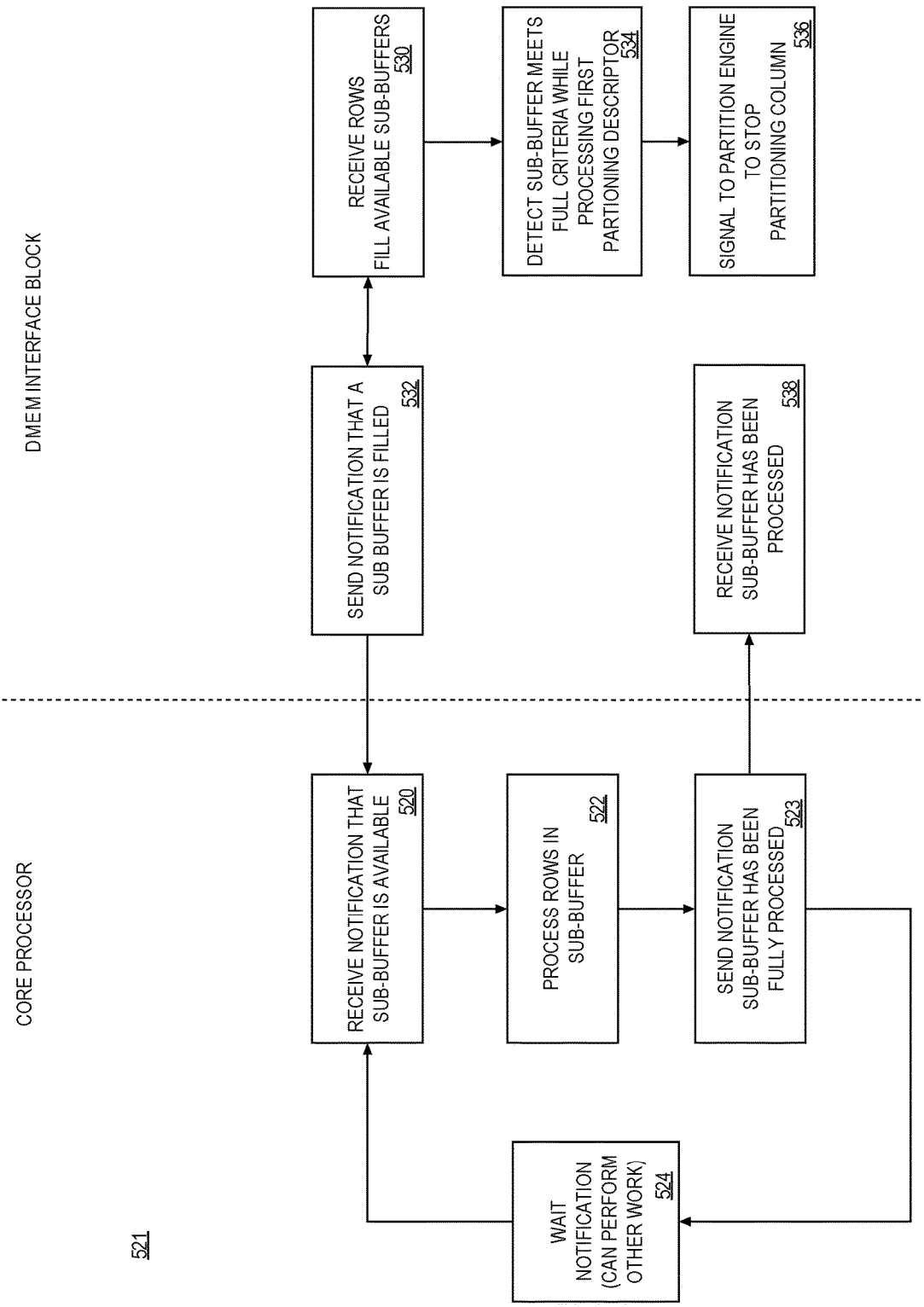
FIG. 5B illustrates operations performed to buffer rows of a column received during partitioning, according to an embodiment of the present invention.

FIG. 5B is a diagram depicting operations performed by a core processor 103a and DMEM interface block 107a to process rows forwarded to a core processor 103a by partition engine 472.

Referring to FIG. 5B, at 520, core processor 103a receives notification from DMAD DMEM interface block 107a that a sub-buffer of the last column FIFO buffer has been filled, along with a sub-buffer index. At 522, core processor 103a processes rows in the sub-buffers identified by the sub-buffer index, which not only include the last column FIFO buffer for core partitioning descriptor 445, but the other column FIFO buffers for core partitioning descriptors 441, 442, 443, and 444. At 523, core processor 103a sends notification that the sub-buffers have been fully processed.

At 524, core processor 103a waits for the next notification that a sub-buffer is available. While waiting, or in lieu of waiting, core processor can perform other operations and work.

DMEM interface block 107a performs operations 530-538. At 530, DMEM interface block 107a receives rows from partition engine 472 partitioned to core processor 103a. A column of rows are received for each partitioning descriptor in core partitioning sub-chain 453; DMEM interface block 107a fills the respective column FIFO buffer with the rows. The last column of rows received for core partitioning sub-chain 453 are those for last core partitioning descriptor 445.

At 532, after adding a quantity of the last column of rows that is equal to or greater than the sub-buffer size of the respective column FIFO buffer, DMAD DMEM interface block 107a sends a notification to core processor 103a that a sub-buffer has been filled, along with the sub-buffer index.

DMEM interface block 107a maintains the sub-buffer index and head index. This maintenance includes performing any wrapping around operation as is needed for a circular buffer.

With respect to the head index, DMEM interface block 107a increments the head index as each row is added to the column FIFO buffer for the first partitioning descriptor in core partitioning sub-chain 453. The value of the head index controls, in effect, whether to stop adding new rows to the column FIFO buffer to prevent buffer overflow. The value of the head index is prevented from reaching that of the sub-buffer index.

At 534, DMEM interface block 107a detects whether the difference between the head index and sub-buffer index satisfies "Full Criteria". The full criteria is based on a threshold difference between the head index and sub-buffer index. Once the difference is at or less then the threshold, then full criteria is satisfied. Once it is determined that the full criteria is satisfied, at 536, DMEM interface block 107a signals partition engine 472 to stop partitioning. Specifically, DMEM interface block 107a back pressures the respective partition data path and when the partition data path becomes full, partition engine 472 stops partitioning. The threshold difference upon which the full criteria is based is configurable by a DMAD register using a program descriptor or by the respective core processor of a given DMAD writing the register through a configuration interface.

At 538, the sub-buffer index is incremented by the DMEM interface block 107a in response to a receipt of a notification by the core processor 103a that it has processed the rows of a sub-buffer. If the DMEM interface block 107a had detected that the full criteria had been satisfied, it re-evaluates the criteria after the sub-buffer index is incremented. When the DMEM interface block 107a detects that full criteria is no longer satisfied, DMEM interface block 107a signals partition engine 472 to begin partitioning the first core partitioning descriptor 441.

Partition Pipelining

According to an embodiment of the present invention, pipelining allows various resources, such as partition engine 472, and HARE engine 473, to be concurrently used to process a subset of rows for different partitioning sub-chains. Each of the three partitioning stages can be executed concurrently (i.e. within the same clock cycles) to process different subsets of rows.

Figure 6A:
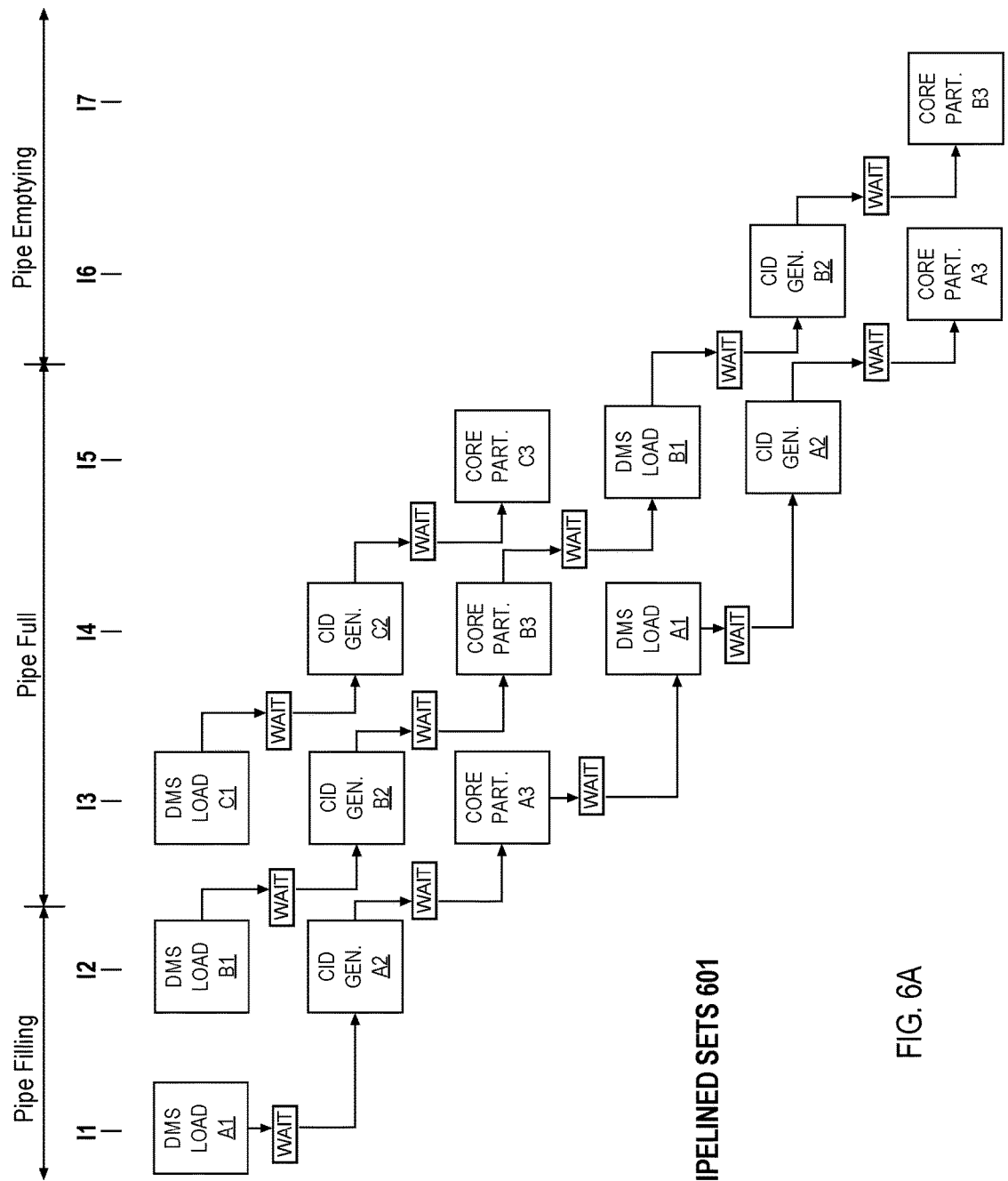
FIG. 6A illustrates pipelining of descriptors, according to an embodiment of the present invention.

FIG. 6A is a diagram depicting partitioning pipelining according to an embodiment of the present invention. Referring to FIG. 6A, pipelined sets 601, which comprise three pipelined sets of partitioning descriptors, each set processing the same rows from main memory. Two of the sets are shown twice in FIG. 6A as described below. Each pipelined set includes a partitioning sub-chain for each partitioning stage; each partitioning sub-chain being unlinked with another partitioning sub-chain in the respective pipelined set, i.e., the Link address field of the last descriptor in partition chain is not linked to the first descriptor of another partitioning sub-chain in the respective pipelined set. Order of execution between partition sub-chains in a pipelined set is controlled through wait for conditions, as explained below. The pipelined sets include:

a. DMS load sub-chain A1, CID generation sub-chain A2, and core partitioning sub-chain A3 for partitioning a respective set of rows. In FIG. 6A this set is shown twice—the second time this set executes on a different respective set of rows;

b. DMS load sub-chain B1, CID generation sub-chain B2, and core partitioning sub-chain B3 for partitioning another respective set of rows. In FIG. 6A this set is shown twice—the second time this set executes on a different respective set of rows, and c. DMS load sub-chain C1, CID generation sub-chain C2, and core partitioning sub-chain C3 for partitioning yet another respective set of rows.

Intervals I1 through I7 are an ordered sequence of periods of time. In each of the intervals I1 through I7, Data Movement System 101 may be concurrently executing up to three partitioning sub-chains, one for each partitioning stage.

For each pipelined set, partitioning sub-chains are executed in partition stage order, and awaits for completion of the partitioning sub-chain that completed beforehand. For example, DMS load sub-chain A1 is executed in interval I1. CID generation sub-chain A2, which must wait for completion of execution of DMS load sub-chain A1, is executed in interval I2. Core partitioning sub-chain A3, which must wait for completion of execution of CID generation sub-chain A2, is executed in interval I3.

Through orchestration of wait for conditions, the partitioning sub-chains of a pipelined set are executed, in effect, in a loop. Thus, before DMS load sub-chain A1 is executed in interval I4 to process a different set of rows, execution of DMS load sub-chain A1 must wait for completion of core partitioning sub-chain A3 in interval I3.

Interval I1 and I2 comprise the initial phase of pipelining, referred to as the fill stage. In the fill stage, a partitioning sub-chain is not being executed for each partitioning stage. Because only one partitioning sub-chain per partitioning stage may be executed in a single interval, and the first partitioning stage for a subset of rows begins with DMS load stage, interval I1 includes only the execution of one DMS load sub-chain, which is DMS load sub-chain A1. In interval I2, two partitioning sub-chains are executed, which are DMS load sub-chain B1 and CID generation sub-chain A2.

Intervals I3 through I5 comprise the full phase of pipelining, where three partitioning sub-chains may be executed concurrently, one for each of the three partitioning stages. In interval I3, DMS load sub-chain C1, CID generation sub-chain B2, and core partitioning sub-chain A3 are executed concurrently. In interval I4, CID generation sub-chain C2, core partitioning sub-chain B3, and DMS load sub-chain A1 are executed concurrently.

Constructing and Submitting Partitioning Sub-Chains

According to an embodiment of the present invention, for each partitioning stage, a separate core processor forms and submits a chain of partitioning sub-chains.

Figure 6B:
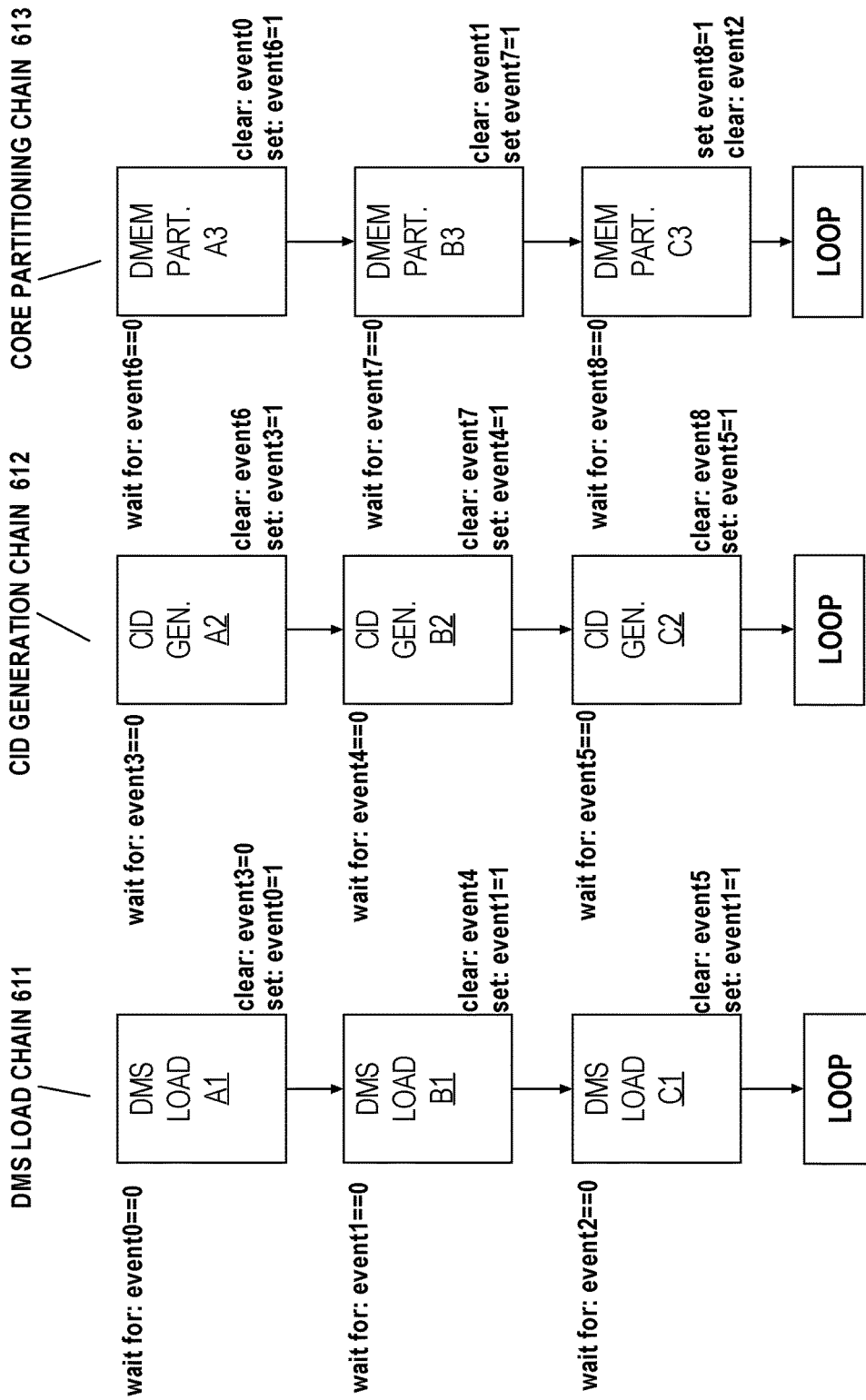
FIG. 6B illustrates pipelined descriptors according to an embodiment of the present invention.

Referring to FIG. 6B, it depicts DMS load chain 611, comprising the partitioning sub-chains for the DMS load stage from each of the pipelined sets, and in particular, comprising DMS load sub-chain A1, DMS load sub-chain B1, and DMS load sub-chain C1. Core processor 103a forms these chain descriptors within DMEM unit 102a and submits the chain descriptors to one of the descriptor channel blocks of DMAD 106a. The chain of descriptors also includes a loop descriptor for looping execution of DMS load chain 611. The loop descriptor and DMS load chain 611 are configured for looping as described above.

CID generation chain 612 comprises the partitioning sub-chains for the CID generation stage, which comprise CID generation sub-chain A2, CID generation sub-chain B2, and CID generation sub-chain C2. Core processor 103g forms CID generation chain 612 within DMEM unit 102g and submits CID generation chain 612 to a data channel DMAD 106g. The chain of descriptors also includes a loop descriptor for looping execution of CID generation chain 612. The loop descriptor and CID generation chain 612 are configured for looping as described earlier.

Core partitioning chain 613 comprises the partitioning sub-chains for the core partitioning stage, which comprise core partitioning sub-chain A3, core partitioning sub-chain B3, and core partitioning sub-chain C3. Core processor 104a forms core partitioning chain 613 within DMEM unit 105a and submits core partitioning chain 613 to one of the descriptor channel blocks of DMAD 115a. The chain of descriptors also includes a loop descriptor for looping execution of core partitioning chain 613. The loop descriptor and core partitioning chain 613 are configured for looping as described earlier.

For a set of rows processed by an execution of a set of partitioning sub-chains, the partitioning sub-chain must be executed in partitioning stage order. When the partitioning sub-chains are submitted by the same core processor, the partitioning sub-chains are executed in the order submitted to the given descriptor channel of the respective DMAD. Thus, as long as the partitioning sub-chains are submitted in partition stage order, the sub-chains are executed in the partition stage order. It is important to keep certain descriptors from starting until certain other descriptors have completed. For example, the CID generation sub-chain A2 is prevented from starting until the DMS load sub-chain A1 has completed.

However, for pipelined sets 601, the partitioning sub-chains of each partitioning stage are submitted by different core processors. Therefore, for a given set of rows processed by a set of partition sub-chains, execution of the sub-chains must be synchronized such that the set of partition sub-chains are executed in partition stage order.

According to an embodiment, such synchronization is orchestrated through wait-events, as illustrated in FIG. 6B. Specifically, each partition sub-chain is associated with a wait condition that must be satisfied before execution of the partitioning sub-chain begins. Execution of the partition sub-chain is blocked until the wait condition is satisfied. The wait condition is based on an event. The wait condition for a partition sub-chain is specified by the "wait for" field of the first descriptor in the partition sub-chain.

For example, for DMS load sub-chain A1 the wait condition is Event0 equal to 0, for CID generation sub-chain A2 the wait condition is Event3 equal to 0, and for core partitioning sub-chain A3 the wait condition is Event6 equal to 0.

Completing execution of a partition sub-chain causes: (a) setting the event to a state that causes the wait condition for the partition sub-chain to be unsatisfied, thereby blocking the partition sub-chain from executing, and (b) the setting of another event to a state that satisfies a wait condition of a subsequent partition sub-chain in the same pipelined set, thereby unblocking the subsequent partition sub-chain from executing.

Completing execution of a partition sub-chain may entail setting two events for purpose of synchronization. In an embodiment, a descriptor may only set one event. Therefore, a partition sub-chain may include an additional descriptor, the purpose of which is to set an event.

For example, initially, core processor 103a sets events such that only execution of DMS load sub-chain A1 is permitted and execution of CID generation sub-chain A2 and core partitioning sub-chain A3 is blocked. Accordingly, core processor 103a clears Event0, i.e. sets to 0, and sets both Event3 and Event6 to 1. Completing execution of DMS load sub-chain A1 sets Event0 to 1, thereby blocking DMS load sub-chain A1 from executing again, and clears event3, thereby unblocking CID generation sub-chain A2 from executing. Completion of execution CID generation sub-chain A2 sets event3 to 1, thereby blocking CID generation sub-chain A2 from executing again, and clears Event6, thereby unblocking core partitioning sub-chain A3 from executing. Completion of execution core partitioning sub-chain A3 sets Event6 to 1, thereby blocking core partitioning sub-chain A3 from executing again, and clears Event0, thereby unblocking subsequent DMS load sub-chain A1 from executing.

Row Identification Numbers

According to an embodiment, Data Movement System 101 may be configured to generate a column of RIDs that may be used to perform row resolution between source columns and resultant columns generated from the source column, or other columns that are row aligned with the source column.

Figure 7:
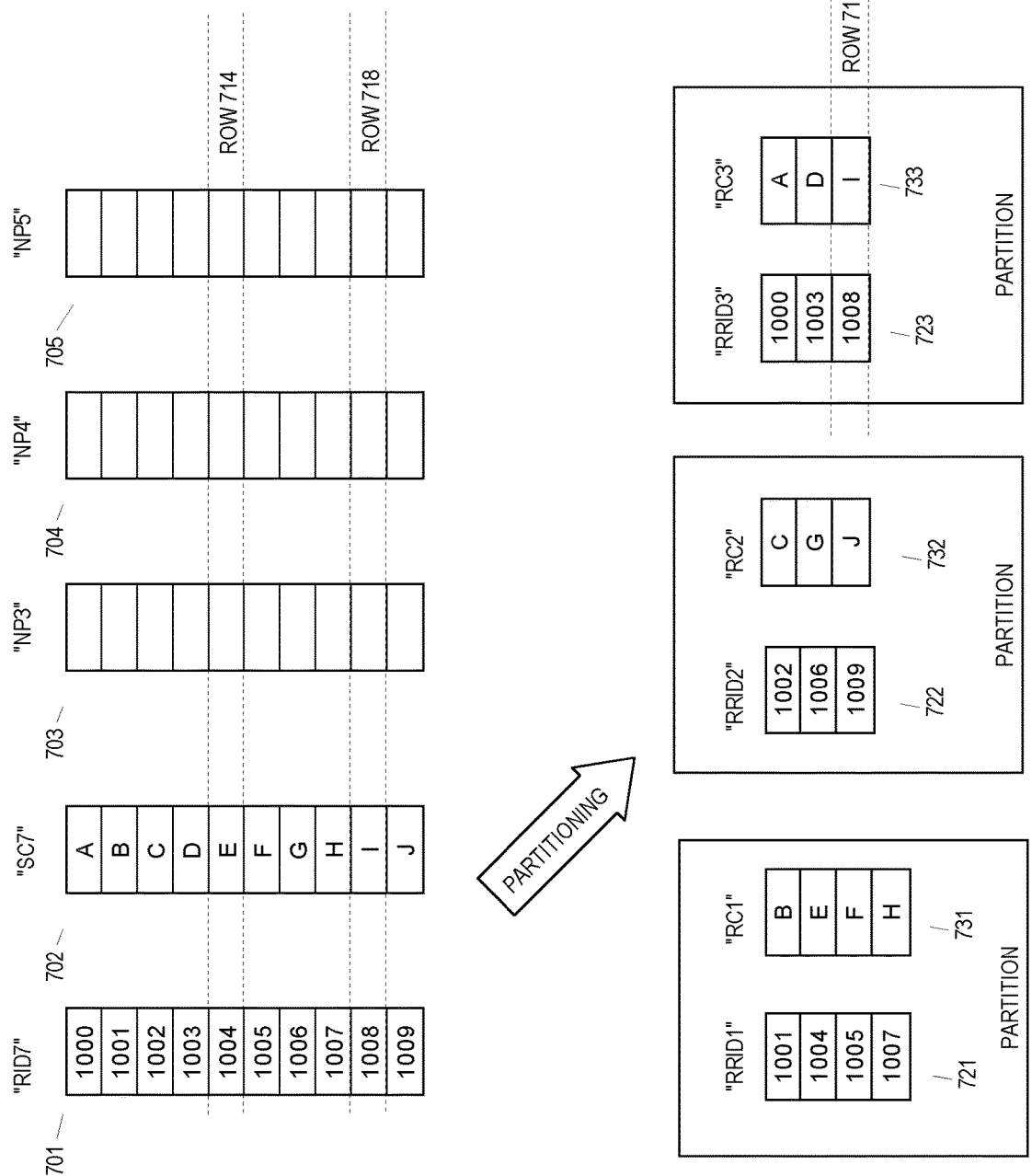
FIG. 7 illustrates RID columns used for row resolution after partitioning columns according to an embodiment of the present invention.

FIG. 7 illustrates RIDs and how RIDs may be used to perform row resolution. Referring to FIG. 7, it depicts source column SC7 702, which is partitioned by Data Movement System 101 into three resultant columns, resultant column RC1 731, resultant column RC2 732, and resultant column RC3 733.

FIG. 7 also depicts non-partitioned columns NP3 703, NP4 704, and NP5 705. These columns are row-aligned with source column SC7. However, the columns are not partitioned in the current illustration.

RID column RID7 is a column comprising RIDs. The RIDs in a RID column are an ordered sequence of numbers when the RID column is initially generated according to a descriptor. In an ordered sequence of numbers, each number differs from an adjacent number in the sequence by the same constant, referred to herein as a counter value. A counter value is often the value one. The first RID in the sequence is referred to as the starting value.

To use RIDs in RID column RID7 to perform row resolution, RID column RID7 is assumed to be row aligned with source column SC7. Accordingly, row 714 contains the RID 1004 and the value "E" in source column SC7.

Based on the starting value of an ordered sequence of RIDs in a RID column and the respective counter value, the RID of a row in the RID column may be used to perform row resolution for that row on other columns that are row aligned to the RID column.

For example, given a starting value of 1000 and counter value of 1, RID 1008 may be resolved to row 718.

Row Resolution for Data Manipulation Operations that Preserve Row Alignment

A data manipulation operation may be performed on multiple source columns such that row alignment is preserved between respective resultant columns. The descriptor based partitioning described earlier is an example of such a tabular data operation that preserves row alignment between resultant columns. When a source column is a RID column that contains an ordered sequence of RIDs and is row aligned with another particular source column, and when row alignment between resultant columns is preserved by a data manipulation operation that is applied to both source columns, a resultant RID column may be used to perform row resolution between a resultant column generated for the other particular source column and other particular source column.

Referring to FIG. 7, RID column RID7 and source column SC7 are partitioned such that the same row belongs to the same partition. Thus, the respective pair of resultant columns for each partition are row aligned (each partition is stored in DMEM of a different core processor). Resultant RID column RRID1 721 and resultant column RC1 731 belong to the same partition and are row aligned, resultant RID column RRID2 722 and resultant column RC2 732 belong to the same partition and are row aligned, resultant RID column RRID3 723 and resultant column RC3 733 belong to the same partition and are row aligned.

To perform row resolution between a resultant column and a respective source column using a respective resultant RID column of the resultant column, row-alignment-based resolution is used to obtain a RID for a row from the resultant RID column, and the RID is used to perform RID-based row resolution on the source column. For example, to perform row resolution between source column SC7 and resultant column RC3 for row 718 in resultant column RC3, row-alignment-resolution is used to obtain the RID for the row. Row 718 is the third element in resultant column RC3. Therefore, the third element in resultant RID column RRID3 contains the RID for row 718, which is 1008. Based on a RID value of 1008, the starting value of 1000, and the counter value of 1, RID-based resolution yields that row 718 is the ninth element in source column SC7.

RID-based resolution using resultant RID columns RRID1, RRID2, or RRID3 may be used to perform row resolution not only between source column SC7 and resultant columns RC1, RC2, or RC3, but also with other columns row aligned with source column SC7. Thus, RID-based resolution using resultant RID columns RRID1, RRID2, or RRID3 may be used to perform row resolution between resultant columns RC1, RC2, and RC3, respectively, and any of non-partitioned columns NP3, NP4, and NP5.

Row Identification Numbers Generation

As mentioned previously, Data Movement System 101 generates RIDs within various memories of Data Movement System 101. The RIDs are generated by a dedicated RID engine in each data movement engine (see FIG. 4C), each RID engine comprising a set of electronic circuits that are designed to generate a column of RIDs in response to reading a descriptor.

Referring to FIG. 4C, each data movement engine includes a RID engine and a RID memory unit. A RID memory unit is a type of DMS memory used to store RIDs, although it is not limited to storing only RIDs. Data movement engine 130*a* includes RID engine 403*a* and RID memory unit 404*a*, data movement engine 130*b* includes RID engine 403*b* and RID memory unit 404*b*, data movement engine 130*c* includes RID engine 403*c* and RID memory unit 404*c*, data movement engine 130*d* includes RID engine 403*d* and RID memory unit 404*d*.

According to an embodiment, a column of an ordered sequence of RIDs is generated in response to a data descriptor that specifies various aspects of generating a column of RIDs. A data descriptor that is for generating a column of RIDs includes an attribute referred to herein as a "RID flag", which specifies to generate a column of an ordered sequence of RIDs at a destination address specified in the destination address field. The destination address may be within the DMEM of a particular core processor, DMS memory 150, or RID memory. A data descriptor that specifies to generate RIDs in this way is referred to herein as a RID descriptor.

Unlike for data movement that is performed for data descriptors previously described, generation of RIDs by Data Movement System 101 does not involve moving data from the source address. Thus, for a RID descriptor, the source address field of a data descriptor is not treated as a source address from which to obtain data to move. Rather, the source address field is treated as counter value for generating a sequence of RIDs, which is typically one. Thus, when the source address field value is one, successive RIDs in the sequence differ by one. If the source address field value is two, successive RIDs in the sequence differ by two.

A RID column may have a single-byte or multi-byte column width. The Column Width field in a RID descriptor specifies a column width.

In an embodiment, a RID starting value from which to start generating an ordered sequence of RIDs in a RID column is specified in an auxiliary data descriptor that precedes a RID descriptor. The RID descriptor includes a "RID start flag" to specify that the auxiliary descriptor sets a RID starting value. A "RID Starting Value" field in the auxiliary data descriptor specifies a RID starting value. Alternatively, the RID starting value may be specified by setting a register using a program descriptor or by using a field in a RID descriptor. Specifying the RID starting value in an auxiliary descriptor may be advantageous for accommodating larger RID starting values for larger column widths. There may be insufficient space available in a RID descriptor for a field large enough to specify the larger staring values.

Exemplary Partitioning Chain with RID Generation

As mentioned previously, RID generating is particularly advantageous for identifying rows after the rows have been partitioned between core processors. During partitioning, a RID column may be generated in column memory for columns being partitioned, which, in effect, adds a RID column for the rows in the columns being partitioned. When the RID is partitioned to DMEM of a core processor, the row will include a RID column.

Figure 8A:
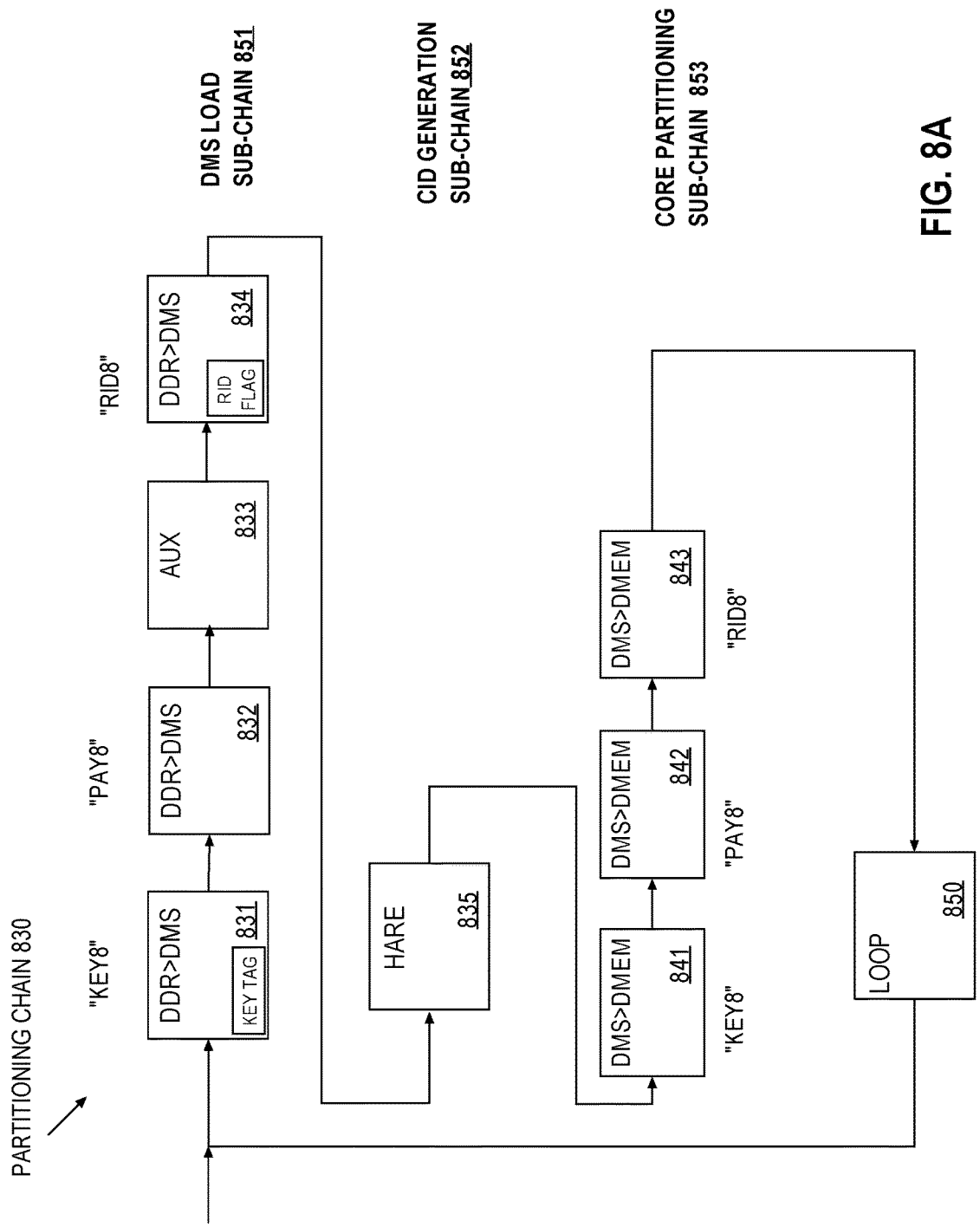
FIG. 8A illustrates descriptors used for generating RID columns used for row resolution after partitioning according to an embodiment of the present invention.
Figure 8B:
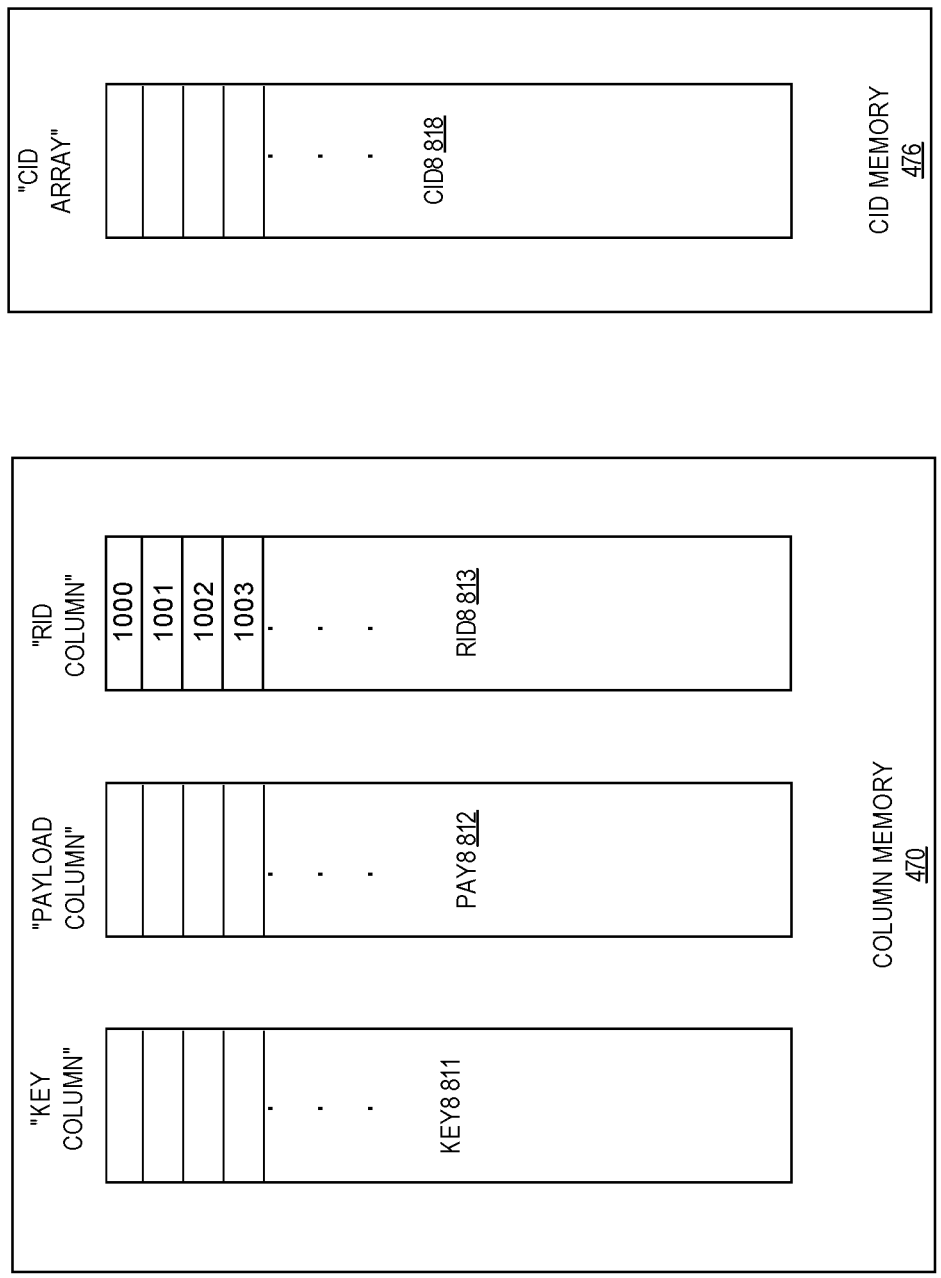
FIG. 8B illustrates RID columns used for row resolution after partitioning columns according to an embodiment of the present invention.

FIG. 8A shows partitioning chain 830 comprising descriptors that may be used to cause partitioning of the rows that include a RID column. FIG. 8B shows columns generated and/or otherwise processed while partitioning rows according to partitioning chain 830.

Partitioning chain 830 partitions columns among core processors of Data Movement System 101, the columns include a RID column. Partitioning chain 830 includes DMS load sub-chain 851 for the load stage, CID generation sub-chain 852 for the CID generation stage, and core partitioning sub-chain 853 for the core partitioning stage.

DMS load sub-chain 851 comprises data descriptor 831, data descriptor 832, auxiliary descriptor 833, and RID descriptor 834. Each of data descriptor 831 and data descriptor 832 specifies a source address in main memory for a different column for a subset of rows 415 and a different destination address within column memory 474. Data descriptor 831 is for key column KEY8 811, data descriptor 832 is for pay column PAY8 812. Data descriptor 831 includes a key column tag. Each data descriptor also specifies 256 as the number of rows to move to DMS memory 150.

Auxiliary descriptor 833 specifies a RID starting value of 1000 in the RID starting value field. When auxiliary descriptor 833 is forwarded to DMAC 140, it is initially processed by read descriptor parser logic block 121b. Read descriptor parser logic block 121b detects the auxiliary descriptor contains a RID starting value, causing read descriptor parser logic block 121b to update an internal parser register with the starting value. For purposes of illustration, the RID starting value is 1000. In an embodiment, a RID descriptor is immediately preceded by an Aux descriptor that contains a RID starting value.

RID descriptor 834 is a RID descriptor. RID descriptor 834 includes a RID flag. RID descriptor 834 specifies a column width field of 1, a destination address within column memory 474, and 256 as the number of rows to generate in a RID column. The source address field is set to 1, specifying a counter value of 1.

When RID descriptor 834 is forwarded to DMAC 140, it is initially processed by read descriptor parser logic block 121b. Read descriptor parser logic block 121b detects the RID flag, causing read descriptor parser logic block 121b to notify a RID engine in one of the data movement blocks (130a, 130b, 130c, or 130d) of receipt of a RID descriptor 834.

When the notified RID Engine receives the notification, the RID Engine generates RID column RID8 813 accordingly. Thus, RID column RID8 has a column width of two bytes, which includes 256 rows or elements. The first RID in RID column RID8 is 1000, the RID starting value specified in auxiliary descriptor 833. Successive RIDs in RID column RID8 are created by incrementing the RID starting value by 1, the specified counter value. The next two successive RIDs in RID column RID8 are thus 1001 and 1002, respectively.

CID generation sub-chain 852 comprises one descriptor, HARE descriptor 835. HARE engine 473 generates CID array CID8 818 when executing HARE descriptor 835.

Core partitioning sub-chain 853 specifies how to perform the core partitioning for key column KEY8, payload column PAY8, and RID column RID8. Core partitioning sub-chain 453 includes core partitioning descriptor 841, core partitioning descriptor 842, and core partitioning descriptor 843. Core partitioning descriptor 841 is for partitioning key column KEY8, and core partitioning descriptor 842 is for partitioning payload column PAY8, and core partitioning descriptor 843 is for partitioning RID column RID8.

Each of these partitioning descriptors identifies the respective column to be partitioned among core processors as described before. With respect to core partitioning descriptor 843, the Source Addr field identifies the RID column RID8 by referencing the column's address in column memory 474.

Each core partitioning descriptor specifies a destination address (i.e. in the Destination Addr. field) in DMEM. For each core partitioning descriptor, the core processors in Data Movement System 101 have a respective column FIFO buffer in scratchpad memory at the destination address, that is, for each core processor, there is a respective column FIFO buffer for each of key column KEY8, payload column PAY8, and RID column RID8. These column FIFO buffers are row aligned.

For example, after processing HARE descriptor 835, assume the first four elements in CID array CID8 contain the following CID's: 0, 6, 16, 0 in the first four rows, which identify core processors 103a, 103g, 104a, and 103a, respectively. After processing core partitioning sub-chain 853, the first and fourth rows of column KEY8, payload column PAY8, and RID column RID8 are stored contiguously in respective column FIFO buffers of core processor 103a. In the column FIFO buffer for RID column RID8 in core processor 103a, the first two elements contain the first and fourth RID entries 1000 and 1003, respectively, just as these rows did when stored in column memory 474 before partitioning.

RIDs for Other Tabular Data Manipulation Operations

Partitioning is one example of a tabular data manipulation operation that alters row alignment when generating resultant columns. Another is a gather operation. In a gather operation, Data Movement System 101 filters out rows of a column while the column is in flight from a source memory location to a destination memory location, and compacts the resulting rows of the column, (i.e. the rows that were not filtered out) while storing the resulting rows in the destination memory location such that the resulting rows are stored in consecutive memory locations within the destination memory even if the resulting rows were not stored in consecutive memory locations at the source memory location. The rows may be filtered out based on a bit vector. See Run Length Encoding Aware Direct Memory Access Filtering Engine For Scratchpad-Enabled Multi-Core Processors for a further description of the gather operation as performed by Data Movement System 101.

According to an embodiment, a RID descriptor may specify a data manipulation operation, such as a gather operation. Thus, after performing a data manipulation to a particular column moved to a memory such as DMEM of a core processor, a RID column is in effect manipulated in the same way. The resultant manipulated column and RID column are row aligned allowing the RIDs to be used for RID-based row resolution.

The data movement system may convert each RID within the list of RIDs from its logical RID to a corresponding physical RID prior to performing a gather and/or scatter operation. A logical RID, as described herein, is a unique identifier assigned to each row in a database table. A physical RID, as described herein, is derived from a logical RID. In an embodiment, the physical RID is derived by subtracting a base value from the logical RID. This ability to convert logical RIDs to physical RIDs allows a core processor to work on a smaller subset of rows of a column of tabular data that are stored in contiguous addresses in main memory. Additionally, a core processor may initiate data movement with a gather operation using a subset of rows without first converting the logical RIDs of the rows to their corresponding physical RIDs.

Generation of column RIDs by Data Movement System 101 has many advantages for many different types of database operations. One example of such an operation is a partitioned "filter and projection" database operation. In a partitioned filter and projection operation, rows may be partitioned between core processors so that a portion of the columns of rows are evaluated in parallel against filtering criteria to determine which subset of rows satisfy the filtering criteria. The subset of rows are then further processed. Such further processing include processing "carry" columns, which, in the context of the filtering portion are the partitioned filter and projection operation, are the columns that are not evaluated for the criteria.

One technique for performing a partitioned filter and projection operation is to partition the rows in their entirety and then examine the column pertinent to the filtering. In this technique, the carried columns are distributed to the scratchpad memory of core processors even though many of the "filtered out" rows of the carried columns are never otherwise processed. If the filtering criteria is selective, then potentially substantial processing bandwidth is expended transferring data that is not pertinent to the partitioned filter and projection operation.

With RIDs, only a subset of columns pertinent to the filtering criteria need to be partitioned between core processors. The RIDs of rows satisfying criteria may be used to obtain the rows from other columns.

For the purpose of identifying a subset of rows in a column, RIDs may require less memory to identify a smaller subset than a bit vector. A bit vector (at least one that is uncompressed) occupies the same amount of memory to identify a subset of rows in a set of rows regardless of the number of rows in the subset. When the number of rows in the subset is much smaller than that of the set, the bit vector is sparse, that is, only a small number of bits are set to identify rows. A list of RIDs may occupy less memory in this case than the bit vector.

A sparse bit vector may be used to generate a list of RIDs that occupies less memory. A RID descriptor may specify to generate a RID column and apply a bit vector in a gather operation, thereby generating a RID column in a destination memory location, the RID column comprising RIDs that identify the rows identified by the bit vector.

DMS Memory Organization

According to an embodiment of the present invention, DMS memory comprises four categories of memory, each category being accessible to an engine (or engines) of DMAC 140 to store data read or written by that engine. Each category may comprise one or more units of memory. One category is used to store columns that are to be partitioned and/or serve as input for generating a hash column, another is used to store hash columns, another is used to store RID columns or bit vectors, and finally another is used to store CIDs. These categories of memory and the arrangement thereof with respect to various engines of the DMAC is depicted in FIG. 9A and FIG. 9B.

Figure 9A:
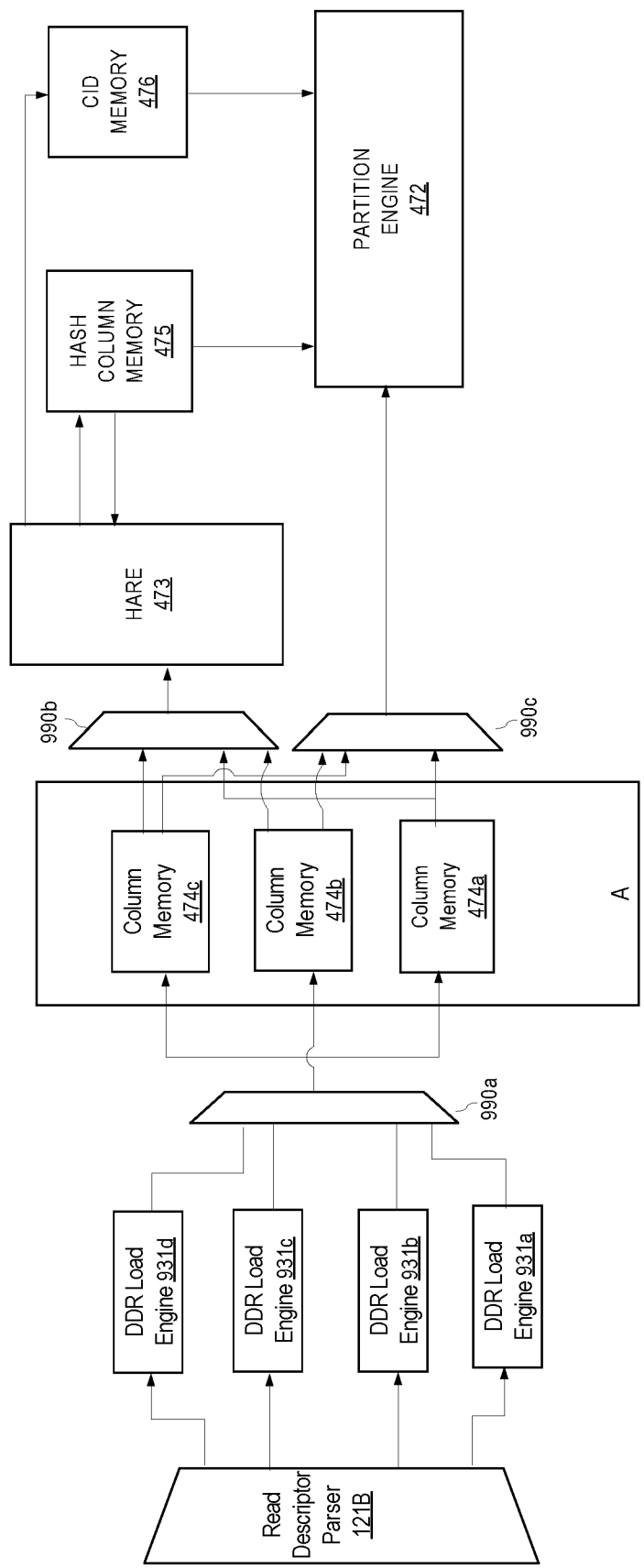
FIG. 9A depicts various memories used by data movement engines according to an embodiment of the present invention.
Figure 9B:
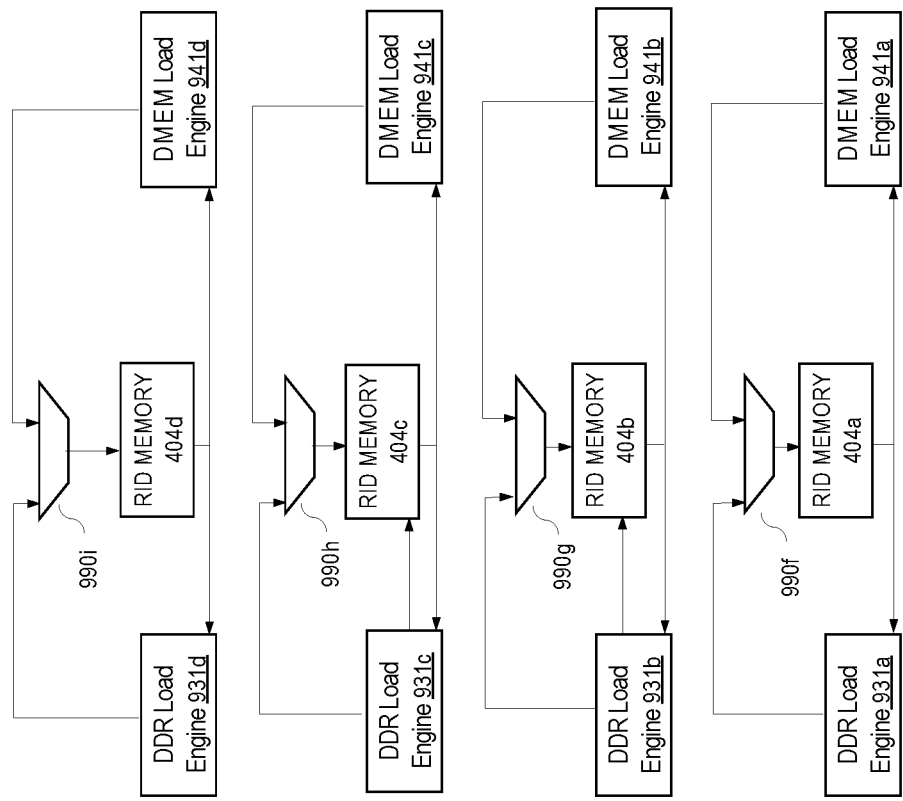
FIG. 9B depicts RID memories used by data movement engines according to an embodiment of the present invention.

Referring to FIG. 9A, it depicts column memory unit 474*a*, column memory unit 474*b*, and column memory unit 474*c*. Each of column memory unit 474*a*, and column memory unit 474*b*, and column memory unit 474*c* are used to store columns that are partitioned and/or serve as input for generating a hash column.

DDR load engine 931*a*, DDR load engine 931*b*, DDR load engine 931*c*, and DDR load engine 931*d* are the DDR data load engines of data movement engine 130*a*, data movement engine 130*b*, data movement engine 130*c*, and data movement engine 130*d*, respectively. According to an embodiment, each of DDR load engine 931*a*, 931*b*, 931*c*, and 931*d* may move a column from DDR memory to any of column memory units 474*a*, 474*b*, and 474*c*. The column is moved in response to receipt of control information from read descriptor parser logic block 121*b*. Read descriptor parser logic block 121*b* dispatches the control information based on a descriptor parsed by read descriptor parser logic block 121*b*, the descriptor specifying the source address of the column in DDR memory and a destination column memory unit 474*a*, 474*b*, or 474*c*, and the destination address within destination column memory unit 474*a*, 474*b*, or 474*c*. Write access by DDR load engine 931*a*, 931*b*, 931*c*, and 931*d* to any of column memory units 474*a*, 474*b*, and 474*c* is arbitrated by arbitration unit 990*a*.

HARE engine 474 accesses (via arbitration unit 990*b*) any of column memory units 474*a*, 474*b*, or 474*c* to read one or more key columns from which to generate a hash column. Partition engine 472 accesses (via arbitration unit 990*c*) any of column memory units 474*a*, 474*b*, or 474*c* to read one or more columns therein to partition.

Referring to FIG. 9B, it depicts RID memory units 404*a*, 404*b*, 404*c*, and 404*d*. Each of RID memory units 404*a*, 404*b*, 404*c*, and 404*d* comprise one or more memory units that are each used to store RID columns or BVs. The RID columns may be loaded from DMEM to any of RID memory units 404*a*, 404*b*, 404*c*, or 404*d*. Also, each of the DDR load engines have a RID Engine which can access the local RID memory that resides in that data movement engine. Thus, RID memory units 404*a*, 404*b*, 404*c*, or 404*d* can be used to store a RID column that is generated according to a RID descriptor (e.g. RID descriptor 834), which specifies which of RID memory units 404a, 404b, 404c, or 404d to store the RID column. As described earlier, RID columns can also be stored in column memories 474a, 474b, and 474c.

As mentioned before, data movement engine 130a, 130b, 130c, and 130d each include a DDR load engine, which are DDR load engine 931a, 931b, 931c, and 931d, respectively. In addition, data movement engine 130a, 130b, 130c, and 130d each include a DMEM load engine, which are DMEM load engine 941a, 941b, 941c, and 941d, respectively.

According to an embodiment in which an RID memory unit is internal to a data movement engine, the DDR load engine and DMEM load engine of each data movement engine may access only the respective RID memory unit to read and write a RID column. DDR load engine 931a and DMEM load engine 941a have access to RID memory unit 404a via arbitration unit 990f, DDR load engine 931b and DMEM load engine 941b have access to RID memory unit 404b via arbitration unit 990g, DDR load engine 931c and DMEM load engine 941c have access to RID memory unit 404c via arbitration unit 990h, DDR load engine 931d and DMEM load engine 941d have access to RID memory unit 404d via arbitration unit 990i.

A data movement engine can only perform a gather and/or scatter operation using a RID column or BV stored in the RID memory to which the respective DDR load engine and DMEM load engine have access. For example, in order for data movement engine 130a to perform a gather operation using a RID column, the RID column should be stored in RID memory unit 404a.

DMS-DMS Memory Movement

According to an embodiment, a data movement engine performs data movement operations for only the group of core processors connected (via a DMAD) to a particular DMAX. For example, data movement engine 130a performs data movement for core processors 103a and 103g and no other core processor in data movement system 101, such as 104a and 104g.

Different data movements to different core processors may be performed by different data movement engines but can use the same RID column or BV to perform the data movement. To use the same RID column or BV, the RID column and/or BV is copied to the multiple RID memory units that are accessible to the data movement engines performing the data movement.

One way to move copies of a RID column or BV to multiple RID memory units is to execute multiple descriptors, each specifying to move the same RID column from DDR memory to a particular RID memory. However, this requires multiple movements from DDR memory to data movement system 101.

To avoid multiple movements from DDR memory, data movement system 101 is configured to internally move data between various memory units in DMS memory. Data movement performed in this way is referred to herein as internal DMS memory movement. Internal DMS memory movement can be performed more efficiently than data movements between main memory and data movement system 101. Data movement system 101 may be configured to execute internal DMS memory movement by submitting to data movement system 101 a DMS-DMS descriptor. A copy ring is used to perform internal DMS memory movement.

Figure 10:
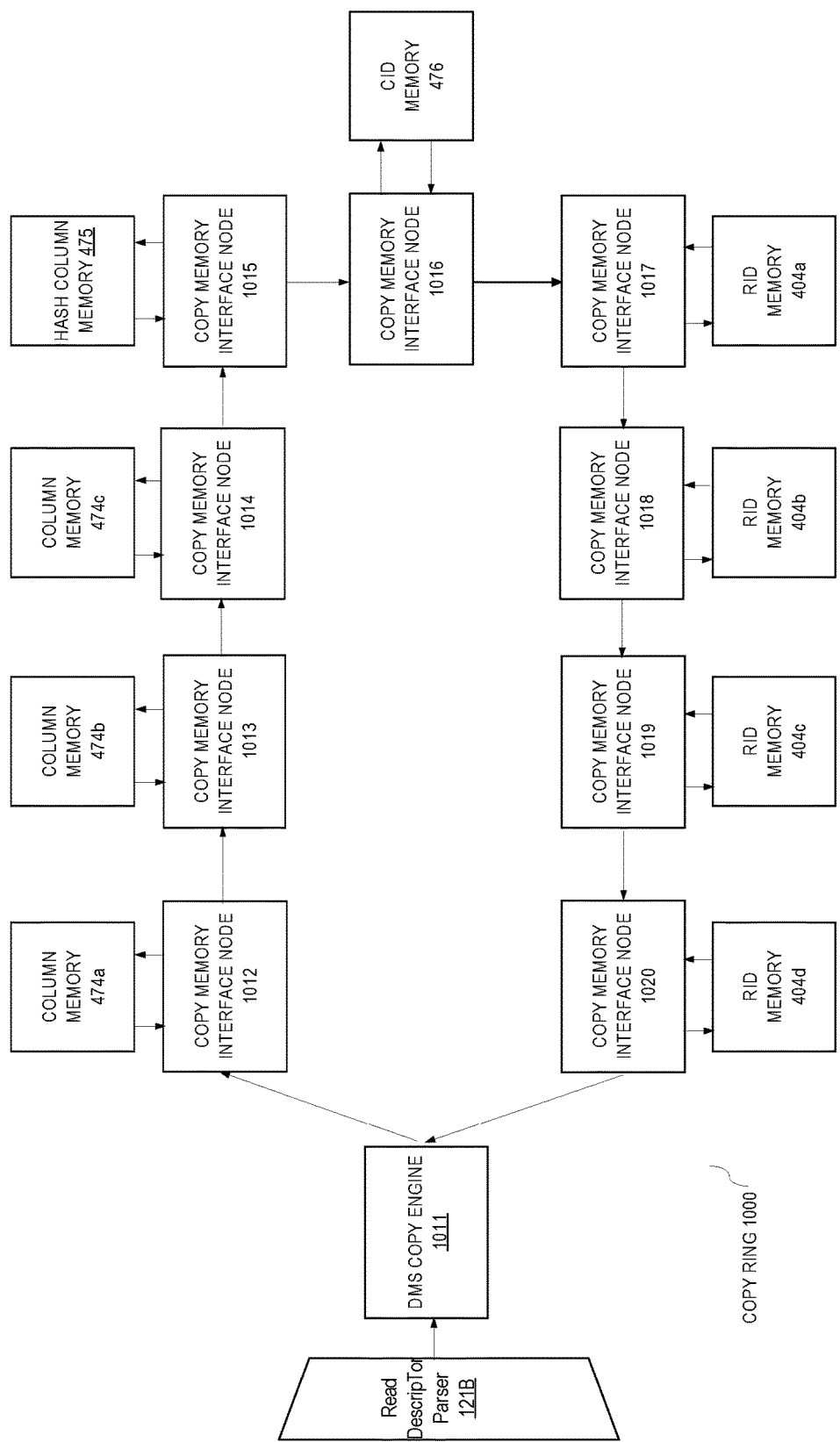
FIG. 10 depicts a copy ring interconnected to various memories used by a data movement engine according to an embodiment of the present invention.

FIG. 10 shows copy ring 1000, which comprises digital electronic circuitry configured for internal DMS memory movement. Copy ring 1000 includes copy ring nodes, each of which are a block of digital electronic circuitry configured to participate in moving data to and from memory units within DMS memory and other copy ring nodes. According to an embodiment, there are several kinds of copy ring nodes: a DMS copy engine node and copy memory interface node. Copy ring 1000 includes DMS copy engine 1011, and copy memory interface nodes 1012, 1013, 1014, 1015, 1016, 1017, 1018, 1019, and 1020, one for each DMS memory unit that serves as a source or destination for internal DMS memory movement.

DMS copy engine 1011 comprises digital electronic circuitry configured to perform various functions that are hereafter described. In general, DMS copy engine 1011 initiates internal DMS memory movement in response to receiving from read descriptor parser logic block 121b control information generated by read descriptor parser logic block 121b for a DMS-DMS descriptor.

Each copy ring node is linked by a separate bus to each of two other copy ring nodes, thereby forming a loop or ring along which data is transmitted between and among copy ring nodes. Each copy ring node receives control information and may receive "copy data" that was retrieved from a DMS memory unit by another copy memory interface node and sent via a bus from another copy ring node. The term copy data refers to data stored in a DMS memory unit that is copied to another DMS memory unit using internal DMS memory movement.

Each of the copy memory interface nodes is coupled to a respective DMS memory unit and is configured to write copy data to the respective DMS memory unit and/or to read copy data from that DMS memory. In another embodiment, a copy memory interface node may be coupled to multiple memory units when such memory units are physically proximate to each other.

According to an embodiment, the loop is directional. That is, a given copy ring node is connected by two separate buses to two other copy ring nodes; one copy ring node ("source node") from which the given copy ring node receives control data and/or copy data, and another copy ring node ("destination node") to which the given copy ring node forwards control data and/or read data.

Referring to FIG. 10, copy memory interface node 1012, 1013, and 1014 are copy memory interface nodes for column memories within DMS memory 150. Copy memory interface node 1012, 1013, and 1014 are coupled to column memory 474a, 474b, and 474c, respectively. Copy memory interface node 1015 is coupled to hash column memory 475. Copy memory interface node 1016 is coupled to CID memory 476. Copy memory interface nodes 1016, 1017, 1018, and 1019 are coupled to RID memory 404a, 404b, 404c, and 404d, respectively.

The source and destination node of each copy ring node depicted in FIG. 10 is indicated by directional lines representing a bus between copy rings nodes, with a line directed from a source node of a copy ring node to the copy ring node and a line directed from the copy ring node to the destination node of the copy ring node. For example, the source and destination node for copy memory interface node 1012 is DMS copy engine 1011 and copy memory interface node 1013, respectively.

DMS-DMS Descriptor

Figure 11:
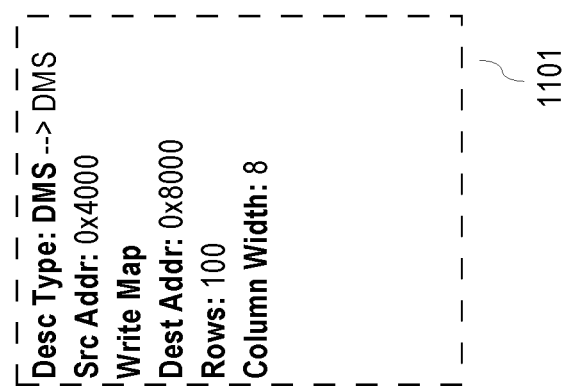
FIG. 11 depicts a descriptor used to configure data movement between various memories coupled to a copy ring according to an embodiment of the present invention.

As with other data movement operations described previously, a descriptor is used to configure Data Movement System 101 to perform an internal DMS memory movement. FIG. 11 depicts DMS-DMS descriptor 1101, which is used to configure Data Movement System 101 to perform an internal DMS memory movement.

Referring to FIG. 11, it depicts DMS-DMS descriptor 1101. The "Desc Type" field of DMS-DMS descriptor 1101 specifies DMS-DMS descriptor 1101's descriptor type.

The "Src Addr" field specifies the source address of copy data. According to an embodiment, the source address should refer to a single memory address space ("DMS memory address space") that covers multiple DMS memory units. A range of the DMS memory address space is exclusively dedicated to a single DMS memory unit, and an address within any DMS memory unit falls within the respective dedicated range. Thus, each memory address of any column memory 474a, 474b, 474c, hash column memory 475, CID memory 476, and RID memory 404a, 404b, 404c, and 404d falls within a particular range, and is absolute within the DMS memory address space.

"Dest Addr" field specifies the destination address within a DMS memory unit to write copy data. For each DMS memory unit to which copy data is written for a DMS-DMS descriptor, the destination address is the same. Unlike the source address of "Srd Addr" field, the destination address is relative to a particular DMS memory unit (e.g. an offset).

"Write Map" fields specifies into which DMS memory to write copy data. For example, Write Map may be a bit map, with each bit corresponding to one of column memory units 474a, 474b, 474c, hash column memory unit 475, CID memory unit 476, and RID memory units 404a, 404b, 404c, and 404d.

"Column Width" indicates the size of the column of the copy data, "Rows" specifies the number of rows of the copy data.

Internal DMS Memory Movement

Figure 12:
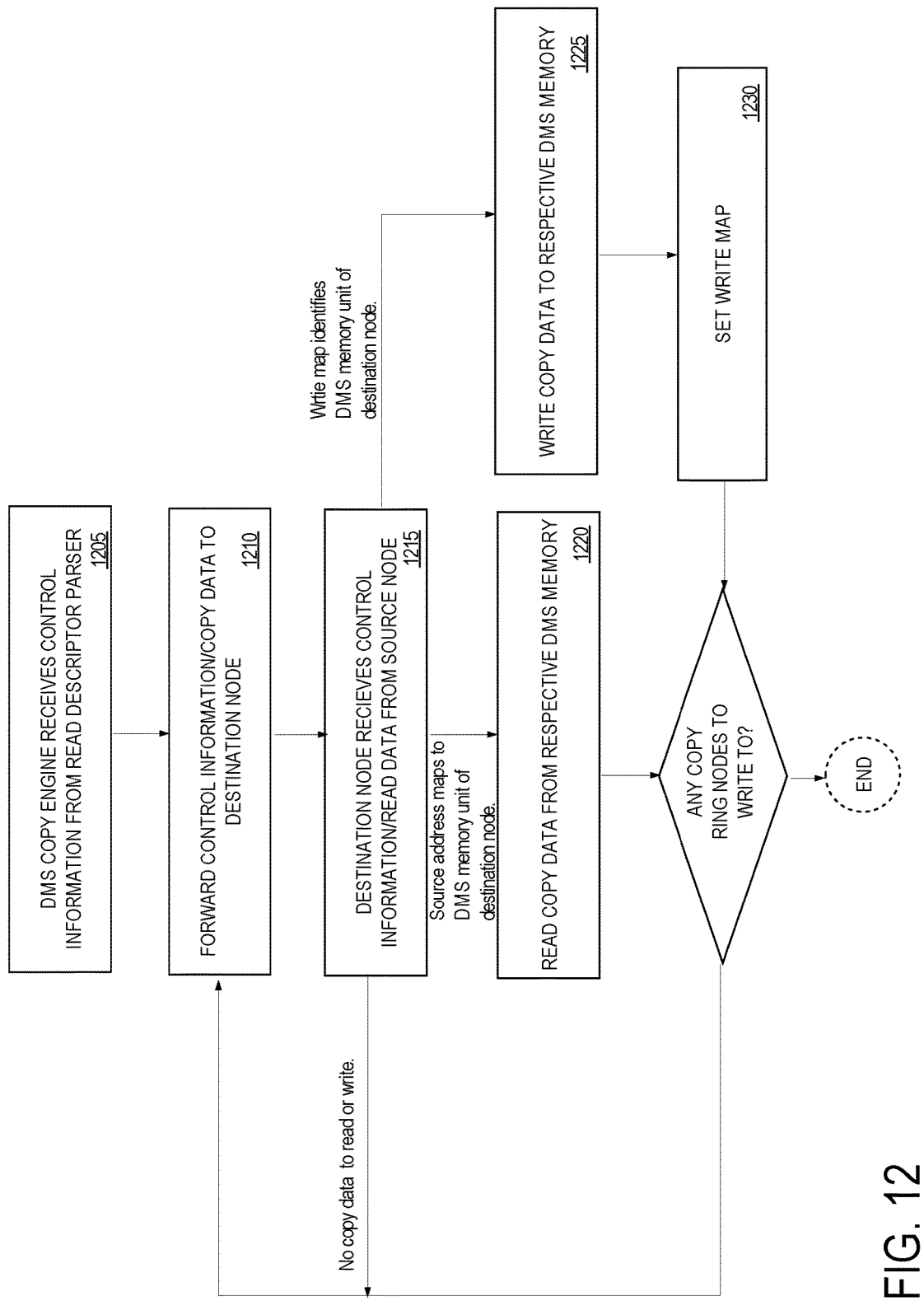
FIG. 12 is a flow chart depicting operations for data movement along a copy ring between various memories coupled to the copy ring according to an embodiment of the present invention.

FIG. 12 is a flow chart depicting operations that copy ring 1000 in FIG. 10 performs for internal DMS memory movement. The operations are performed in response to submission of a DMS-DMS descriptor by a core processor to a descriptor channel of the respective DMAD of the core processor.

Referring to FIG. 12, at 1205, DMS copy engine 1011 receives control information from read descriptor parser logic block 121b. The control information includes information specified in the DMS-DMS descriptor, including the source address, the destination address, and the write map, as specified by the "Src Addr", "Dest Addr", and "Write Map" fields, respectively.

Operations 1210-1235 represent a loop comprising operations that are performed by each copy ring node. In each iteration of the loop, a successive copy ring node performs the operations in the loop. DMS copy engine 1011 performs the initial iteration, and the operations of the loop are illustrated with DMS copy engines 1011's initial performance of the operations.

At 1210, the current copy ring node, which is DMS copy engine 1011, forwards control information to the destination node of the current copy ring node, copy memory interface node 1012. In a latter iteration of the loop performed by another copy ring node, operation 1210 may also entail receiving copy data. Copy data is received when in a previous iteration, copy data was read from a source DMS memory unit by a copy memory interface node (such as copy memory interface node 1012).

At 1215, the destination node, which is copy memory interface node 1012, receives control information, and copy data, if copy data is forwarded by the source node. Since DMS copy engine 1011 has not sent any copy date, only control information is received.

Upon receipt of control information and possible receipt of copy data, the destination node may simply forward control information/copy data to the next copy ring node in the copy ring 1000. Forwarding the control information/copy data in this way occurs when, in effect, the control information indicates that there is no read or write for a destination node to perform. Specifically, if the source address does not identify a memory address located in the DMS memory unit of the destination node and the write map does not indicate to write copy data to the DMD memory unit, or no copy data was forwarded from the source node along with the control information, there is no read or write to DMS memory for a destination node to perform. The destination node becomes the source node at 1210 and forwards control information/copy data to the next destination node.

Otherwise, one of two alternate sets of operations is performed in response to certain determinations as follows. First, at 1220, in response to a determination that the source address maps to the DMS memory unit ("source DMS memory unit") of the destination node, the destination node reads the copy data at the source address.

Second, at 1225, in response to a determination that the write map identifies the DMS memory unit of the destination node, the destination node writes, to the respective DMS memory unit, the copy data received, the copy data being written to the destination address specified by "Dest Addr" of the DMS-DMS descriptor. At 1230, the write map in the control data is set so that it no longer specifies to write copy data to that destination node.

After performing either operation 1220 or 1230, the destination node determines whether the write map specifies that the copy data is to be written to any DMS memory unit. If the determination is that write map specifies that copy data is to be written to any DMS memory unit, then the destination node becomes the source node at 1210 and transmits control information and/copy data to the next destination node. Otherwise, the internal DMS memory movement ends.

A DMS-DMS descriptor may specify a source address for copy data for a copy ring node that is not the first in copy ring node 1000, i.e. is not copy memory interface node 1012. In this case, only the control information is forwarded from copy ring node to copy ring node until the "copy data source node" is reached, that is, until the copy memory interface node that handles the DMS memory unit that corresponds to the source address is reached. The copy data source node reads the copy data from the respective DMS memory unit and forwards the copy data along with the control information to successive copy ring nodes.

It may be useful to shift data within a DMS memory unit. To accommodate this scenario, the DMS memory unit is identified, in a DMS-DMS descriptor, as both the source of copy data and a destination of copy data by the write map. The copy data is read from the source DMS memory unit by the source copy memory interface node, which then writes the copy data to the source DMS memory unit (which is also the destination DMS memory unit) at the destination address.

In another useful scenario, multiple core processors may each generate specific parts of a larger BV; each specific part is then distributed among multiple RID memory units to generate a copy of the larger BV in each of the multiple RID memory units. A copy of the BV may be efficiently assembled in each of the multiple of RID memory units using internal DMS memory movement. Each core processor may configure a DMS-DMS descriptor to load the respective BV part from the respective RID memory unit of the core processor into other RID memory units at a destination address corresponding to the respective BV part in the larger BV. The destination address to use is different for each core processor. Each core processor configures a DMS-DMS core processor to copy the BV part at the destination address in other RID memory units.

Broadcasting Data to Multiple DMEM Units

According to an embodiment, each data movement engine 130*a*, 130*b*, 130*c*, and 130*d* is connected via a corresponding DMAX to the DMEM units of a separate set of core processors served by the DMAX, and, in response to a single data descriptor that has a DMEM unit as a source or destination of a data movement, can only move data to and from the DMEMs connected to that DMAX. The set of core processors, the respective DMEM units, and the database movement engine are referred to as being local to each other. The other data movement engines, other core processors in Data Movement System 101 not in the set, and DMEM units of the other core processors are referred herein to as being remote.

For example, data movement engine 130*a* is connected by DMAX 110*a* to local DMEM units 102*a* and 102*g* of local core processors 103*a* and 103*g*. Data movement engine 130*a* may only move, in response to a single descriptor, data from main memory to either DMEM unit 102*a* or 102*g*. With respect to data movement engine 130*a*, DMEM units 105*a* and 105*g* of core processors 104*a* and 104*g* are referred to as being remote.

According to an embodiment, each of data movement engine 130*a*, 130*b*, 130*c*, and 130*d*, in response to a single descriptor with DMEM specified as the destination of the data movement, submitted by a local core processor, moves data from a source memory to multiple DMEM units, which may be both local and remote with respect to the data movement engine. For example, core processor 103*a* submits a data descriptor, which is processed by local data engine 130*a*. The data descriptor specifies to move data from main memory to multiple DMEM units, some of which are local to the data movement engine 130*a* and some of which are remote. In response, data movement engine 130*a* processes the descriptor, moving data from the source memory to the multiple DMEM units, as described in further detail below. Moving data to multiple DMEM units in response to a single descriptor that specifies so is referred to herein as a DMEM broadcast.

In a DMEM broadcast, data movement by a data movement engine to remote DMEM units is accomplished through a copy ring having copy memory interface nodes that are each connected to a data movement engine. Such a copy ring is depicted in FIG. 13.

Figure 13:
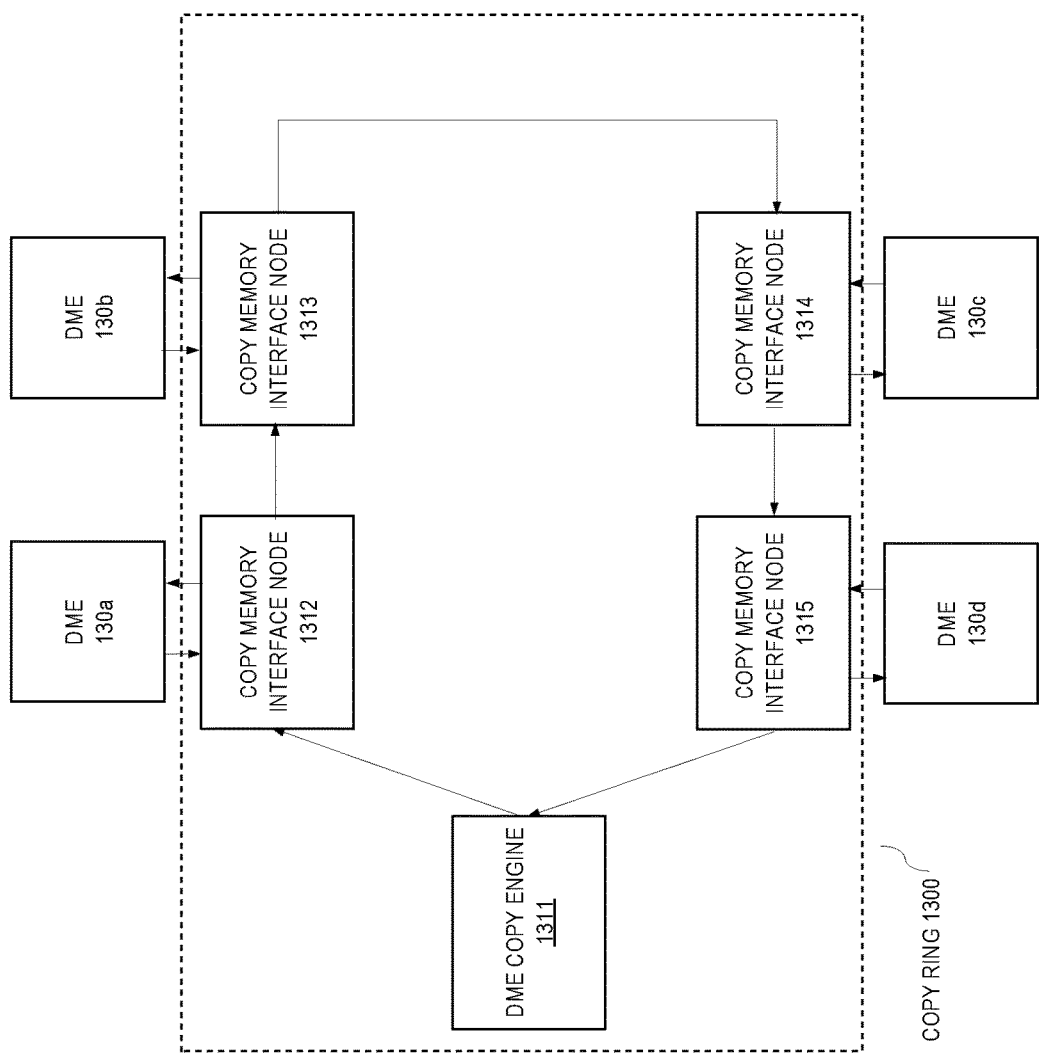
FIG. 13 depicts a copy ring which is interconnected between various data movement engines and which is used to broadcast data among data movement engines.

Referring to FIG. 13, it depicts copy ring 1300. Like copy ring 1000, copy ring 1300 includes copy memory interface nodes. However, the copy memory interface nodes are each connected to a data movement engine and are each configured to write (or read) to circuitry of the data movement engine in response to control data and "broadcast data" transmitted over copy ring 1300. Each copy ring node in copy ring 1300 is linked by buses to two other copy ring nodes, thereby forming a loop or ring along which control data and broadcast data is forwarded among successive copy ring nodes, as described earlier for copy ring 1000.

Copy ring 1300 comprises copy memory interface node 1312, 1313, 1314, and 1315, which are connected to data movement engine 130*a*, data movement engine 130*b*, data movement engine 130*c*, and data movement engine 130*d*, respectively. DME copy engine 1311 comprises digital electronic circuitry configured to initiate transmission of control data and broadcast data over copy ring 1300 in response to receiving control data and broadcast data from a data movement engine 130.

A DMEM unit that is local to the data movement engine to which a copy memory interface node is connected is referred to as local with respect to the data movement engine. Thus, DMEM units 102*a* and 102*g*, which are local to data movement engine 130*a*, are local to copy memory interface node 1312.

DMEM Broadcast Descriptors and Handling

Data descriptors that may specify to perform a DMEM broadcast are referred to herein as DMEM broadcast descriptors. According to an embodiment, several types of data descriptors may be DMEM broadcast descriptors.

A descriptor type that specifies to move data from DDR memory to DMEM may specify to broadcast the data to one or more DMEM units. The DMEM units to which to broadcast are identified by a DMEM map. Similar to a write map, the DMEM map comprises a sequence of bits, each of which are associated with a DMEM unit and may be set to broadcast data to the DMEM unit.

The data descriptor is submitted by a requesting core processor as described previously for a data descriptor. The local data movement engine of the core processor retrieves the data from DDR memory and transmits the data to the DMEM unit of the requesting core processor to be written thereto.

The control information that is generated from the data descriptor includes the DMEM map. If the data movement engine determines that the DMEM map identifies any DMEM unit local to the data movement engine, the data movement engine treats data read from DDR memory as broadcast data and transmits the broadcast data to any local DMEM unit identified by the DMEM map.

If the data movement engine determines that the DMEM map identifies any DME unit that is remote to the data movement engine, the data movement engine treats the data read from DDR memory as broadcast data and transmits control data along with the broadcast data on copy ring 1300 to the next copy ring node on the ring. For example, if DME 103*a* was the local DME that received the data read from DDR, the copy ring node it is connected to, copy memory interface node 1312, places the control data and the broadcast data on ring 1300, where it is transmitted to copy memory interface node 1313.

The control data and broadcast data is forwarded along copy ring 1300 between successive copy memory interface nodes 1313, 1314, and 1315 similar to as described for copy ring 1000.

As each copy memory interface node receives the control data and broadcast data, the copy memory interface node determines whether the DMEM map identifies a DMEM unit local to the copy memory interface node. If the DMEM map identifies a DMEM unit local to the copy memory interface node, the copy memory interface node writes control data and broadcast data to the internal circuitry of the data movement engine. The data movement engine transmits the broadcast data to any local DMEM unit identified by the DMEM map to be written thereto.

Similar to the write map, when broadcast data is written to the internal circuitry of a data movement engine, the respective copy memory interface node sets the DMEM map to indicate that broadcast data has been forwarded to the DMEM unit. Thus, if after copy memory interface node sets the DMEM map the DMEM map indicates that there are no DMEM units to which to forward broadcast data, copy memory interface node ceases to transmit the broadcast data.

The data descriptor may also identify tabular data manipulation operations (e.g. a scatter and a gather) to be performed. If the data movement engine determines that control data specifies to perform a tabular data manipulation operation, then a data movement engine moving broadcast data may transform the broadcast data according to the database operation and write broad cast data as transformed to a DMEM unit.

Not only may a data descriptor specify that the source of broadcast data is DDR memory, a data descriptor may specify the source of broadcast data is a DMEM unit or DMS memory. The DMEM units to which to broadcast are identified by a DMEM map in the data descriptor.

The data descriptor is submitted by a requesting core processor as described previously for a data descriptor. The local data movement engine of the core processor retrieves the broadcast data from the DMEM unit of the requesting core processor and transmits the control data generated for the data descriptor and the broadcast data on copy ring 1300 to the next copy ring node on the ring as described previously.

The control data and broadcast data is transmitted to and processed by all copy memory interface nodes (1312, 1313, 1314, and 1315) similar to as described above.

Peripheral Access to Copy Ring

A copy ring similar to those described above may be used to access DMS memory through a peripheral device. The peripheral device is connected to a copy ring similar to copy ring 1000. For example, the peripheral device may be a debug controller connected to the DMS copy engine. The debug controller may transmit control data to the copy ring engine, which transmits the control data along the copy ring. The source address specifies the DMS memory unit from which to read data. The corresponding copy memory interface node reads data from the DMS memory unit, and transmits the data along the copy ring to the copy engine, which returns the data to the controller. Similarly, the control data can specify to copy the data to other DMS memory units.

To broadcast data to multiple DMEM units, a copy ring similar to copy ring 1300 may be used. The peripheral device sends control data along with broadcast data to the copy engine of a copy ring. The broadcast data is propagated by the copy ring to the DMEM units specified in DMEM map via the respective data movement engines. The peripheral device may be connected to the copy engine in the DMS by a master of a SOC ("system on a chip") interconnect. The peripheral itself could be a network interface such as PCIe (Peripheral Component Interconnect Express) or Ethernet. The control data may specify to perform tabular data manipulation operations, which are performed by one or more database movement engines.

EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. Electronic circuitry on a single chip comprising:
a first set of electronic circuits;
a second set of electronic circuits;
wherein said electronic circuitry on said single chip is configured for:
in response to a particular memory location being pushed into a first register within a first register space that is accessible by said first set of electronic circuits:
said first set of electronic circuits accessing a descriptor stored at the particular memory location, wherein the descriptor indicates:
a width of a column of tabular data, a number of rows of said column of tabular data, and one or more tabular data manipulation operations to perform on said column of tabular data;
a source memory location for said column of tabular data
a destination memory location for a data manipulation result of said one or more tabular data manipulation operations; and
the first set of electronic circuits determining, based on the descriptor, control information indicating said one or more tabular data manipulation operations to perform on said column of tabular data;
the first set of electronic circuits transmitting, using a hardware data channel, the control information to a second set of electronic circuits to perform the one or more tabular data manipulation operations;
according to the control information, said second set of electronic circuits retrieving said column of tabular data from said source memory location;
applying said one or more tabular data manipulation operations to said column of tabular data to generate said data manipulation result; and
causing said data manipulation result to be stored at said destination memory location.

2. The electronic circuitry on a single chip of claim 1, wherein the descriptor indicates a wait condition that should be satisfied prior to the step of the first set of electronic circuits determining the control information.

3. The electronic circuitry on a single chip of claim 1, wherein the descriptor indicates automatically incrementing said source memory location and a source counter.

4. The electronic circuitry on said single chip of claim 3, wherein said electronic circuitry on said single chip is configured for:
in response to a second memory location being pushed into the first register:
said first set of electronic circuits accessing a second descriptor stored at the second memory location, wherein the second descriptor indicates the source memory location for said column of tabular data; and
said second set of electronic circuits determining a new source memory location based at least in part on a value of the source counter.

5. The electronic circuitry on said single chip of claim 4, wherein the second descriptor indicates an iteration count; and wherein said electronic circuitry on said single chip is configured for the first set of electronic circuits determining that the iteration count is not zero prior to accessing the descriptor stored at the particular memory location.

6. The electronic circuitry on said single chip of claim 1, wherein the one or more tabular data manipulation operations comprise at one of:
an aligned run-length decompression operation,
a scatter operation,
gather operation, or
stride operation.

7. Electronic circuitry on a single chip, said electronic circuitry being configured for partitioning columns of rows among co-processors by:
for each data descriptor of a first set of data descriptors, copying a respective column of said columns that is at a source memory to an intermediate memory;
wherein each data descriptor of said data descriptors specifies
a width of the respective column each data descriptor;
a number of rows;
a respective source memory location for said respective column;
a destination memory location within said intermediate memory;
for a second descriptor that specifies a particular algorithm, generating, according to the particular algorithm, a column of core processor identifiers that are each indexed to a respective row of said rows and that identify a respective core processor of said core processors;
for each core partitioning descriptor of a set of core partitioning descriptors, copying each row of a respective column of said columns from said intermediate memory to a scratch pad memory of the core processor identified by the respective core processor identifier indexed to said each row, said respective core processor being indexed to said each row in said column of core processor identifiers;
wherein each core partitioning descriptor of said set of core partitioning descriptors specifies
a width of the respective column of said each core partitioning descriptor;
a number of rows;
a respective source memory location in said intermediate memory for the respective column of each core partitioning descriptor;
a destination memory location.

8. The electronic circuitry on said single chip of claim 7, wherein each data descriptor of one or more particular key column data descriptors of said first set of data descriptors flags the respective column of said each data descriptor as a key column; and
wherein said electronic circuitry on said single chip is configured for generating, according to the particular algorithm, a column of core processor identifiers by at least generating, based on each respective column of said one or more particular key column data descriptors, said column of core processor identifiers.

9. Electronic circuitry on a single chip comprising:
a plurality of core processors;
a plurality of DMEMs (direct memories);
a plurality of first blocks of circuitry, wherein each core processor of said plurality of core processors is connected to a respective DMEM of said plurality of DMEMs and a respective first block of said plurality of first blocks of circuitry that is connected to the respective DMEM of said each core processor;
a plurality of second blocks circuitry;
for each separate subset of multiple core processors of said plurality of core processors, a respective second block of said plurality of second blocks is connected to the respective first block of each core processor of said each separate subset of multiple core processors;
wherein a third block circuitry is connected to each of said plurality of second blocks;
wherein said particular core processor is connected to a particular first block of said plurality of first blocks, wherein said particular first block is connected to a particular second block of said plurality of second blocks, wherein said particular second block of said plurality of second blocks is connected to said third block, wherein said particular register is accessible to said particular core processor and said particular first block connected to said particular core processor;
wherein said electronic circuitry is configured for, in response to a particle core processor pushing a particular memory location onto a particular register:
said particular first block to a descriptor stored at the particular memory location, wherein the descriptor indicates one or more tabular data manipulation operations to perform on a column of tabular data, wherein the descriptor includes a plurality of separate fields that include:
a field specifying a width of the column of tabular data;
a field specifying a number of rows of said column of tabular data;
a field specifying a source memory location for said column of tabular data; and
a field specifying a destination memory location for a data manipulation result of said one or more tabular data manipulation operations;
the particular first block to transmit control information of the descriptor to said third block via said particular second block;
the third block to retrieve, based on the control information of the descriptor, the column of tabular data from the source memory location;
the third block to perform, based on the control information, the one or more tabular data manipulation operations on the column of the tabular data to generate the data manipulation result;
the third block to transmit via said particular second block, based on the control information, the data manipulation result to the particular first block;
the first block to cause the data manipulation result to be stored at said destination memory location within the respective DMEM of said particular core processor.

10. The electronic circuitry on said single chip of claim 9, wherein the control information of the descriptor includes the source memory location, the destination memory location, the width of the column of tabular data, the number of rows of said tabular data, and the one or more tabular data manipulation operations.

11. The electronic circuitry on said single chip of claim 9, wherein one of the one or more tabular data manipulation operations is an ARLE (aligned run-length) decompression operation.

12. The electronic circuitry on said single chip of claim 11, wherein said electronic circuitry on said single chip is configured for:

the third block storing, based on control information generated for another descriptor, a run address specifying one or more run lengths; and the third block performing said ARLE decompression operation by retrieving a run from said run address and use said run to decompress said tabular data.

13. The electronic circuitry on said single chip of claim 9, wherein the descriptor specifies a ARLE decompression operation and a second tabular data manipulation operation; and wherein said electronic circuitry on said single chip is configured for:

the third block performing, based on the control information, the one or more tabular data manipulation operations by at least:

performing said ARLE decompression operation to generate a first data manipulation result, and performing said second tabular data manipulation operation on said first data manipulation result.

14. The electronic circuitry on said single chip of claim 9, wherein one of the one or more tabular data manipulation operations includes a gather operation.

15. The electronic circuitry on said single chip of claim 14, wherein said electronic circuitry on said single chip is configured for:

the third block to perform the gather operation by at least identifying, based on a bit vector, one or more rows within the column of tabular data that should be stored at the destination memory location.

16. The electronic circuitry on said single chip of claim 15, wherein each bit within the bit vector corresponds to a corresponding row within the column of tabular data and wherein each bit indicates whether the corresponding row of the bit within the column of tabular data should be stored at the destination memory location.

17. The electronic circuitry on said single chip of claim 9, wherein one of the one or more tabular data manipulation operations is a scatter operation.

18. The electronic circuitry on said single chip of claim 9, wherein one of the one or more tabular data manipulation operations is a stride operation.

19. The electronic circuitry on said single chip of claim 18, wherein said electronic circuitry on said single chip is configured for:

the third block determining, based on a stride value and destination memory location, a new destination memory location for each row of the column of tabular data;

wherein the stride value is included within the control information;

the third block transmitting the column of tabular data including the new destination memory location for each row within the column of tabular data to the particular first block via said particular second block;

the particular first block causing each row of the column of tabular data to be stored at a new destination memory location of that row.

20. The electronic circuitry on said single chip of claim 9, wherein the third block comprises a first subset of electronic circuits and a second subset of electronic circuits, wherein said electronic circuitry on said single chip is configured for:

the first subset of electronic circuits performing first tabular data manipulation operations specified by a first descriptor; and while the first subset of electronic circuits are performing the first tabular data manipulation operations specified by a first descriptor, the second subset of electronic circuits are performing second tabular data manipulation operations specified by a second descriptor.

21. The electronic circuitry on said single chip of claim 20, wherein the third block comprises a first subset of electronic circuits and a second subset of electronic circuits, wherein said electronic circuitry on said single chip is configured for the first subset of electronic circuits performing tabular data manipulation operations that are also specified by the second descriptor.

* * * * *